United States Patent
Philyaw et al.

(10) Patent No.: US 8,296,440 B2
(45) Date of Patent: *Oct. 23, 2012

(54) METHOD AND APPARATUS FOR ACCESSING A REMOTE LOCATION WITH AN OPTICAL READER HAVING A PROGRAMMABLE MEMORY SYSTEM

(75) Inventors: Jeffry Jovan Philyaw, Dallas, TX (US); Douglas L. Davis, Dallas, TX (US)

(73) Assignee: RPX Corporation, San Francisco, CA (US)

( * ) Notice: Subject to any disclaimer, the term of this patent is extended or adjusted under 35 U.S.C. 154(b) by 370 days.

This patent is subject to a terminal disclaimer.

(21) Appl. No.: 12/464,765

(22) Filed: May 12, 2009

(65) Prior Publication Data

US 2009/0240816 A1   Sep. 24, 2009

Related U.S. Application Data

(63) Continuation of application No. 10/996,120, filed on Nov. 23, 2004, now Pat. No. 7,533,177, which is a continuation of application No. 09/608,859, filed on Jun. 30, 2000, now Pat. No. 6,823,388, which is a continuation-in-part of application No. 09/602,468, filed on Jun. 23, 2000, now Pat. No. 6,754,698, which is a continuation-in-part of application No. 09/598,886, filed on Jun. 21, 2000, now Pat. No. 6,758,398, which is a continuation-in-part of application No. 09/580,848, filed on May 30, 2000, now Pat. No. 6,860,424, which is a continuation-in-part of application No. 09/378,221, filed on Aug. 19, 1999, now Pat. No. 6,745,234, which is a continuation-in-part of application No. 09/151,471, filed on Sep. 11, 1998, now abandoned, and a continuation-in-part of application No. 09/151,530, filed on Sep. 11, 1998, now Pat. No. 6,098,106.

(51) Int. Cl.
*G06F 15/16* (2006.01)

(52) U.S. Cl. ........ 709/227; 709/217; 709/219; 709/223; 709/225; 709/229; 235/454

(58) Field of Classification Search ................ 709/227, 709/225, 223, 219
See application file for complete search history.

(56) References Cited

U.S. PATENT DOCUMENTS 3,668,312 A   6/1972   Yamamoto et al.
(Continued)

FOREIGN PATENT DOCUMENTS

CA   2250450   4/1999
(Continued)

OTHER PUBLICATIONS

White, James J. and Summers, Robert S. Uniform Commercial Code. 4th Ed. West Publishing Co., St. Paul MN, 1995.
(Continued)

*Primary Examiner* — Yves Dalencourt
(74) *Attorney, Agent, or Firm* — Howison & Arnott, L.L.P.

(57) ABSTRACT

An optical reader for accessing a remote location on a network includes an optical scanning system, a memory system, an output circuit for interfacing to a first computer disposed on the network, and a switching device for switching between a scan mode, a record mode and a playback mode. The optical reader further includes a transmitter for transmitting code information representative of a code to the first computer. In the scan mode, the code information is indicative of information representative of an encoded indicia scanned by the optical scanning system. In the playback mode the code information is indicative of information retrieved from a user-selectable memory in the memory system. The code information is configured to cause the first computer to determine routing information to the remote location, and access the remote location on the network in accordance with the determined routing information.

19 Claims, 21 Drawing Sheets

U.S. PATENT DOCUMENTS

| | | | |
|---|---|---|---|
| 3,886,328 A | 5/1975 | Harms, Jr. et al. | |
| 4,002,886 A | 1/1977 | Sundelin | |
| 4,042,792 A | 8/1977 | Pakenham et al. | |
| 4,365,148 A | 12/1982 | Whitney | |
| 4,471,218 A | 9/1984 | Culp | |
| 4,538,174 A | 8/1985 | Gargini et al. | |
| 4,546,352 A | 10/1985 | Goldman | |
| 4,581,484 A | 4/1986 | Bendig | |
| 4,621,259 A | 11/1986 | Schepers et al. | |
| 4,642,790 A | 2/1987 | Minshull et al. | |
| 4,654,482 A | 3/1987 | DeAngelis | |
| 4,672,377 A | 6/1987 | Murphy et al. | |
| 4,710,727 A | 12/1987 | Rutt | |
| 4,780,599 A | 10/1988 | Baus | |
| 4,783,648 A | 11/1988 | Homma et al. | |
| 4,785,296 A | 11/1988 | Tabata et al. | |
| 4,789,147 A | 12/1988 | Berger et al. | |
| 4,816,904 A | 3/1989 | McKenna et al. | |
| 4,817,136 A | 3/1989 | Rhoads | |
| 4,823,108 A | 4/1989 | Pope | |
| 4,823,303 A | 4/1989 | Terasawa | |
| 4,833,308 A | 5/1989 | Humble | |
| 4,841,132 A | 6/1989 | Kajitani et al. | |
| 4,845,634 A | 7/1989 | Vitek et al. | |
| 4,850,009 A | 7/1989 | Zook et al. | |
| 4,866,431 A | 9/1989 | Andros et al. | |
| 4,890,098 A | 12/1989 | Dawes et al. | |
| 4,893,333 A | 1/1990 | Baran et al. | |
| 4,894,789 A | 1/1990 | Yee | |
| 4,896,148 A | 1/1990 | Kurita | |
| 4,899,370 A | 2/1990 | Kameo et al. | |
| 4,901,073 A | 2/1990 | Kibrick | |
| 4,905,094 A | 2/1990 | Pocock et al. | |
| 4,907,264 A | 3/1990 | Seiler et al. | |
| 4,916,293 A | 4/1990 | Cartlidge et al. | |
| 4,937,853 A | 6/1990 | Brule et al. | |
| 4,947,028 A | 8/1990 | Gorog | |
| 4,959,530 A | 9/1990 | O'Connor | |
| 4,972,504 A | 11/1990 | Daniel et al. | |
| 4,975,948 A | 12/1990 | Andresen et al. | |
| 4,982,346 A | 1/1991 | Girouard et al. | |
| 4,983,817 A | 1/1991 | Dolash et al. | |
| 4,984,155 A | 1/1991 | Geier et al. | |
| 5,003,384 A | 3/1991 | Durden et al. | |
| 5,038,023 A | 8/1991 | Saliga | |
| 5,039,075 A | 8/1991 | Mayer | |
| 5,047,614 A | 9/1991 | Bianco | |
| 5,054,096 A | 10/1991 | Beizer | |
| 5,060,170 A | 10/1991 | Bourgeois et al. | |
| 5,088,045 A | 2/1992 | Shimanaka et al. | |
| 5,111,391 A | 5/1992 | Fields et al. | |
| 5,115,326 A | 5/1992 | Burgess et al. | |
| 5,128,752 A | 7/1992 | Von Kohorn | |
| 5,133,011 A | 7/1992 | McKiel, Jr. | |
| 5,144,654 A | 9/1992 | Kelley et al. | |
| 5,161,037 A | 11/1992 | Saito | |
| 5,161,214 A | 11/1992 | Addink et al. | |
| 5,175,422 A | 12/1992 | Koizumi et al. | |
| 5,179,700 A | 1/1993 | Aihara et al. | |
| 5,182,705 A | 1/1993 | Barr et al. | |
| 5,189,630 A | 2/1993 | Barstow et al. | |
| 5,191,525 A | 3/1993 | LeBrun et al. | |
| 5,198,644 A | 3/1993 | Pfeiffer et al. | |
| 5,213,337 A | 5/1993 | Sherman | |
| 5,227,771 A | 7/1993 | Kerr et al. | |
| 5,233,171 A | 8/1993 | Baldwin | |
| 5,235,654 A | 8/1993 | Anderson et al. | |
| 5,241,402 A | 8/1993 | Aboujaoude et al. | |
| 5,243,531 A | 9/1993 | DiPippo et al. | |
| 5,247,347 A | 9/1993 | Litteral et al. | |
| 5,249,044 A | 9/1993 | Von Kohorn | |
| 5,250,789 A | 10/1993 | Johnsen | |
| 5,262,860 A | 11/1993 | Fitzpatrick et al. | |
| 5,280,498 A | 1/1994 | Tymes et al. | |
| 5,285,278 A | 2/1994 | Holman | |
| 5,287,181 A | 2/1994 | Holman | |
| 5,288,976 A * | 2/1994 | Citron et al. | 235/375 |
| 5,296,688 A | 3/1994 | Hamilton et al. | |
| 5,304,786 A | 4/1994 | Pavlidis et al. | |
| 5,305,195 A | 4/1994 | Murphy | |
| 5,319,454 A | 6/1994 | Schutte | |
| 5,319,455 A | 6/1994 | Hoarty et al. | |
| 5,324,922 A | 6/1994 | Roberts | |
| 5,331,547 A | 7/1994 | Laszlo | |
| 5,340,966 A | 8/1994 | Morimoto | |
| 5,341,505 A | 8/1994 | Whitehouse | |
| 5,349,678 A | 9/1994 | Morris et al. | |
| 5,354,977 A | 10/1994 | Roustaei | |
| 5,355,146 A * | 10/1994 | Chiu et al. | 345/156 |
| 5,357,276 A | 10/1994 | Banker et al. | |
| 5,359,367 A | 10/1994 | Stockill | |
| 5,361,871 A | 11/1994 | Gupta et al. | |
| 5,362,948 A | 11/1994 | Morimoto | |
| 5,372,334 A | 12/1994 | Cuadros | |
| 5,377,323 A | 12/1994 | Vasudevan | |
| 5,382,779 A | 1/1995 | Gupta | |
| 5,386,298 A | 1/1995 | Bronnenberg et al. | |
| 5,398,336 A | 3/1995 | Tantry et al. | |
| 5,405,232 A | 4/1995 | Lloyd et al. | |
| 5,418,713 A | 5/1995 | Allen | |
| 5,420,403 A | 5/1995 | Allum et al. | |
| 5,420,943 A | 5/1995 | Mak | |
| 5,424,524 A | 6/1995 | Ruppert et al. | |
| 5,426,427 A | 6/1995 | Chinnock et al. | |
| 5,431,250 A | 7/1995 | Schlamp | |
| 5,438,355 A | 8/1995 | Palmer | |
| 5,442,749 A | 8/1995 | Northcutt et al. | |
| 5,446,490 A | 8/1995 | Blahut et al. | |
| 5,446,919 A | 8/1995 | Wilkins | |
| 5,457,307 A | 10/1995 | Dumont | |
| 5,465,291 A | 11/1995 | Barrus et al. | |
| 5,483,052 A | 1/1996 | Smith et al. | |
| 5,483,640 A | 1/1996 | Isfeld et al. | |
| 5,491,495 A | 2/1996 | Ward et al. | |
| 5,491,508 A | 2/1996 | Friedell et al. | |
| 5,493,107 A | 2/1996 | Gupta et al. | |
| 5,507,009 A | 4/1996 | Grube et al. | |
| 5,519,878 A | 5/1996 | Dolin, Jr. | |
| 5,523,982 A | 6/1996 | Dale | |
| 5,530,852 A | 6/1996 | Meske, Jr. et al. | |
| 5,532,773 A | 7/1996 | Shaw et al. | |
| 5,548,110 A | 8/1996 | Storch et al. | |
| 5,563,630 A | 10/1996 | Tsakiris et al. | |
| 5,570,295 A | 10/1996 | Isenberg et al. | |
| 5,572,643 A | 11/1996 | Judson | |
| 5,578,818 A | 11/1996 | Kain et al. | |
| 5,579,124 A | 11/1996 | Aijala et al. | |
| 5,586,313 A | 12/1996 | Schnittket et al. | |
| 5,590,197 A | 12/1996 | Chen et al. | |
| 5,592,551 A | 1/1997 | Lett et al. | |
| 5,594,226 A | 1/1997 | Steger | |
| 5,595,264 A | 1/1997 | Trotta, Jr. | |
| 5,600,779 A | 2/1997 | Palmer et al. | |
| 5,602,377 A | 2/1997 | Beller et al. | |
| 5,604,542 A | 2/1997 | Dedrick | |
| 5,621,203 A | 4/1997 | Swartz et al. | |
| 5,633,484 A | 5/1997 | Zancho et al. | |
| 5,633,489 A | 5/1997 | Dvorkis et al. | |
| 5,636,346 A | 6/1997 | Saxe | |
| 5,640,002 A | 6/1997 | Ruppert et al. | |
| 5,640,193 A | 6/1997 | Wellner | |
| 5,646,390 A | 7/1997 | Wang et al. | |
| 5,649,186 A | 7/1997 | Ferguson | |
| 5,659,800 A | 8/1997 | Zhang et al. | |
| 5,664,110 A | 9/1997 | Green et al. | |
| 5,666,293 A | 9/1997 | Metz et al. | |
| 5,671,226 A | 9/1997 | Murakami et al. | |
| 5,671,282 A | 9/1997 | Wolff et al. | |
| 5,673,322 A | 9/1997 | Pepe et al. | |
| 5,675,721 A | 10/1997 | Freedman et al. | |
| 5,682,540 A | 10/1997 | Klotz, Jr. et al. | |
| 5,687,331 A | 11/1997 | Volk et al. | |
| 5,694,163 A | 12/1997 | Harrison | |
| 5,701,161 A | 12/1997 | Williams et al. | |
| 5,704,029 A | 12/1997 | Wright, Jr. | |
| 5,708,478 A | 1/1998 | Tognazzini | |
| 5,708,780 A | 1/1998 | Levergood et al. | |

| | | | | | |
|---|---|---|---|---|---|
| 5,710,887 A | 1/1998 | Chelliah et al. | 5,872,588 A | 2/1999 | Aras et al. |
| 5,715,314 A | 2/1998 | Payne et al. | 5,874,722 A | 2/1999 | Rando et al. |
| 5,721,848 A | 2/1998 | Joseph | 5,875,327 A | 2/1999 | Brandt et al. |
| 5,724,424 A | 3/1998 | Gifford | 5,875,415 A | 2/1999 | Lieb et al. |
| 5,726,898 A | 3/1998 | Jacobs | 5,880,769 A | 3/1999 | Nemirofsky et al. |
| 5,729,002 A | 3/1998 | Samples | 5,884,014 A | 3/1999 | Huttenlocher et al. |
| 5,732,218 A | 3/1998 | Bland et al. | 5,886,634 A | 3/1999 | Muhme |
| 5,734,413 A | 3/1998 | Lappington et al. | 5,887,176 A | 3/1999 | Griffith et al. |
| 5,737,532 A | 4/1998 | DeLair et al. | 5,887,243 A | 3/1999 | Harvey et al. |
| 5,737,619 A | 4/1998 | Judson | 5,894,516 A | 4/1999 | Brandenburg |
| 5,740,369 A | 4/1998 | Yokozawa et al. | 5,903,225 A | 5/1999 | Schmitt et al. |
| 5,742,825 A | 4/1998 | Mathur et al. | 5,903,721 A | 5/1999 | Sixtus |
| 5,745,681 A | 4/1998 | Levine et al. | 5,905,248 A | 5/1999 | Russell et al. |
| 5,746,602 A | 5/1998 | Kikinis | 5,905,251 A | 5/1999 | Knowles |
| 5,751,956 A | 5/1998 | Kursch | 5,905,521 A | 5/1999 | Gatto et al. |
| 5,754,906 A | 5/1998 | Yoshida | 5,905,665 A | 5/1999 | Rim |
| 5,754,981 A | 5/1998 | Veeneman et al. | 5,905,865 A | 5/1999 | Palmer et al. |
| 5,757,917 A | 5/1998 | Rose et al. | 5,907,322 A | 5/1999 | Kelly et al. |
| 5,758,257 A | 5/1998 | Herz et al. | 5,907,793 A | 5/1999 | Reams |
| 5,761,606 A | 6/1998 | Wolzien | 5,909,183 A | 6/1999 | Borgstahl et al. |
| 5,761,648 A | 6/1998 | Golden et al. | 5,912,454 A | 6/1999 | Castillo et al. |
| 5,764,906 A | 6/1998 | Edelstein et al. | 5,913,210 A | 6/1999 | Call |
| 5,765,176 A | 6/1998 | Bloomberg | 5,915,090 A | 6/1999 | Joseph et al. |
| 5,768,508 A | 6/1998 | Eikeland | 5,916,024 A | 6/1999 | Von Kohorn |
| 5,768,528 A | 6/1998 | Stumm | 5,917,725 A | 6/1999 | Thacher et al. |
| 5,768,539 A | 6/1998 | Metz et al. | 5,918,211 A | 6/1999 | Sloane |
| 5,768,583 A | 6/1998 | Orzol et al. | 5,918,213 A | 6/1999 | Bernard et al. |
| 5,774,170 A | 6/1998 | Hite et al. | 5,918,214 A | 6/1999 | Perkowski |
| 5,774,534 A | 6/1998 | Mayer | 5,923,735 A | 7/1999 | Swartz et al. |
| 5,774,660 A | 6/1998 | Brendel et al. | 5,923,806 A | 7/1999 | Sugawara |
| 5,774,664 A | 6/1998 | Hidary et al. | 5,925,865 A | 7/1999 | Steger |
| 5,774,666 A | 6/1998 | Portuesi | 5,929,849 A | 7/1999 | Kikinis |
| 5,774,870 A | 6/1998 | Storey | 5,929,850 A | 7/1999 | Broadwin et al. |
| 5,774,874 A | 6/1998 | Veeneman et al. | 5,930,767 A | 7/1999 | Reber et al. |
| 5,778,181 A | 7/1998 | Hidary et al. | 5,932,863 A | 8/1999 | Rathus et al. |
| 5,778,367 A | 7/1998 | Wesinger, Jr. et al. | 5,933,811 A | 8/1999 | Angles et al. |
| 5,786,585 A | 7/1998 | Eastman et al. | 5,933,829 A | 8/1999 | Durst et al. |
| 5,787,246 A | 7/1998 | Lichtman et al. | 5,935,004 A | 8/1999 | Tarr et al. |
| 5,790,793 A | 8/1998 | Higley | 5,937,163 A | 8/1999 | Lee et al. |
| 5,791,991 A | 8/1998 | Small | 5,938,726 A | 8/1999 | Reber et al. |
| 5,794,210 A | 8/1998 | Goldhaber et al. | 5,938,727 A | 8/1999 | Ikeda |
| 5,796,952 A | 8/1998 | Davis et al. | 5,940,073 A | 8/1999 | Klosternan et al. |
| 5,801,067 A | 9/1998 | Shaw et al. | 5,943,432 A | 8/1999 | Gilmore et al. |
| 5,804,803 A | 9/1998 | Cragun et al. | 5,944,791 A | 8/1999 | Scherpbier |
| 5,805,154 A | 9/1998 | Brown | 5,946,103 A | 8/1999 | Curry |
| 5,805,806 A | 9/1998 | McArthur | 5,947,746 A | 9/1999 | Tsai |
| 5,806,044 A | 9/1998 | Powell | 5,948,061 A | 9/1999 | Merriman et al. |
| 5,812,776 A | 9/1998 | Gifford | 5,950,173 A | 9/1999 | Perkowski |
| 5,815,776 A | 9/1998 | Nukada | 5,951,639 A | 9/1999 | MacInnis |
| 5,818,438 A | 10/1998 | Howe et al. | 5,956,699 A | 9/1999 | Wong et al. |
| 5,818,440 A | 10/1998 | Allibhoy et al. | 5,957,695 A | 9/1999 | Redford et al. |
| 5,818,441 A | 10/1998 | Throckmorton et al. | 5,959,275 A | 9/1999 | Hughes et al. |
| 5,818,935 A | 10/1998 | Maa | 5,960,411 A | 9/1999 | Hartman et al. |
| 5,822,436 A | 10/1998 | Rhoads | 5,961,603 A | 10/1999 | Kunkel et al. |
| 5,825,009 A | 10/1998 | Schmid et al. | 5,963,916 A | 10/1999 | Kaplan |
| 5,826,000 A | 10/1998 | Hamilton | 5,963,926 A | 10/1999 | Kumomura |
| 5,826,064 A | 10/1998 | Loring et al. | 5,970,469 A | 10/1999 | Scroggie et al. |
| 5,826,166 A | 10/1998 | Brooks et al. | 5,970,471 A | 10/1999 | Hill |
| 5,831,261 A | 11/1998 | Plesko | 5,970,472 A | 10/1999 | Allsop et al. |
| 5,832,223 A | 11/1998 | Hara et al. | 5,971,277 A | 10/1999 | Cragun et al. |
| 5,832,432 A | 11/1998 | Trader et al. | 5,973,684 A | 10/1999 | Brooks et al. |
| 5,832,449 A | 11/1998 | Cunningham | 5,974,443 A | 10/1999 | Jeske |
| 5,833,468 A | 11/1998 | Guy et al. | 5,974,451 A | 10/1999 | Simmons |
| 5,835,861 A | 11/1998 | Whiteside | 5,976,833 A | 11/1999 | Furukawa et al. |
| 5,835,911 A | 11/1998 | Nakagawa et al. | 5,978,773 A | 11/1999 | Hudetz et al. |
| 5,842,178 A | 11/1998 | Giovannoli | 5,979,757 A | 11/1999 | Tracy et al. |
| 5,848,202 A | 12/1998 | D'Eri et al. | 5,986,651 A | 11/1999 | Reber et al. |
| 5,848,292 A | 12/1998 | Nathan | 5,987,507 A | 11/1999 | Creedon et al. |
| 5,848,397 A | 12/1998 | Marsh et al. | 5,987,509 A | 11/1999 | Portuesi |
| 5,848,413 A | 12/1998 | Wolff | 5,991,601 A | 11/1999 | Anderso |
| 5,848,426 A | 12/1998 | Wang et al. | 5,991,739 A | 11/1999 | Cupps et al. |
| 5,850,187 A | 12/1998 | Carrender et al. | 5,991,749 A | 11/1999 | Morrill, Jr. |
| 5,854,897 A | 12/1998 | Radziewicz et al. | 5,992,744 A | 11/1999 | Smith et al. |
| 5,854,945 A | 12/1998 | Criscito et al. | 5,992,752 A | 11/1999 | Wilz, Sr. et al. |
| 5,862,452 A | 1/1999 | Cudak et al. | 5,995,105 A | 11/1999 | Reber et al. |
| 5,864,823 A | 1/1999 | Levitan | 5,995,965 A | 11/1999 | Experton |
| 5,867,730 A | 2/1999 | Leyda | 5,996,022 A | 11/1999 | Krueger et al. |
| 5,869,819 A | 2/1999 | Knowles et al. | 5,996,896 A | 12/1999 | Grabon |
| 5,870,546 A | 2/1999 | Kirsch | 5,999,996 A | 12/1999 | Dunn |

| | | | | | | |
|---|---|---|---|---|---|---|
| 6,002,394 A | 12/1999 | Schein et al. | | 6,149,063 A | 11/2000 | Reynolds et al. |
| 6,002,852 A | 12/1999 | Birdwell et al. | | 6,151,624 A | 11/2000 | Teare et al. |
| 6,002,946 A | 12/1999 | Reber et al. | | 6,152,369 A | 11/2000 | Wilz, Sr. et al. |
| 6,003,014 A | 12/1999 | Lee et al. | | 6,154,738 A | 11/2000 | Call |
| 6,003,073 A | 12/1999 | Solvason | | 6,154,771 A | 11/2000 | Rangan et al. |
| 6,005,939 A | 12/1999 | Fortenberry et al. | | 6,161,132 A | 12/2000 | Roberts et al. |
| 6,006,257 A | 12/1999 | Slezak | | 6,163,803 A | 12/2000 | Watanabe |
| 6,009,274 A | 12/1999 | Fletcher et al. | | 6,167,567 A | 12/2000 | Chiles et al. |
| 6,009,410 A | 12/1999 | LeMole et al. | | 6,169,484 B1 | 1/2001 | Schuchman et al. |
| 6,009,465 A | 12/1999 | Decker et al. | | 6,170,746 B1 | 1/2001 | Brook et al. |
| 6,012,038 A | 1/2000 | Powell | | 6,177,860 B1 | 1/2001 | Cromer et al. |
| 6,012,045 A | 1/2000 | Barzilai et al. | | 6,178,443 B1 | 1/2001 | Lin |
| 6,012,102 A | 1/2000 | Shachar | | 6,181,351 B1 | 1/2001 | Merrill et al. |
| 6,014,090 A | 1/2000 | Rosen et al. | | 6,185,542 B1 | 2/2001 | Moran et al. |
| 6,014,634 A | 1/2000 | Scroggie et al. | | 6,185,589 B1 | 2/2001 | Votipka |
| 6,014,641 A | 1/2000 | Loeb et al. | | 6,188,398 B1 | 2/2001 | Collins-Rector et al. |
| 6,014,701 A | 1/2000 | Chaddha | | 6,189,050 B1 | 2/2001 | Sakarda |
| 6,015,167 A | 1/2000 | Savino et al. | | 6,192,380 B1 | 2/2001 | Light et al. |
| 6,018,764 A | 1/2000 | Field et al. | | 6,192,400 B1 | 2/2001 | Hanson et al. |
| 6,023,255 A | 2/2000 | Bell | | 6,195,420 B1 | 2/2001 | Tognazzini |
| 6,024,641 A | 2/2000 | Sarno | | 6,195,693 B1 | 2/2001 | Berry et al. |
| 6,026,376 A | 2/2000 | Kenney et al. | | 6,199,048 B1 * | 3/2001 | Hudetz et al. ................... 705/23 |
| 6,029,045 A | 2/2000 | Picco et al. | | 6,199,079 B1 | 3/2001 | Gupta et al. |
| 6,029,196 A | 2/2000 | Lenz | | 6,202,054 B1 | 3/2001 | Lawlor et al. |
| 6,032,195 A | 2/2000 | Reber et al. | | 6,202,062 B1 | 3/2001 | Cameron et al. |
| 6,037,928 A | 3/2000 | Nachinson et al. | | 6,220,509 B1 | 4/2001 | Byford |
| 6,037,934 A | 3/2000 | Himmel et al. | | 6,223,029 B1 | 4/2001 | Stenman et al. |
| 6,038,366 A | 3/2000 | Ohno et al. | | 6,226,618 B1 | 5/2001 | Downs et al. |
| 6,044,362 A | 3/2000 | Neely | | 6,230,325 B1 | 5/2001 | Iinuma et al. |
| 6,045,048 A | 4/2000 | Wilz et al. | | 6,233,565 B1 | 5/2001 | Lewis et al. |
| 6,049,539 A | 4/2000 | Lee et al. | | 6,233,736 B1 | 5/2001 | Wolzien |
| 6,049,870 A | 4/2000 | Greaves | | 6,236,836 B1 | 5/2001 | Westman et al. |
| 6,055,573 A | 4/2000 | Gardenswartz et al. | | 6,237,025 B1 | 5/2001 | Ludwig et al. |
| 6,061,368 A | 5/2000 | Bendinelle et al. | | 6,238,290 B1 | 5/2001 | Tarr et al. |
| 6,061,440 A | 5/2000 | Delaney et al. | | 6,240,448 B1 | 5/2001 | Imielinski et al. |
| 6,061,646 A | 5/2000 | Martino et al. | | 6,243,814 B1 | 6/2001 | Matena |
| 6,061,660 A | 5/2000 | Eggleston et al. | | 6,247,047 B1 | 6/2001 | Wolff |
| 6,061,719 A | 5/2000 | Bendinelli et al. | | 6,247,128 B1 | 6/2001 | Fisher et al. |
| 6,064,804 A | 5/2000 | Brink et al. | | 6,249,810 B1 | 6/2001 | Kiraly |
| 6,064,929 A | 5/2000 | Migues et al. | | 6,251,016 B1 | 6/2001 | Tsuda et al. |
| 6,064,979 A | 5/2000 | Perkowski | | 6,251,017 B1 | 6/2001 | Leason et al. |
| 6,067,526 A | 5/2000 | Powell | | 6,256,498 B1 | 7/2001 | Ludwig |
| 6,070,147 A | 5/2000 | Harms et al. | | 6,256,732 B1 | 7/2001 | Cromer et al. |
| 6,070,160 A | 5/2000 | Geary | | 6,260,023 B1 | 7/2001 | Seevers et al. |
| 6,070,798 A | 6/2000 | Nethery | | 6,260,763 B1 * | 7/2001 | Svetal ................... 235/462.22 |
| 6,073,119 A | 6/2000 | Bornemisza-Wahr et al. | | 6,263,383 B1 | 7/2001 | Lee et al. |
| 6,073,851 A | 6/2000 | Olmstead et al. | | 6,278,717 B1 | 8/2001 | Arsenault et al. |
| 6,076,166 A | 6/2000 | Moshfeghi et al. | | 6,279,830 B1 | 8/2001 | Ishibashi |
| 6,076,733 A | 6/2000 | Wilz, Sr. et al. | | 6,282,522 B1 | 8/2001 | Davis et al. |
| 6,078,321 A | 6/2000 | Simonoff et al. | | 6,282,713 B1 | 8/2001 | Kitsukawa et al. |
| 6,081,629 A | 6/2000 | Browning | | 6,290,131 B1 | 9/2001 | Kolis et al. |
| 6,084,523 A | 7/2000 | Gelnovatch et al. | | 6,292,786 B1 | 9/2001 | Deaton et al. |
| 6,085,146 A | 7/2000 | Kuribayashi et al. | | 6,297,727 B1 | 10/2001 | Nelson, Jr. |
| 6,085,247 A | 7/2000 | Parsons, Jr. et al. | | 6,297,819 B1 | 10/2001 | Furst |
| 6,097,375 A | 8/2000 | Byford | | 6,298,373 B1 | 10/2001 | Burns et al. |
| 6,098,106 A | 8/2000 | Philyaw et al. | | 6,300,872 B1 | 10/2001 | Mathias et al. |
| 6,101,483 A | 8/2000 | Petrovich et al. | | 6,301,012 B1 | 10/2001 | White et al. |
| 6,104,845 A | 8/2000 | Lipman et al. | | 6,301,612 B1 | 10/2001 | Selitrennikoff et al. |
| 6,108,656 A | 8/2000 | Durst et al. | | 6,308,893 B1 | 10/2001 | Waxelbaum et al. |
| 6,108,706 A | 8/2000 | Birdwell et al. | | 6,311,165 B1 | 10/2001 | Coutts et al. |
| 6,112,323 A | 8/2000 | Meizlik et al. | | 6,311,185 B1 | 10/2001 | Markowitz et al. |
| 6,112,981 A | 9/2000 | McCall | | 6,311,214 B1 | 10/2001 | Rhoads |
| 6,114,712 A | 9/2000 | Dvorkis et al. | | 6,311,896 B1 | 11/2001 | Mulla et al. |
| 6,119,944 A | 9/2000 | Mulla et al. | | 6,314,451 B1 | 11/2001 | Landsman et al. |
| 6,122,403 A | 9/2000 | Rhoads | | 6,314,456 B1 | 11/2001 | Van Andel et al. |
| 6,122,740 A | 9/2000 | Andersen | | 6,317,761 B1 | 11/2001 | Landsman et al. |
| 6,123,259 A | 9/2000 | Ogasawara | | 6,317,780 B1 | 11/2001 | Cohn et al. |
| 6,123,263 A | 9/2000 | Feng | | 6,317,789 B1 | 11/2001 | Rakavy et al. |
| 6,131,116 A | 10/2000 | Riggins et al. | | 6,317,791 B1 | 11/2001 | Cohn et al. |
| 6,133,849 A | 10/2000 | McConnell et al. | | 6,317,885 B1 | 11/2001 | Fries |
| 6,134,532 A | 10/2000 | Lazarus et al. | | 6,321,991 B1 | 11/2001 | Knowles |
| 6,134,548 A | 10/2000 | Gottsman et al. | | 6,321,992 B1 | 11/2001 | Knowles et al. |
| 6,134,616 A | 10/2000 | Beatty | | 6,324,519 B1 | 11/2001 | Eldering |
| 6,138,036 A | 10/2000 | O'Cinneide | | 6,327,574 B1 | 12/2001 | Kramer et al. |
| 6,138,155 A | 10/2000 | Davis et al. | | 6,328,213 B1 | 12/2001 | He et al. |
| 6,144,848 A | 11/2000 | Walsh et al. | | 6,330,543 B1 | 12/2001 | Kepecs |
| 6,148,301 A | 11/2000 | Rosenthal | | 6,330,593 B1 | 12/2001 | Roberts et al. |
| 6,148,331 A | 11/2000 | Parry | | 6,330,595 B1 | 12/2001 | Ullman et al. |
| 6,148,405 A | 11/2000 | Liao et al. | | 6,330,669 B1 | 12/2001 | McKeeth |

| Patent | Date | Inventor |
|---|---|---|
| 6,330,715 B1 | 12/2001 | Razzaghe-Ashrafi |
| 6,331,972 B1 | 12/2001 | Harris et al. |
| 6,334,113 B1 | 12/2001 | Walker et al. |
| 6,336,152 B1 | 1/2002 | Richman et al. |
| 6,337,717 B1 | 1/2002 | Nason et al. |
| 6,338,094 B1 | 1/2002 | Scott et al. |
| 6,343,276 B1 | 1/2002 | Barnett |
| 6,351,467 B1 | 2/2002 | Dillon |
| 6,351,640 B1 | 2/2002 | DeMont |
| 6,353,898 B1 | 3/2002 | Wipfel et al. |
| 6,353,926 B1 | 3/2002 | Parthesarathy et al. |
| 6,353,929 B1 | 3/2002 | Houston |
| 6,356,876 B1 | 3/2002 | Lingham |
| 6,356,949 B1 | 3/2002 | Katsandres et al. |
| 6,357,042 B2 | 3/2002 | Srinivasan et al. |
| 6,359,711 B1 | 3/2002 | Cole et al. |
| 6,368,177 B1 | 4/2002 | Gabai et al. |
| 6,374,237 B1 | 4/2002 | Reese |
| 6,374,402 B1 | 4/2002 | Schmeidler et al. |
| 6,377,690 B1 | 4/2002 | Witschorik |
| 6,377,930 B1 | 4/2002 | Chen et al. |
| 6,377,983 B1 | 4/2002 | Cohen et al. |
| 6,377,986 B1 | 4/2002 | Philyaw et al. |
| 6,381,632 B1 | 4/2002 | Lowell |
| 6,384,744 B1 | 5/2002 | Philyaw et al. |
| 6,386,454 B2 | 5/2002 | Hecht et al. |
| 6,389,409 B1 | 5/2002 | Horovitz et al. |
| 6,389,464 B1 | 5/2002 | Krishnamurthy et al. |
| 6,393,297 B1 | 5/2002 | Song |
| 6,394,354 B1 | 5/2002 | Wilz et al. |
| 6,398,106 B1 | 6/2002 | Ulvr et al. |
| 6,400,272 B1 | 6/2002 | Holtzman et al. |
| 6,400,407 B1 | 6/2002 | Zigmond et al. |
| 6,401,059 B1 | 6/2002 | Shen et al. |
| 6,401,077 B1 | 6/2002 | Godden et al. |
| 6,404,435 B1 | 6/2002 | Miller et al. |
| 6,405,049 B2 | 6/2002 | Herrod et al. |
| 6,412,699 B1 | 7/2002 | Russell et al. |
| 6,415,438 B1 | 7/2002 | Blackketter et al. |
| 6,415,439 B1 | 7/2002 | Randell et al. |
| 6,415,983 B1 | 7/2002 | Ulvr et al. |
| 6,418,441 B1 | 7/2002 | Call |
| 6,418,555 B2 | 7/2002 | Mohammed |
| 6,421,445 B1 | 7/2002 | Jensen et al. |
| 6,421,732 B1 | 7/2002 | Alkhatib et al. |
| 6,424,249 B1 | 7/2002 | Houvener |
| 6,427,238 B1 | 7/2002 | Goodman et al. |
| 6,430,554 B1 | 8/2002 | Rothschild |
| 6,430,743 B1 | 8/2002 | Matsuura |
| 6,434,530 B1 | 8/2002 | Sloane et al. |
| 6,442,529 B1 | 8/2002 | Krishan et al. |
| 6,442,530 B1 | 8/2002 | Miller |
| 6,446,049 B1 | 9/2002 | Janning et al. |
| 6,446,119 B1 | 9/2002 | Olah et al. |
| 6,446,871 B1 | 9/2002 | Buckley et al. |
| 6,449,518 B1 | 9/2002 | Yokoo et al. |
| 6,459,439 B1 | 10/2002 | Ahlquist et al. |
| 6,460,093 B1 | 10/2002 | Taugher |
| 6,463,416 B1 | 10/2002 | Messina |
| 6,463,420 B1 | 10/2002 | Guidice et al. |
| 6,469,689 B1 | 10/2002 | Dow et al. |
| 6,484,022 B1 | 11/2002 | Findikli et al. |
| 6,484,149 B1 | 11/2002 | Jammes et al. |
| 6,484,198 B1 | 11/2002 | Milovanovic et al. |
| 6,487,538 B1 | 11/2002 | Gupta et al. |
| 6,487,719 B1 | 11/2002 | Itoh et al. |
| 6,490,601 B1 | 12/2002 | Markus et al. |
| 6,490,637 B1 | 12/2002 | Shih |
| 6,493,770 B1 | 12/2002 | Sartore et al. |
| 6,496,858 B1 | 12/2002 | Frailong et al. |
| 6,496,981 B1 | 12/2002 | Wistendahl et al. |
| 6,501,854 B1 | 12/2002 | Konishi et al. |
| 6,502,242 B1 | 12/2002 | Howe et al. |
| 6,504,626 B1 | 1/2003 | Shih |
| 6,510,997 B1 | 1/2003 | Wilz et al. |
| 6,512,522 B1 | 1/2003 | Miller et al. |
| 6,513,717 B2 | 2/2003 | Hannigan |
| 6,517,002 B1 | 2/2003 | Piatek |
| 6,519,463 B2 | 2/2003 | Tendler |
| 6,526,449 B1 | 2/2003 | Philyaw et al. |
| 6,536,666 B1 | 3/2003 | Hudrick |
| 6,536,670 B1 | 3/2003 | Postman et al. |
| 6,540,144 B1 | 4/2003 | Hudrick et al. |
| 6,542,874 B1 | 4/2003 | Walker et al. |
| 6,542,933 B1 | 4/2003 | Durst et al. |
| 6,542,943 B2 | 4/2003 | Cheng et al. |
| 6,543,052 B1 | 4/2003 | Ogasawara |
| 6,546,418 B2 | 4/2003 | Schena et al. |
| 6,560,640 B2 | 5/2003 | Smethers |
| 6,577,861 B2 | 6/2003 | Ogasawara |
| 6,577,877 B1 | 6/2003 | Charlier et al. |
| 6,580,870 B1 | 6/2003 | Kanazawa et al. |
| 6,581,838 B1 | 6/2003 | Meksavan et al. |
| 6,584,459 B1 | 6/2003 | Chang et al. |
| 6,587,835 B1 | 7/2003 | Treyz et al. |
| 6,591,247 B2 | 7/2003 | Stern |
| 6,594,705 B1 | 7/2003 | Philyaw |
| 6,595,859 B2 | 7/2003 | Lynn |
| 6,600,418 B2 | 7/2003 | Francis et al. |
| 6,600,496 B1 | 7/2003 | Wagner et al. |
| 6,600,725 B1 | 7/2003 | Roy |
| 6,601,172 B1 | 7/2003 | Epstein |
| 6,604,242 B1 | 8/2003 | Weinstein et al. |
| 6,604,681 B1 | 8/2003 | Burke et al. |
| 6,612,495 B2 | 9/2003 | Reddersen et al. |
| 6,615,268 B1 | 9/2003 | Philyaw et al. |
| 6,616,056 B2 | 9/2003 | Cato |
| 6,622,165 B1 | 9/2003 | Philyaw |
| 6,625,581 B1 | 9/2003 | Perkowski |
| 6,636,896 B1 | 10/2003 | Philyaw |
| 6,637,028 B1 | 10/2003 | Voyticky et al. |
| 6,645,068 B1 | 11/2003 | Kelly et al. |
| 6,661,904 B1 | 12/2003 | Sasich et al. |
| 6,665,836 B1 | 12/2003 | Wynblatt et al. |
| 6,668,133 B2 | 12/2003 | Yuen et al. |
| 6,668,293 B2 | 12/2003 | Chen et al. |
| 6,678,866 B1 | 1/2004 | Sugimoto et al. |
| 6,686,910 B2 | 2/2004 | O'Donnell, Jr. |
| 6,688,522 B1 | 2/2004 | Philyaw et al. |
| 6,697,949 B1 | 2/2004 | Philyaw et al. |
| 6,701,354 B1 | 3/2004 | Philyaw et al. |
| 6,701,369 B1 | 3/2004 | Philyaw |
| 6,701,524 B1 | 3/2004 | Okamura et al. |
| 6,704,864 B1 | 3/2004 | Philyaw |
| 6,708,208 B1 | 3/2004 | Philyaw |
| 6,725,260 B1 | 4/2004 | Philyaw |
| 6,725,461 B1 | 4/2004 | Dougherty et al. |
| 6,738,978 B1 | 5/2004 | Hendricks et al. |
| 6,741,574 B2 | 5/2004 | Arsenault |
| 6,745,234 B1 | 6/2004 | Philyaw et al. |
| 6,748,278 B1 | 6/2004 | Maymudes |
| 6,753,883 B2 | 6/2004 | Schena et al. |
| 6,758,398 B1 | 7/2004 | Philyaw et al. |
| 6,778,096 B1 | 8/2004 | Ward et al. |
| 6,779,178 B1 | 8/2004 | Lloyd et al. |
| 6,785,659 B1 | 8/2004 | Landsman et al. |
| 6,791,588 B1 | 9/2004 | Gifford |
| 6,792,452 B1 | 9/2004 | Philyaw |
| 6,792,618 B1 | 9/2004 | Bendinelli et al. |
| 6,806,808 B1 | 10/2004 | Watters et al. |
| 6,813,608 B1 | 11/2004 | Baranowski |
| 6,813,776 B2 | 11/2004 | Chernock et al. |
| 6,816,894 B1 | 11/2004 | Philyaw et al. |
| 6,823,366 B1 | 11/2004 | Nakano |
| 6,826,775 B1 | 11/2004 | Howe et al. |
| 6,829,646 B1 | 12/2004 | Philyaw et al. |
| 6,829,650 B1 | 12/2004 | Philyaw et al. |
| 6,832,729 B1 | 12/2004 | Perry et al. |
| 6,836,799 B1 | 12/2004 | Philyaw et al. |
| 6,837,436 B2 | 1/2005 | Swartz et al. |
| 6,843,417 B1 | 1/2005 | Philyaw et al. |
| 6,845,388 B1 | 1/2005 | Philyaw |
| 6,857,131 B1 | 2/2005 | Yagawa et al. |
| 6,859,699 B2 | 2/2005 | Carroll et al. |
| 6,877,032 B1 | 4/2005 | Philyaw |
| 6,886,013 B1 | 4/2005 | Beranek |
| 6,886,178 B1 | 4/2005 | Mao et al. |
| 6,892,226 B1 | 5/2005 | Tso et al. |

| | | | |
|---|---|---|---|
| 6,961,555 | B1 | 11/2005 | Philyaw |
| 6,961,712 | B1 | 11/2005 | Perkowski |
| 6,970,916 | B1 | 11/2005 | Philyaw |
| 6,985,954 | B1 | 1/2006 | Philyaw et al. |
| 6,988,248 | B1 | 1/2006 | Tang et al. |
| 6,990,680 | B1 | 1/2006 | Wugofski |
| 7,069,582 | B2 | 6/2006 | Philyaw et al. |
| 7,092,768 | B1 | 8/2006 | Labuda |
| 7,110,981 | B1 | 9/2006 | Sidikman et al. |
| 7,159,037 | B1 | 1/2007 | Philyaw et al. |
| 7,194,259 | B2 | 3/2007 | DeLine |
| 7,200,865 | B1 | 4/2007 | Roscoe et al. |
| 7,272,155 | B2 | 9/2007 | Kenney et al. |
| 7,308,483 | B2 | 12/2007 | Philyaw |
| 7,328,045 | B2 | 2/2008 | Funk et al. |
| 7,370,114 | B1 | 5/2008 | Philyaw et al. |
| 7,421,728 | B2 | 9/2008 | Zigmond et al. |
| 7,533,177 | B2 * | 5/2009 | Philyaw et al. ............... 709/227 |
| 2001/0011276 | A1 * | 8/2001 | Durst Jr. et al. ................. 707/10 |
| 2001/0024189 | A1 * | 9/2001 | Michie ........................... 345/156 |
| 2002/0016770 | A1 | 2/2002 | Flenley et al. |
| 2002/0059139 | A1 | 5/2002 | Evans |
| 2002/0059241 | A1 | 5/2002 | Van Ryzin |

FOREIGN PATENT DOCUMENTS

| | | |
|---|---|---|
| DE | 19951881 | 5/2001 |
| EP | 0152341 | 8/1985 |
| EP | 0399200 A2 | 4/1990 |
| EP | 0569311 | 10/1993 |
| EP | 0601437 A1 | 6/1994 |
| EP | 0837406 | 4/1998 |
| EP | 0905984 A2 | 9/1998 |
| EP | 0921481 | 11/1998 |
| EP | 0889413 | 7/1999 |
| EP | 0927945 A2 | 7/1999 |
| EP | 0961250 | 12/1999 |
| GB | 2 307 628 A | 5/1997 |
| JP | 63276672 A | 11/1988 |
| JP | 10188140 | 12/1996 |
| JP | 9162818 | 6/1997 |
| JP | 10078928 | 3/1998 |
| JP | 10124428 | 5/1998 |
| JP | 10134117 | 5/1998 |
| JP | 10171758 | 6/1998 |
| JP | 10188140 | 7/1998 |
| JP | 11154131 | 6/1999 |
| NL | 1016278 | 3/2002 |
| WO | WO 91/03891 | 3/1991 |
| WO | WO 93/14476 | 7/1993 |
| WO | WO 95/10813 | 4/1995 |
| WO | WO 95/28044 | 10/1995 |
| WO | WO 96/07146 | 3/1996 |
| WO | WO 97/01137 A | 1/1997 |
| WO | WO 97/02074 | 1/1997 |
| WO | WO 97/37319 | 2/1997 |
| WO | WO 97/26061 | 6/1997 |
| WO | WO 97/33434 A1 | 9/1997 |
| WO | WO 98/03923 | 1/1998 |
| WO | WO 98/06055 | 2/1998 |
| WO | WO 98/08243 | 2/1998 |
| WO | WO 98/09243 | 3/1998 |
| WO | WO 98/19259 | 5/1998 |
| WO | WO 98/26548 | 6/1998 |
| WO | WO 98/38761 | 9/1998 |
| WO | WO 98/40823 | 9/1998 |
| WO | WO 98/41020 | 9/1998 |
| WO | WO 98/49813 | 11/1998 |
| WO | WO 98/53611 | 11/1998 |
| WO | WO 98/57490 | 12/1998 |
| WO | WO 99/00979 | 1/1999 |
| WO | WO 99/15968 | 4/1999 |
| WO | WO 99/21109 | 4/1999 |
| WO | WO 99/63457 | 6/1999 |
| WO | WO 99/38321 | 7/1999 |
| WO | WO 00/09229 | 2/2000 |
| WO | WO 00/16205 | 3/2000 |
| WO | WO 00/54182 A1 | 9/2000 |
| WO | WO 00/56072 | 9/2000 |

OTHER PUBLICATIONS

Postel, J., Ed., A Memo from the Internet Architecture Board entitled, "Internet Official Protocol Standards." <ftp://ftp.rfc-editor.org/in-notes/rfc2000.txt.> Feb. 1997.

Yesil, Magdalena, "Creating the Virtual Store: taking your web site from browsing to buying", John Wiley & Sons, Inc.; New York, 1997, pp. 52-55, under the heads, "Using the Virtual Store to Generate Revenue", "Advertising Revenue", "Revenue Based on Sales".

"Bar Code Method for Automating Catalog Orders," IBM Technical Disclosure Bulletin, No. 88A 61554, Sep. 1988, pp. 243-244.

"Bell Atlantic Introduces Home Management Services in Washington Area" PR Newswire Jan. 9, 1993.

"Distributing Uniform Resource Locators as Bar Code Images," IBM Technical Disclosure Bulletin, No. 96A 60059, Jan. 1996, pp. 167-168.

"IEEE Standard for Bar Coding for Distribution Transformers" Transformers Committee of the IEEE Power Engineering Society, The Institute of Electrical and Electronics Engineers, Inc. NY. Jun. 20, 1996.

"Inexpensive set-top boxes unleash Internet TV", Japan Times (XAO) Sep. 10, 1998 p. 8 , dialog file 583, # 06689158.

"Integrating Traditional Media with the Web", web page located at www.webchoicetv.com/products, 4 pages, by WebChoice, Inc., Santa Monica, CA. Aug. 27, 1999.

"It's not interactive TV, but it's close enough" by Carl, Jeremy, WebWeek, Dec. 1, 1995, vol. 1, No. 8, p. 39, Dialog File 233, #00405621.

"Motorola i1000 cellular barcode scanner", Scan and go provides mobile computing solutions. Cellular barcode scanners, attached to cellular phones or wireless PDA's; retrieved from the Internet on Apr. 23, 2005.

"Newspaper Subscribers Use Symbol Bar-Code Pen Scanner to Capture Web Site Addresses Directly From Print Media" Business Wire. Dec. 21, 1998.

"PBS to transmit Web pages via TV signals—Web pages catch a ride on TV broadcasts" by Andrews, Whit, WebWeek, Apr. 2, 1997, v3 n12 p27, Dialog File 233, #00456769.

"Symbol CyberPen (previously known as InfoPen)", web page located at www.symbol.com/products/consumersystems/consumercyberpen, 2 pgs; retrieved from the Internet on Aug. 27, 1999.

"Ubiquitous Advertising on the WWW: Merging Advertisement on the Browser," Kohda Y et al; Computer Networks and ISDN Systems, May 1, 1996, pp. 1493-1499, vol. 28, No. 11, North Holland Publishing, Amsterdam, NL.

"Web page for Symbol", located at www.symbol.com, 5 pgs; retrieved from the Internet on Aug. 27, 1999.

Adams, Russ, "Test Drive the symbol SPT 1500". Automatic I.D. News; Cleveland; Jan. 1999, vol. 15, Issue: 1, extracted from http://proquest.umi.com/pqd on Aug. 2, 2002.

Barrus, John W.; Holly, Krisztina; and Cassidy, Michael; "The Stylus.TM.—Shopping from Home;" Stylus Innovation, MA; Jan. 1992; IEEE, pp. 149-150.

Bragg, Steven M., Accounting Best Practices, John Wiley and Sons, Inc., 1999.

Curtis, S.P.; "Transponder technologies, applications and benefits" Use of Electronic Transponders in Automation, IEEE Colloquium on, Feb. 15, 1989 pp. 2/1-218.

de Bruyne, Pieter; "New Technologies in Credit Card Authentication;" Institute for Communications Technology, ETH Zentrum-KT, Zurich, Switzerland; Aug. 1990, IEEE, pp. 1-5.

Defler, Frank J. et. al. How Networks Work, Millennium Ed., Que Corporation, Nov. 2000.

Edwards, W. Keith et al. "Systematic Output Modification in a 2D User Interface Toolkit," Proceedings of the 10th ACM Symposium on User Interface Software and Technology (UIST '97) Oct. 14-17, 1997, pp. 1-8.

Gavan, J.; "Transponders for the detection and identification of remote cooperative targets" Telesystems Conference, 1994. Conference Proceedings., 1994 IEEE National , May 26-28, 1994 pp. 229-232.

Going Beyond the Banner by Cathy Taylor from Brandweek, v XXXVII, n28, IQ22+, dated Jul. 8, 1996.

Gooding, Mike, "Handheld Precision Test Data Collector", Autotestcon 97, 1997 IEEE Autotestcon Proceedings, pp. 323-326, Sep. 22-25, 1997, Anaheim, CA, USA, extracted from Internet on Aug. 2, 2002.

Gralla, Preston, How the Internet Works, Millennium Ed., Que Corporation, Aug. 8, 1999.

Hinton, William Frederick, et al.; "Document on Computer;" IPCC96 Fast Track, May 1996, IEEE, pp. 132-144.

Iizawa, Atsushi; Sugiki, Noriro; Shirota, Yukari; and Kunii Hideko S.; "AVITAL, a Private Teaching System by Fax Communication", Software Research Center, Ricoh Company, Ltd.; Jun. 1992, IEEE, pp. 293-301.

White, Ron, How Computers Work, Millennium Ed. Que Corporation; Sep. 1999.

Johnston, A.G.;"What do Forward Looking Companies Consider in their Plans and Developments?;" Nestle; IEE Colloquium, Oct. 12, 1997, pp. 4/1 to 4/4.

Joyce, John, Steganography?; vol. 19, Issue 8, p. 12, Jul. 2002.

Keyes, Jessica, Handbook of Technology in Financial Services 1999, CRC Press, LLC, 1999.

van Renesse, Rudolf L.; "Paper Based Document Security—A Review;" TNO Institute of Applied Physics; European Conference on Security and Detection; Apr. 28-30, 1997; Conference Publication No. 437, IEE, 1997; pp. 75-80.

Mikio Kuroki et al.; "Bar-code Recognition System Using Image Processing;" Hitachi Research Laboratory, Ltd.; pp. 568-572; no date.

Morrison, Tina-marie, Visa sets up website to encourage online buyers, Dominion, New Zealand, dated Aug. 24, 2000.

Muller, Nathan J., Desktop Encyclopedia of the Internet, Artech House, Inc., 1998.

Neves, Ricardo and Noivo, Joao; "The Automation Synergy;" ISIE '97, Guimaraes, Portugal; 1997; pp. 49-52.

Ollivier, M.M.; "RFID-a practical solution for problems you didn't even know you had!" Wireless Technology (Digest No. 1996/199), IEE Colloquium on , Nov. 14, 1996 pp. 311-316.

PacTel jumps back into electronic directory business with At Hand (Pacific Telesis's Web-based directory of advertising,business listing and advertising), Electronic Marketplace Report, v10, p3(1). Jul. 1996.

PCT International Search Report; International Application No. PCT/US00/22037; Sep. 17, 2002; 4 pages.

PCT Notification of Transmittal of International Preliminary Examination Report; International Application No. PCT/US00/21494; Aug. 26, 2002; 7 pages.

PCT Written Opinion; International Application No. PCT/US00/22037; Dec. 5, 2001; 5 pages.

Restatement of the Law, Second, Contracts 2d, §§I-385 8 their Comments, American Law Institute, St. Paul MN, 1981.

Srihari, Sargur N. and Kuebert , Edward J.; "Integration of Hand-Written Address Interpretation Technology into the United States Postal Service Remote Computer Reader System;" Cedar, Suny at Buffalo and U.S. Postal Service; Apr. 1997, IEEE, pp. 892-896.

Stein, Robert; Ferrero, Stephen; Hetfield, Margaret; Quinn, Alan and Krichever, Mark; "Development of a Commercially Successful Wearable Data Collection System"; Symbol Technologies, Inc.; Jul. 1998, IEEE, pp. 18-24.

T. Berners-Lee et al., "Hypertext Transfer Protocol—HTTP/1.0", May 1996, Network Working Group, RFC1945, section 10.11.

Taylor, Bernard W., III, Introduction to Management Science, 5th Ed., Prentice-Hall Inc., NJ, 1996.

The Bank Credit Card Business. 2nd Edition. American Bankers Association, 1996.

Thomas, James W. and Nagle, Joan G.; "Group Decision Support System: Development and Application", Energy Systems, Westinghouse Electric Corporation; Feb. 1989, IEEE, pp. 213-216.

U.P.C. Symbol Specification Manual, Uniform Code Council, Inc., Mar. 4, 1996.

* cited by examiner

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

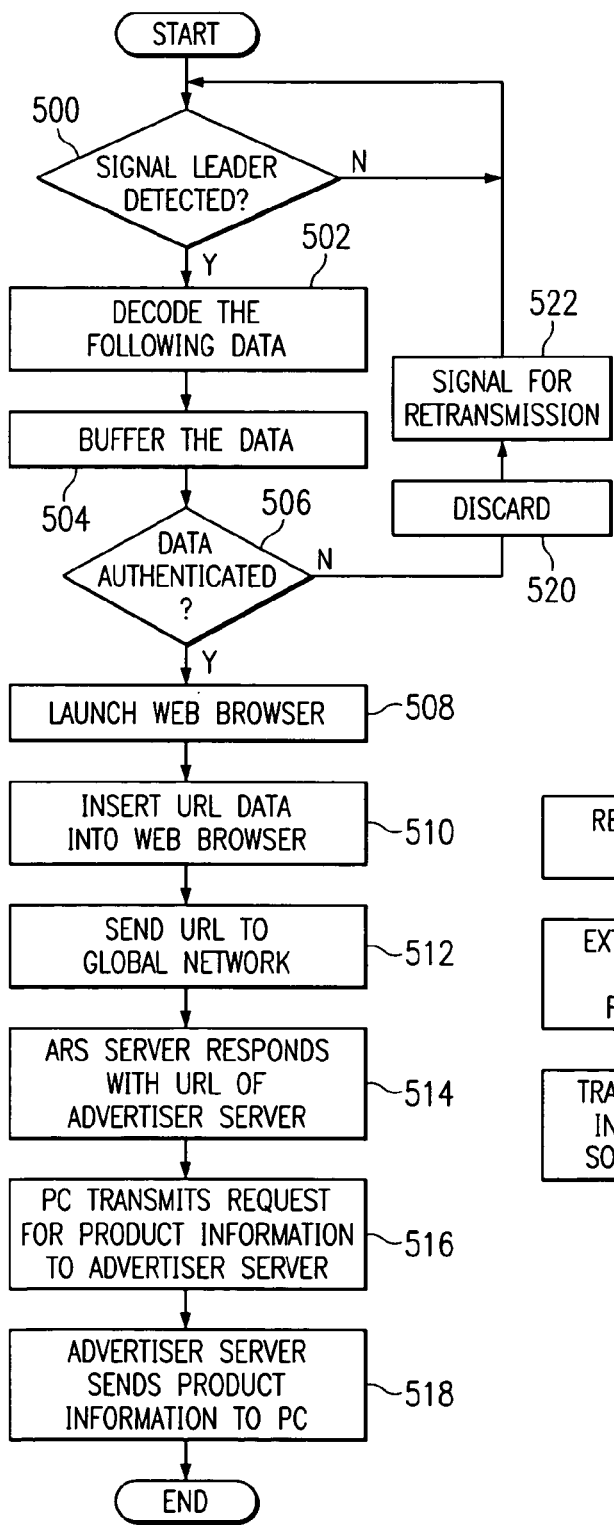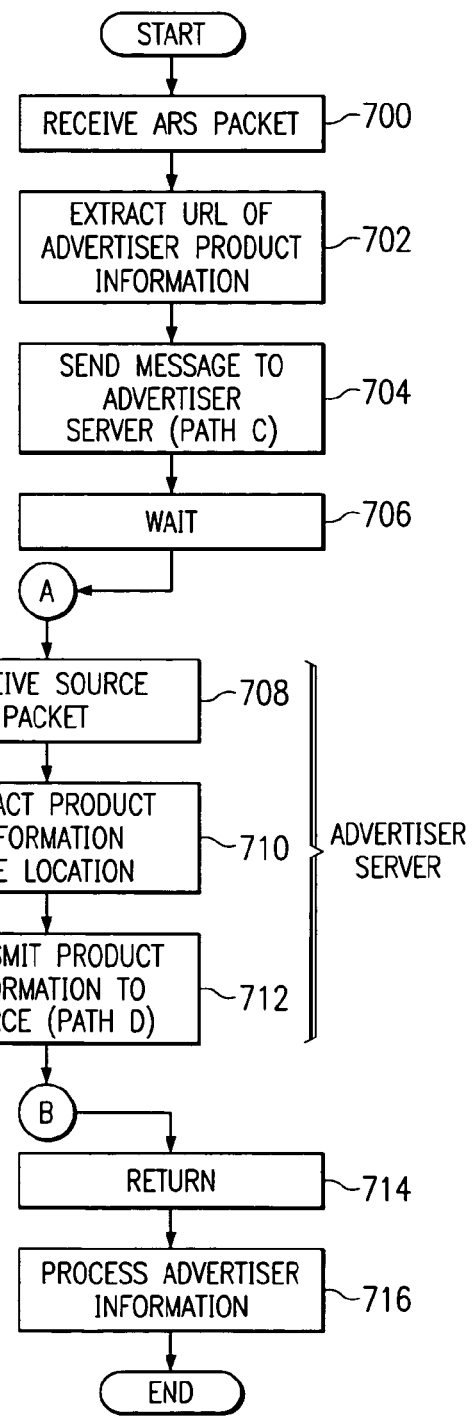

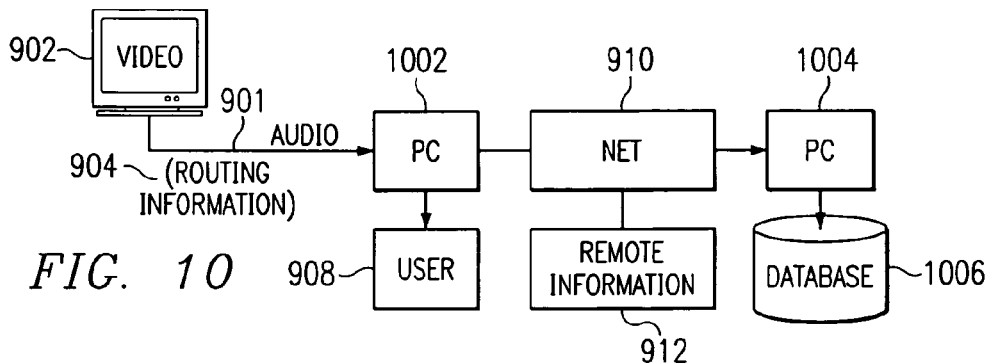
FIG. 10
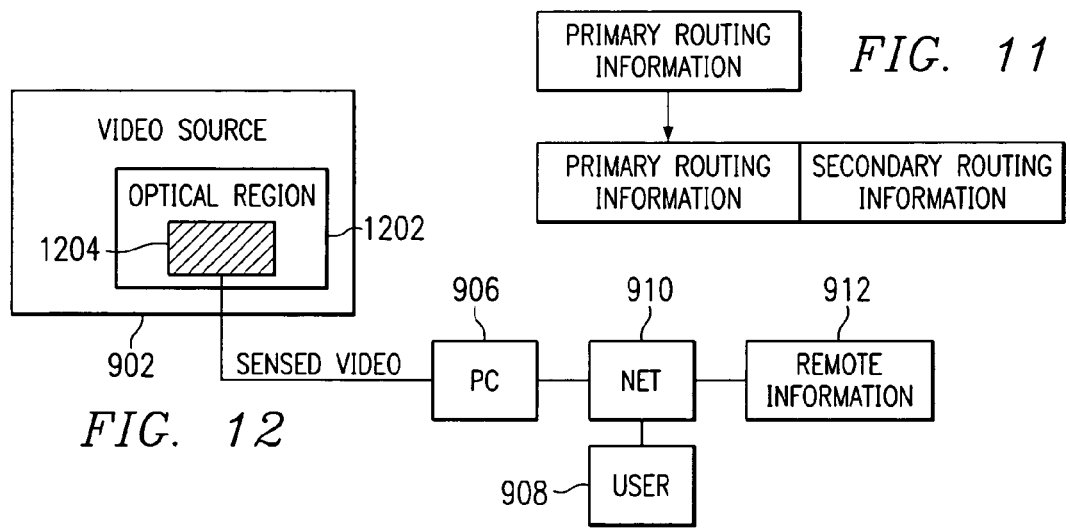
FIG. 11
FIG. 12
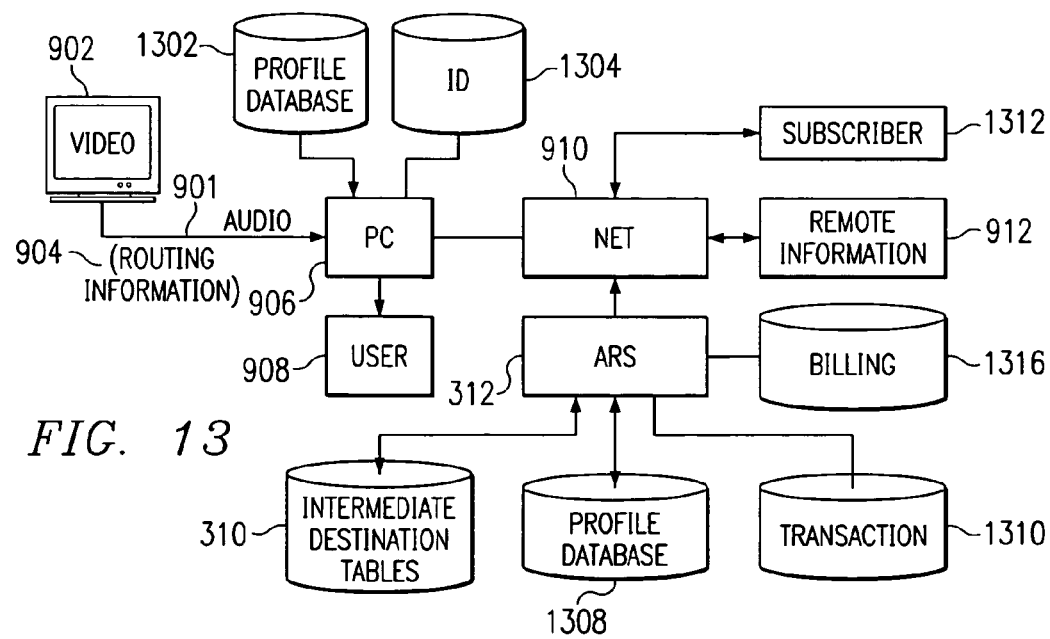
FIG. 13

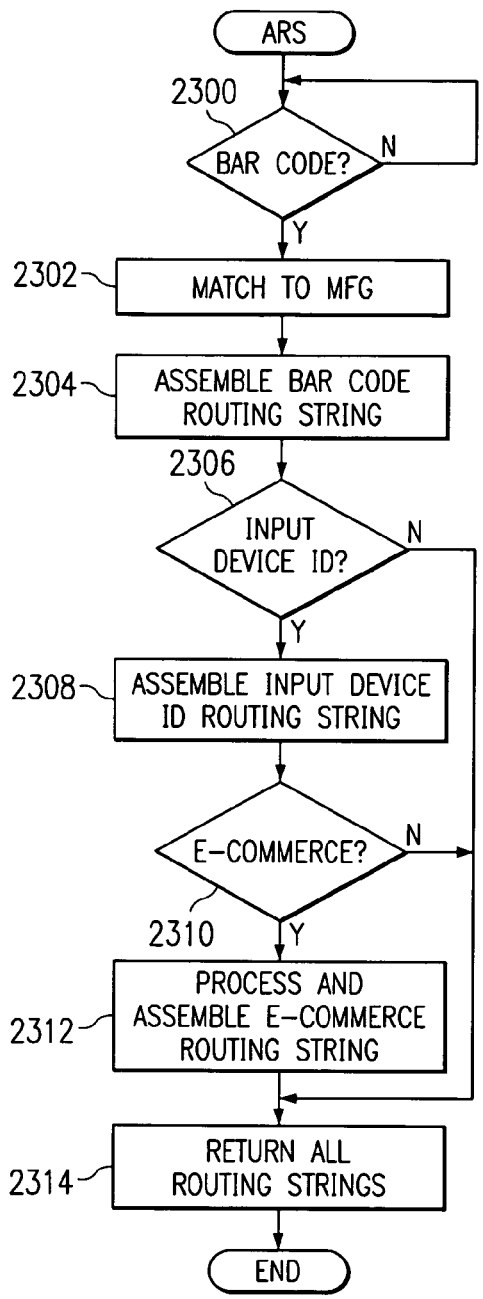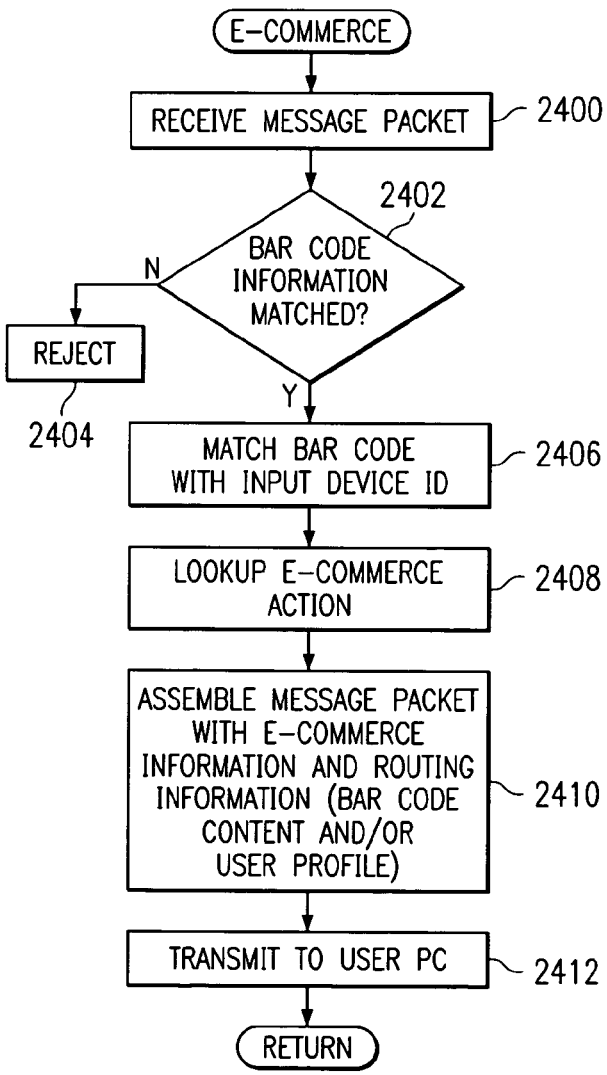

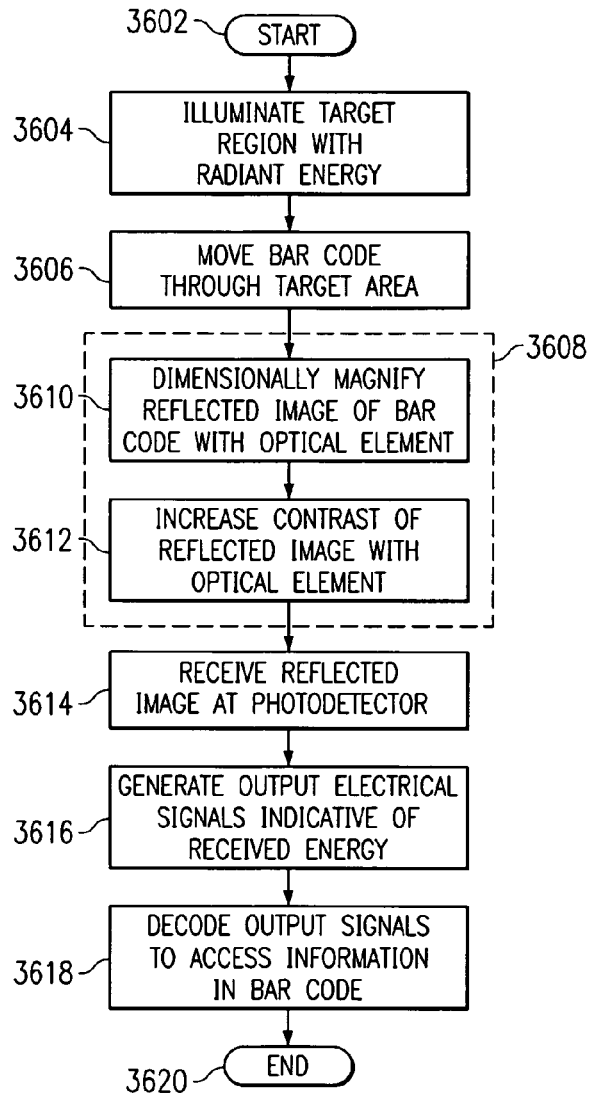
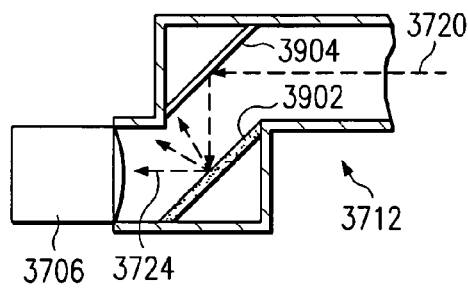
FIG. 39
FIG. 36
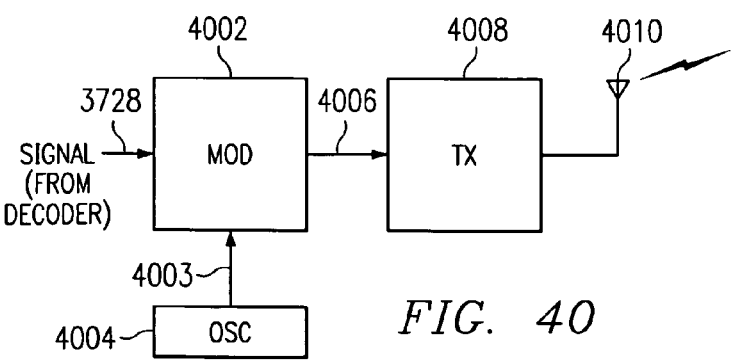
FIG. 40

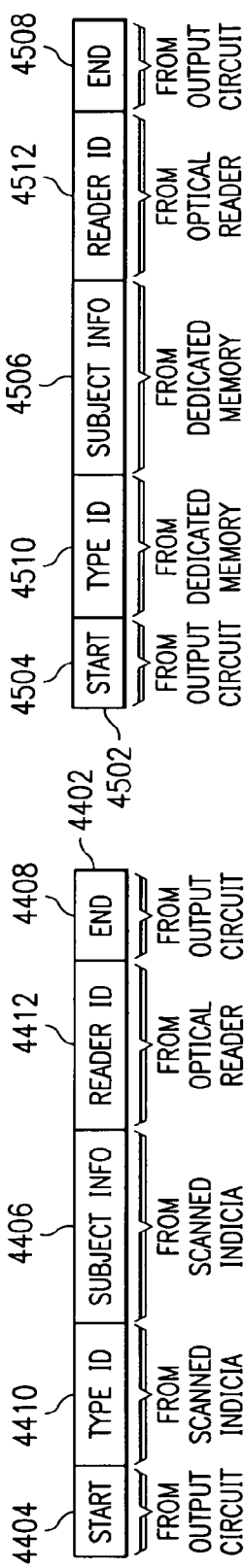
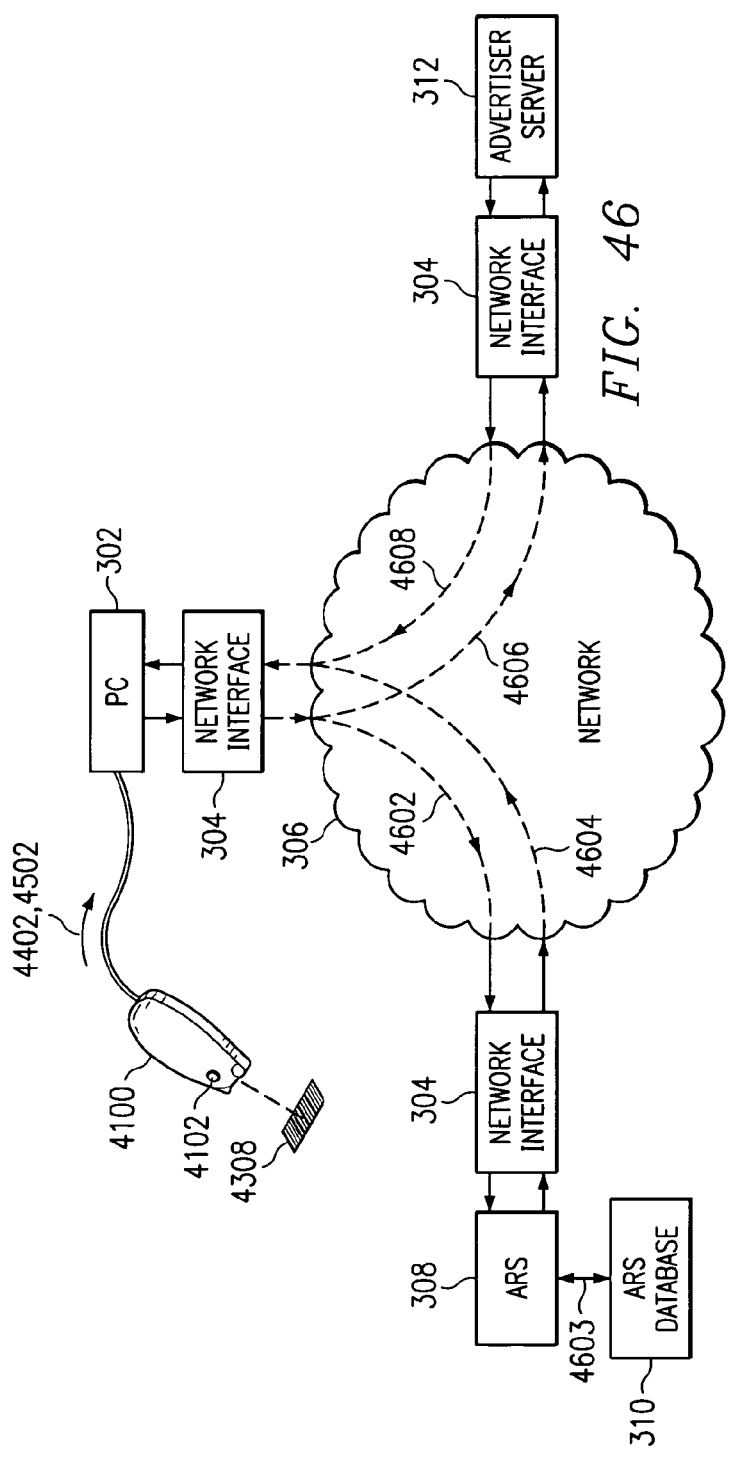
FIG. 44
FIG. 45
FIG. 46

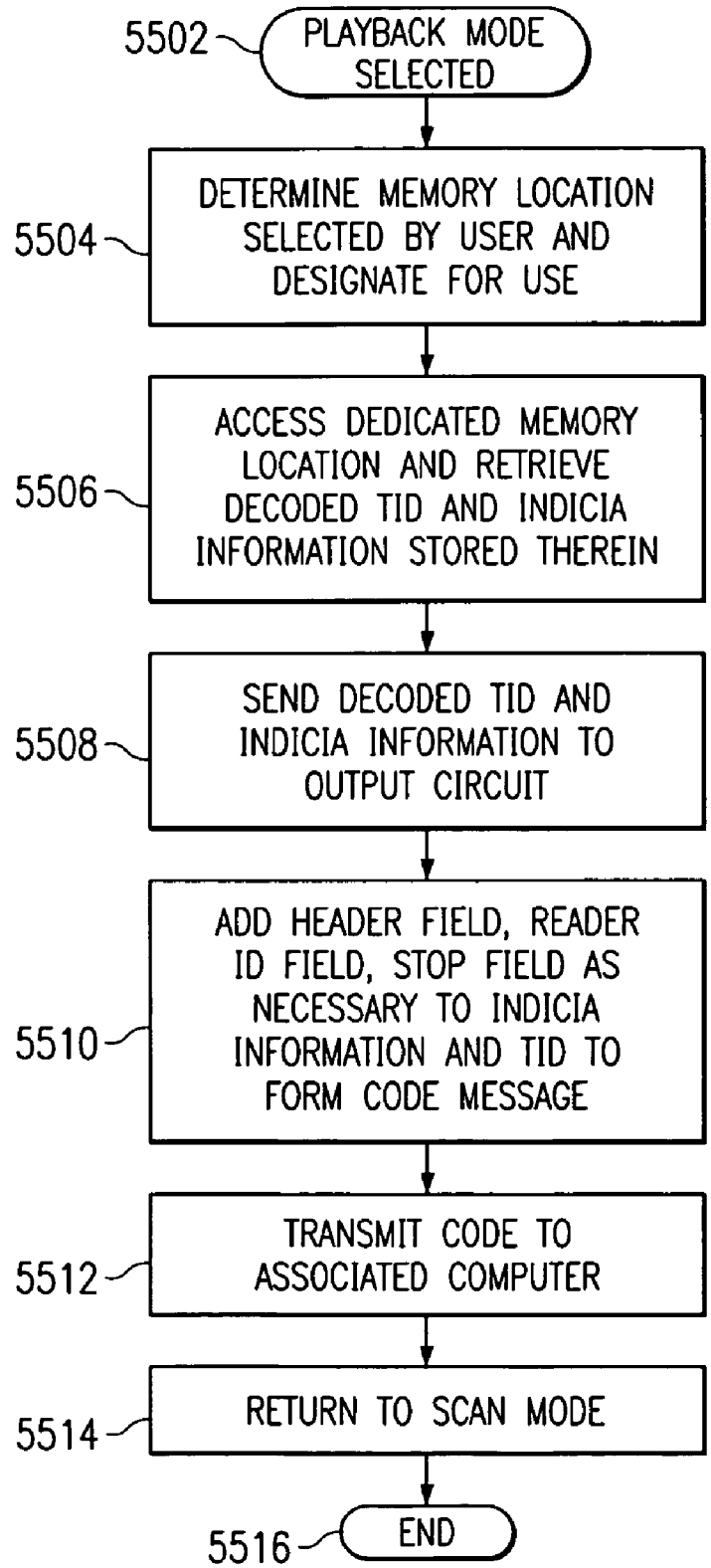

METHOD AND APPARATUS FOR ACCESSING A REMOTE LOCATION WITH AN OPTICAL READER HAVING A PROGRAMMABLE MEMORY SYSTEM

CROSS REFERENCE TO RELATED APPLICATION

This application is a Continuation of U.S. patent application Ser. No. 10/996,120, filed on Nov. 23, 2004, now U.S. Pat. No. 7,533,177 issued on May 12, 2009, which is a Continuation of U.S. Pat. No. 6,823,388, issued on Nov. 23, 2004, which is a Continuation-in-Part of U.S. Pat. No. 6,754,698, issued on Jun. 22, 2004 and entitled "METHOD AND APPARATUS FOR ACCESSING A REMOTE LOCATION WITH AN OPTICAL READER HAVING A DEDICATED MEMORY SYSTEM," which is a Continuation-in-Part of U.S. Pat. No. 6,758,398, issued on Jul. 6, 2004 and entitled "OPTICAL READER WITH ULTRAVIOLET WAVELENGTH CAPABILITY," which is a Continuation-in-Part of U.S. Pat. No. 6,860,424, issued on Mar. 1, 2005 and entitled "OPTICAL READER AND USE," which is a Continuation-In-Part of U.S. Pat. No. 6,745,234, issued on Jun. 1, 2004 and entitled "METHOD AND APPARATUS FOR ACCESSING A REMOTE LOCATION BY SCANNING AN OPTICAL CODE," which is a Continuation-In-Part of the following two U.S. patent applications: Ser. No. 09/151,471, filed Sep. 11, 1998 and entitled, "METHOD FOR INTERFACING SCANNED PRODUCT INFORMATION WITH A SOURCE FOR THE PRODUCT OVER A GLOBAL NETWORK," which is now abandoned and Ser. No. 09/151,530, filed Sep. 11, 1998 and entitled, "METHOD FOR CONTROLLING A COMPUTER WITH AN AUDIO SIGNAL," now U.S. Pat. No. 6,098,106, issued on Aug. 1, 2000.

TECHNICAL FIELD OF THE INVENTION

This invention relates generally to optical readers. In one aspect, it relates to a method for using an optical reader to automatically direct a computer to retrieve and display information from a remote location on a network.

BACKGROUND OF THE INVENTION

With the growing numbers of computer users connecting to the "Internet," many companies are seeking the substantial commercial opportunities presented by such a large user base. For example, one technology which exists allows a television ("TV") signal to trigger a computer response in which the consumer will be guided to a personalized web page. The source of the triggering signal may be a TV, video tape recorder, or radio. For example, if a viewer is watching a TV program in which an advertiser offers viewer voting, the advertiser may transmit a unique signal within the television signal which controls a program known as a "browser" on the viewer's computer to automatically display the advertiser's web page. The viewer then simply makes a selection which is then transmitted back to the advertiser.

In order to provide the viewer with the capability of responding to a wide variety of companies using this technology, a database of company information and Uniform Resource Locator ("URL") codes is necessarily maintained in the viewer's computer, requiring continuous updates. URLs are short strings of data that identify resources on the Internet: documents, images, downloadable files, services, electronic mailboxes, and other resources. URLs make resources available under a variety of naming schemes and access methods such as HTTP, FTP, and Internet mail, addressable in the same simple way. URLs reduce the tedium of "login to this server, then issue this magic command . . . " down to a single click. The Internet uses URLs to specify the location of files on other servers. A URL includes the type of resource being accessed (e.g., Web, gopher, FTP), the address of the server, and the location of the file. The URL can point to any file on any networked computer. Current technology requires the viewer to perform periodic updates to obtain the most current URL database. This aspect of the current technology is cumbersome since the update process requires downloading information to the viewer's computer. Moreover, the likelihood for error in performing the update, and the necessity of redoing the update in the event of a later computer crash, further complicates the process. Additionally, current technologies are limited in the number of companies which may be stored in the database. This is a significant limitation since world-wide access presented by the Internet and the increasing number of companies connecting to perform on-line E-commerce necessitates a large database.

Many types of optical readers are known, however, their cost and complexity have heretofore limited their use primarily to industrial and commercial users. Now, many new network-based technologies are being developed for home users which involve optical scanning. Thus, the need for a simple, low cost optical reader which can be attached to a personal computer has emerged.

SUMMARY OF THE INVENTION

An apparatus for accessing a remote location on a network includes an optical reader having an optical scanning system, a memory system, an output circuit for interfacing to a first computer disposed on the network, and a switching device for switching between a scan mode, a record mode and a playback mode. The optical reader further includes a transmitter for transmitting code information representative of a code to the first computer. The code information is indicative, when the optical reader is in the scan mode, of information representative of an encoded indicia scanned by the optical scanning system. The code information is indicative, when the optical reader is in the playback mode, of information retrieved from a user-selectable memory in the memory system. The code information is configured to, upon being received by the first computer, cause the first computer to determine from the received code routing information to the remote location, and access the remote location on the network in accordance with the determined routing information.

BRIEF DESCRIPTION OF THE DRAWINGS

For a more complete understanding of the present invention and the advantages thereof, reference is now made to the following description taken in conjunction with the accompanying Drawings in which:

FIG. 5 is a flowchart depicting operation of the system according to the preferred embodiment;

FIG. 7 illustrates a flowchart of the interactive process between the source computer and ARS;

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 23 illustrates a flowchart according to the ARS;

FIG. 24 illustrates a flowchart of the process performed at the E-commerce node;

FIG. 36 illustrates a flowchart of one embodiment of the process for reading a barcode;

FIG. 39 illustrates a portion of the optical system for an alternative embodiment;

FIG. 40 illustrates a general functional block diagram for the output circuit of the embodiment;

FIG. 44 illustrates a sample scan code transmitted from the optical reader to the associated device;

FIG. 45 illustrates a sample dedicated code transmitted from the optical reader to the associated device;

FIG. 46 illustrates a system in accordance with the current invention;

FIG. 55 illustrates a flowchart of one embodiment of the process while in the playback mode.

DETAILED DESCRIPTION OF THE INVENTION

Figure 1:
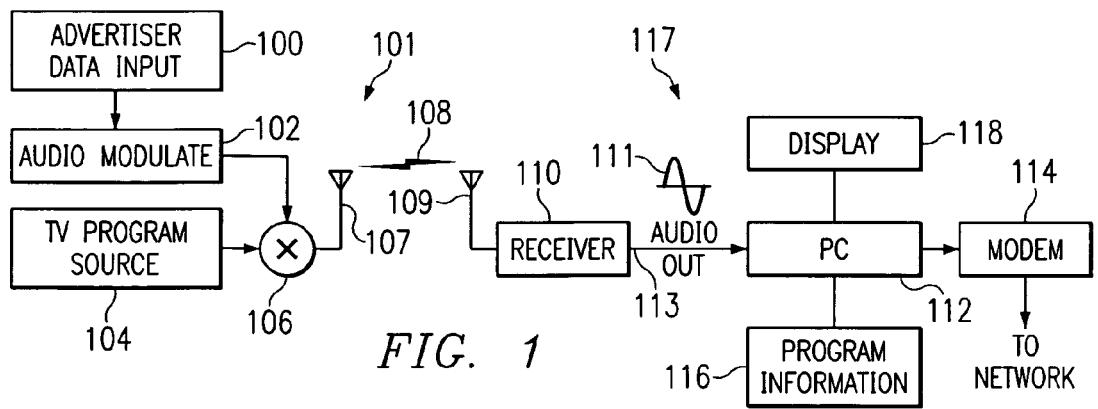
FIG. 1 illustrates a block diagram of the preferred embodiment.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form of a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
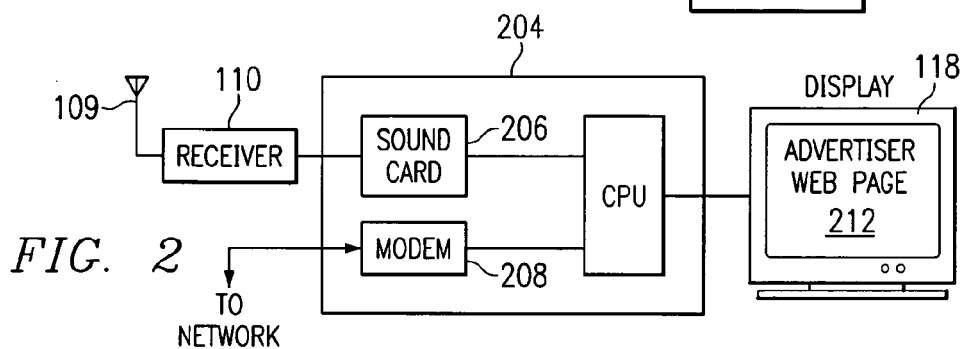
FIG. 2 illustrates the computer components employed in this embodiment.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network.

The remote server address is in the form of a URL. This appended data, in addition to other control codes, is inserted directly into the web browser application for automatic routing to the communication network. The web browser running on PC 204, and communicating to the network with an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
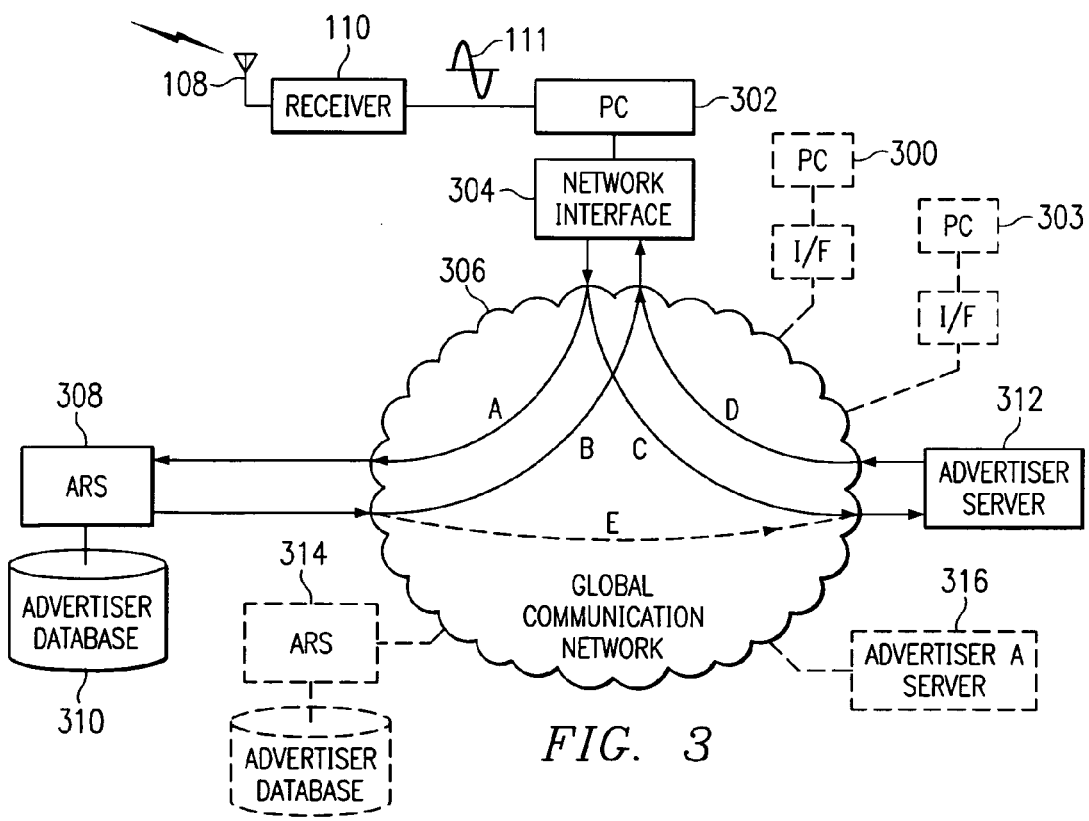
FIG. 3 illustrates system interactions over a global network.

Referring now to FIG. 3, there is illustrated a source PC 302, similar to PCs 204 and 112, connected to a global communication network ("GCN") 306 through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306. Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. Additionally, although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a-4e illustrate the various message packets transmitted between the source PC and network servers used in the preferred embodiment.

Referring now to FIG. 4a, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4b, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4c, the message packet 404 for this transaction comprises the URL of the advertiser server 312, the request-for-product-information data, and the address of the source PC 302.

Figure 4D:

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4d, the message packet 406 for this particular transaction comprises the address of the source PC 302, the requested information, and the URL of the advertiser server 312.

Figure 4E:

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4e, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
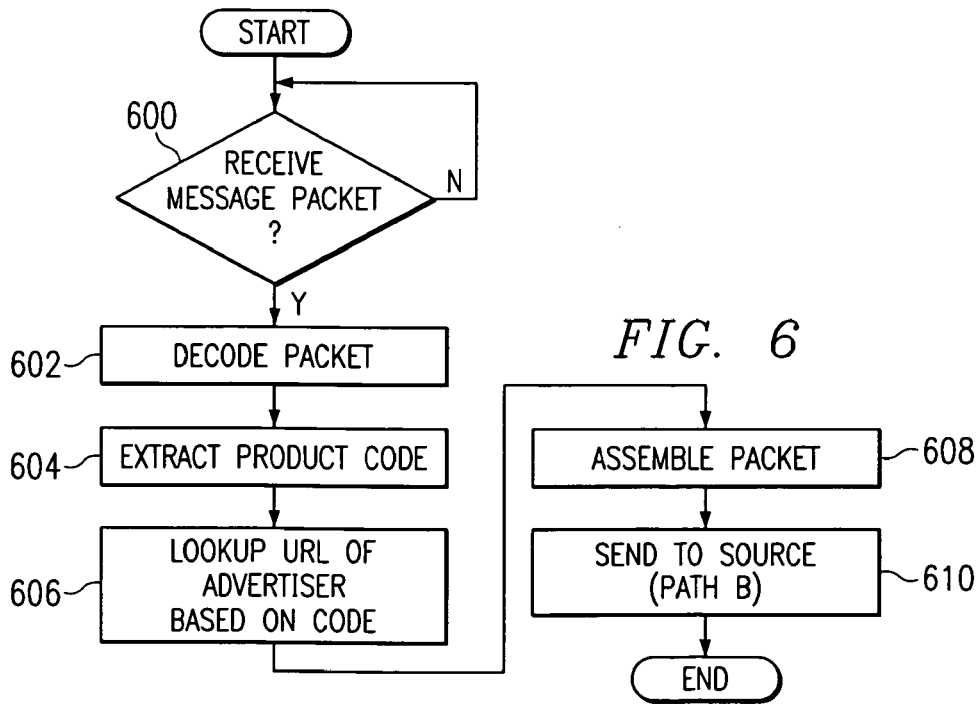
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a lookup table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312, in function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
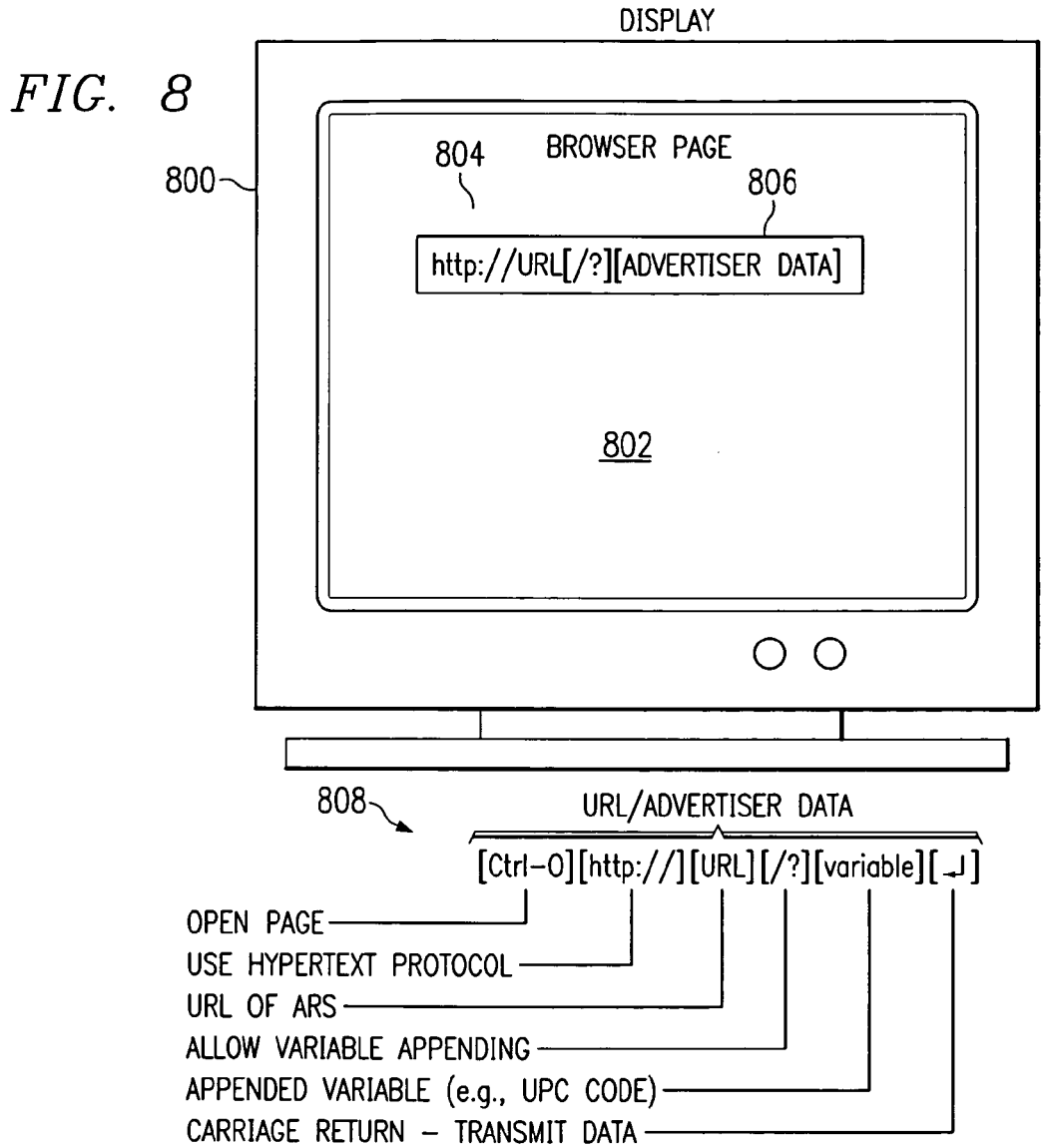
FIG. 8 illustrates a web browser page receiving the modified URL/advertiser product data according to the preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
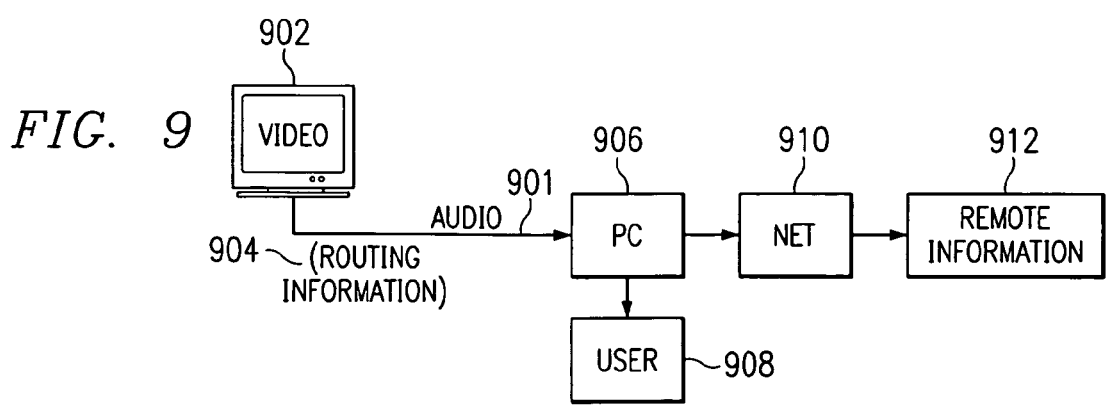
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the lookup procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
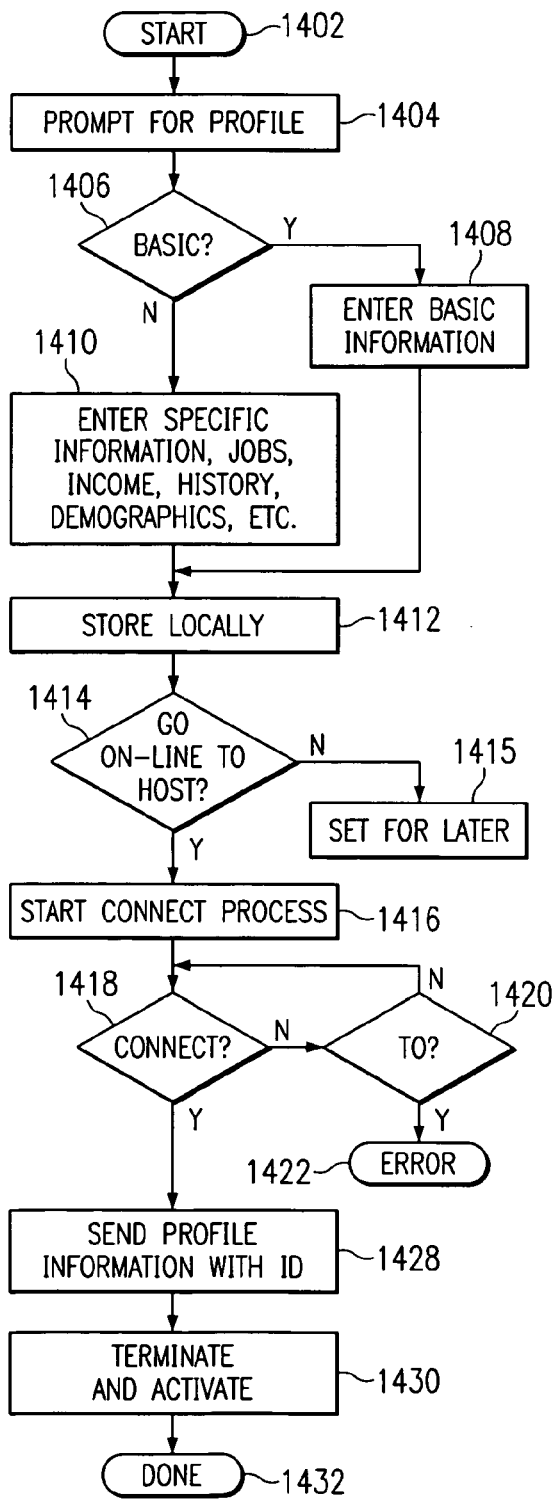
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to a time to decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
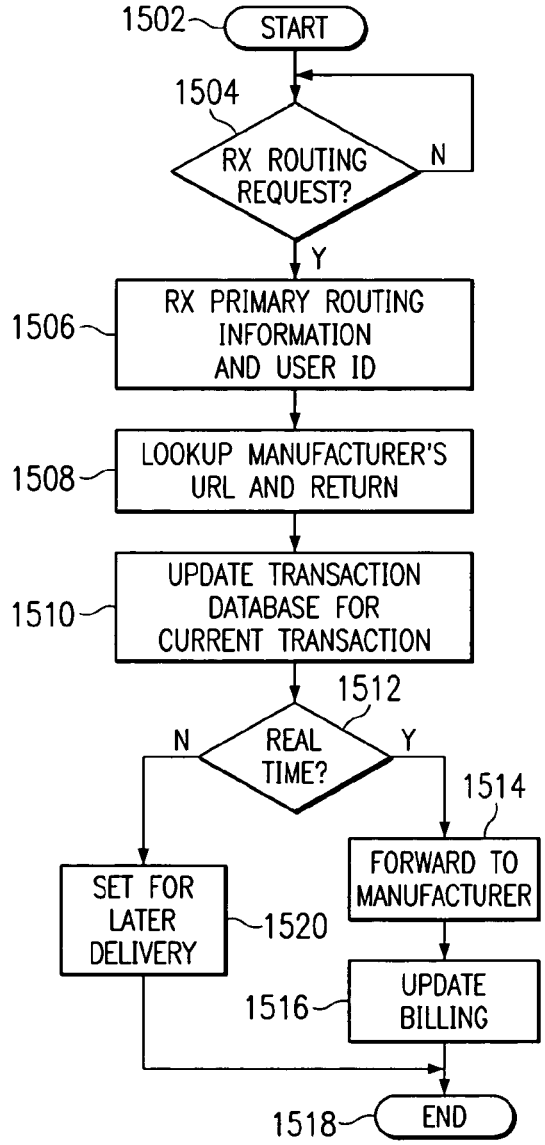
FIG. 15 illustrates a flowchart for processing the profile information when information is routed to a user.

Referring now to FIG. 15, there is illustrated a flowchart depicting the operation of the host when receiving a transaction. The program is initiated at a Start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 108 in order to allow that PC 108 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements are or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain real-time information as to the number of individuals that are watching their particular advertisement and also information as to the background of those individuals, profile information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with profile information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Figure 16:
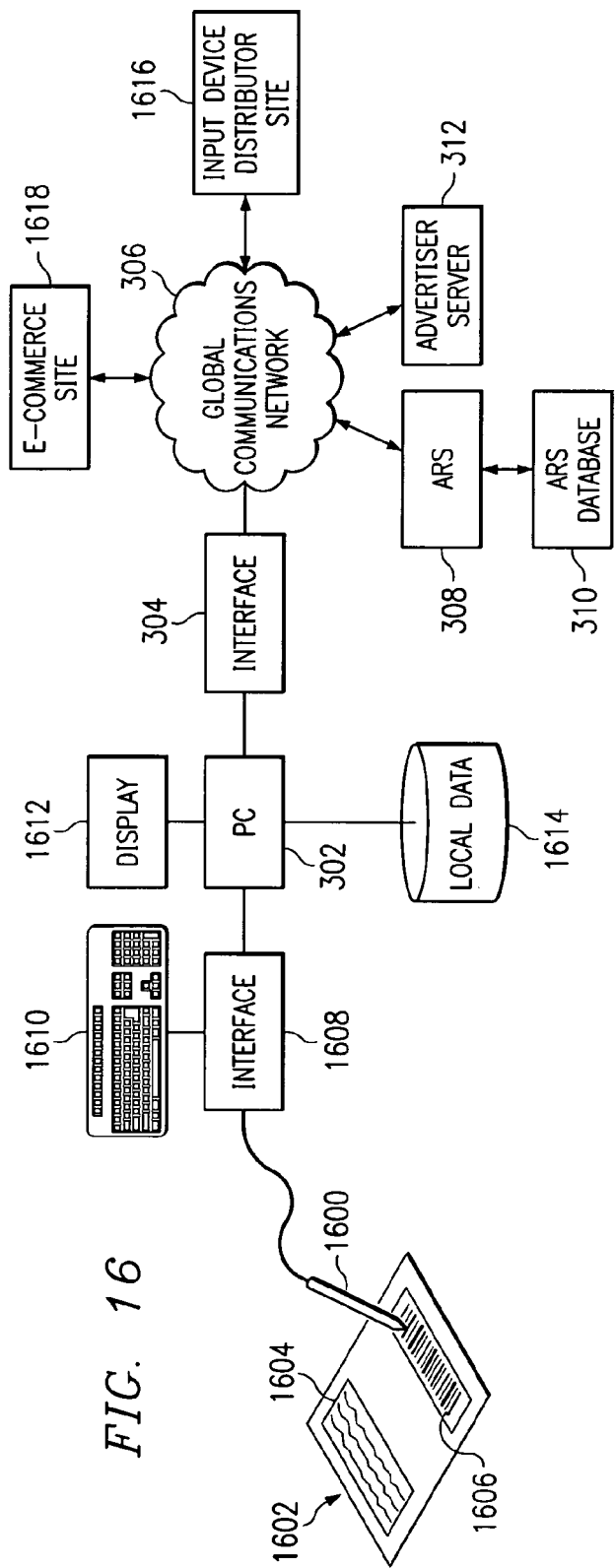
FIG. 16 illustrates a general block diagram of a disclosed embodiment.

Referring now to FIG. 16, there is illustrated a general block diagram of a disclosed embodiment. A bar code scanning input device 1600 is provided by an input device distributor to customers and is associated with that distributor via an input device ID stored therein. The input device 1600 is either sold or freely distributed to customers for use with their personal computing systems. Since more and more products are being sold using bar codes, it can be appreciated that a user having the input device 1600 can scan bar codes of a multitude of products in order to obtain more information. Information about these products can be made immediately available to the user from the manufacturer for presentation by the user's computer 302. Beyond simply displaying information about the product in which the user is interested, the input device distributor may include additional advertising information for display to the user such as information about other promotions or products provided or sold by the input device distributor. Similarly, advertisers may provide catalogs of advertisements or information in newspapers or periodicals where the user simply scans the bar code associated with the advertisement using the input device 1600 to obtain further information. There is provided a paper source 1602 having contained thereon an advertisement 1604 and an associated bar code 1606. (Note that the disclosed concept is not limited to scanning of bar codes 1606 from paper sources 1602, but is also operable to scan a bar code 1606 on the product itself. Also, the input device 1600 can be any type of device that will scan any type of image having information encoded therein.)

After obtaining the input device 1600 from the input device distributor, the user connects the input device 1600 to their PC 302. During a scanning operation, input device 1600 reads bar code data 1606 and the input device ID into a "wedge" interface 1608 for conversion into keyboard data, which keyboard data is passed therefrom into the keyboard input port of PC 302. The importance of the input device ID will be discussed in more detail hereinbelow.

The wedge interface 1608 is simply an interface box containing circuitry that accommodates inputs from both the scanning input device 1600 and a computer keyboard 1610. This merely allows the information scanned by the input device 1600 to be input into the PC 302. In the disclosed embodiment, the wedge interface 1608 will convert any information. The data output from the input device 1600 is passed into the wedge interface 1608 for conversion into keyboard data which is readily recognizable by the PC 302. Therefore, the input device 1600 is not required to be connected to a separate port on the PC 302. This data is recognized as a sequence of keystrokes. However, the output of the input device 1600 can be input in any manner compatible with the PC 302. When not receiving scanner data, the wedge interface 1608 simply acts as a pass-through device for keyboard data from the keyboard 1610. In any case, the information is ultimately processed by a processor in the PC 302 and can be presented to the user on a display 1612. The wedge interface 1608 is operable to provide a decoding function for the bar code 1606 and conversion thereof to keystroke input data.

In operation, the product code of a product is provided in the form of a bar code 1606. This bar code 1606 is the "link" to a product. The disclosed embodiment is operable to connect that product information contained in the bar code 1606 with a web page of the manufacturer of that product by utilizing the bar code 1606 as the product "identifier." The program operating on the PC 302 provides routing information to the ARS 308 after launching the browser on the PC 302 and connecting to the ARS 308 over the GCN 306, which ARS 308 then performs the necessary steps to cause the browser to connect to the manufacturer web site, while also providing for an accounting step, as will be described in more detail hereinbelow.

The bar code 1606 by itself is incompatible with any kind of network for the purposes of communication therewith. It is primarily provided for a retail-type setting. Therefore, the information contained in the bar code 1606, by itself, does not allow for anything other than identification of a product, assuming that one has a database 1614 containing information as to a correlation between the product and the bar code 1606.

The wedge interface 1608 is operable to decode the bar code 1606 to extract the encoded information therein, and append to that decoded bar code information relating to an ID for the input device 1600. This information is then forwarded to the ARS 308 by the resident program in the PC 302. This is facilitated by intermediate routing information stored in the program indicating to which node on the GCN 306 the scanned bar code information is to be sent, i.e., to the ARS 308. It is important to note that the information in the bar code 1606 must be converted from its optical image to numerical values which are then ultimately input to the keyboard input port of PC 302 and converted into data compatible with communication software residing on the PC 302 (in this case, HTML language for insertion into a browser program). When the scanned information is input to the PC 302, the resident program launches the browser program and then assembles a communication packet comprised of the URL of the ARS 308, the input device ID and the user ID. If another type of communications program were utilized, then it would have to be converted into language compatible with that program. Of course, a user could actually key in the information on the bar code 102 and then append the appropriate intermediate routing information thereafter. As will be described hereinbelow, the intermediate routing information appended thereto is the URL of the ARS 308 disposed on the GCN 306.

As part of the configuration for using the input device 1600, the PC 302 hosts input device software which is operable to interpret data transmitted from the input device 1600, and to create a message packet having the scanned product information and input device ID, routing information, and a user ID which identifies the user location of the input device 1600. The input device software loads at boot-up of the PC 302 and runs in the background. In response to receiving a scanned bar code 1606, the wedge interface 1608 outputs a keystroke code (e.g., ALT-F10) to bring the input device program into the foreground for interaction by the operating system. The input device program then inserts the necessary information into the browser program. The message packet is then transmitted to interface 304 across the global communication network 306 to the ARS 308. The ARS 308 interrogates the message packet and performs a lookup function using the ARS database 310. If a match is found between particular parameters of the message packet, a return message packet is sent back to the PC 302 for processing.

The input device program running on PC 302 functions to partition the browser window displayed to the user into several individual areas. This is for the purpose of preparing to present to the user selected information in each of the individual areas (also called "framing"). The selected information comprises the product information which the user requested by scanning the bar code 1606 using the input device 1600, information about the input device distributor which establishes the identity of the company associated with that particular input device 1600, and at least one or more other frames which may be advertisements related to other products that the input device distributor sells. Note that the advertisements displayed by the input device distributor may be related to the product of interest or totally unrelated. For example, if a user scans the bar code 1606 of a soda from Company A, the input device distributor may generate an advertisement of a new soft drink being marketed by Company A that it sells. On the other hand, the input device distributor may also structure the display of information to the user such that a user requesting product information of a Product X may get the requested information of Product X along with advertisements for a competing item Product Y. Essentially, the input device distributor is free to generate any advertisement to the user in response to the user requesting product information.

The return message packet transmitted from the ARS 308 to the PC 302 is then transmitted back across the GCN 306 to the advertiser server 312. The advertiser server 312 restructures the message packet and appends the particular product information for transmission back to the PC 302. Upon receiving the particular advertiser information from advertiser server 312, the PC 302 then retransmits a message to the input device distributor site 1616 and E-commerce site 1618 to obtain the information that needs to be framed in the browser window displayed to the user.

Therefore, the input device 1600 is associated with the input device distributor by way of an input device ID such that scanning a product bar code 1606 in order to obtain information about that particular product generates one or more responses from one or more remote sites disposed on the GCN 306. Stored in the input device 1600 is the input device ID which establishes its relationship to the input device distributor. Proprietary input device software running on the PC 302 operates to decode scanned bar code information and the input device ID received from the input device 1600 and wedge interface 1608, and also provides a unique user ID for establishing the location of the user of the input device 1600. The input device software also assembles message packets and works in conjunction with the on-board communication software (e.g., a browser) to automatically route the message packets across the GCN 306 such that the one or more remote sites disposed on the GCN 306 return information to be framed for presentation to the user.

Figure 17:
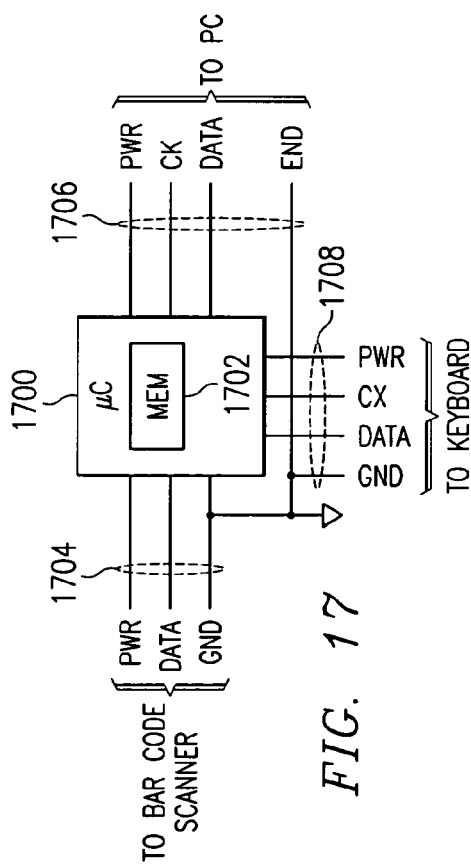
FIG. 17 illustrates the conversion circuit of the wedge interface.

Referring now to FIG. 17, there is illustrated a conversion circuit of the wedge interface. A microcontroller 1700 provides conversion of the data from the input device 1600 and controls interfacing of the keyboard 1610 and input device 1600 with the PC 302. The microcontroller 1700 has contained therein a memory 1702 or it can have external memory. There are provided a plurality of input device interfaces 1704 to the input device 1600, a plurality of PC interfaces 1706 to the PC 302, and plurality of keyboard interfaces 1708 to the keyboard 1610. In general, the input device interfaces 1704 comprise a serial data line, a ground line, and a power line. Similarly, the keyboard interfaces 1708 comprise a serial data line, a ground line, a clock line, and a power line. The PC 302 provides a clock line, a power line, a serial data, and a ground line for input to the microcontroller 1700. The microcontroller 1700 is operable to receive signals from the keyboard 1610 and transfer the signals to the PC 302 as keyboard signals. Operation with the keyboard 1610 is essentially a "pass-through" procedure. Data output from the keyboard 1610 is already in keyboard format, and therefore requires no conversion by the wedge interface 1608. With respect to the input device 1600, the serial data is not compatible with a keyboard 1610 and, therefore, it must be converted into a keyboard format in order to allow input thereof to the keyboard input of the PC 302.

The microcontroller 1700 performs this function after decoding this bar code information, and conversion of this bar code information into an appropriate stream of data which is comprised of the bar code information and the appended URL. This appended URL will be pre-stored in the memory 1702 and is programmable at the time of manufacture. It is noted that the memory 1702 is illustrated as being contained within the microcontroller 1702 to provide a single chip solution. However, this could be external memory that is accessible by the microcontroller 1702. Therefore, the microcontroller 1700 provides an interface between the input device 1600 and the keyboard 1610 to the PC 302 which allows the input device 1600 to receive coded information and convert it to keyboard strokes or, alternatively, to merely pass-through the keystrokes from the keyboard 1610. Therefore, the user need not install any type of plug-in circuit board into the motherboard of the PC 302 in order to provide an interface to the input device 1600; rather, the user need only utilize the already available keyboard port in order to input the appropriate data into the system.

In this particular disclosed embodiment, the microcontroller 1700 comprises a PIC16C73 microcontroller by Microchip Technologies™. The PIC16C73 device is a low cost CMOS 8-bit microcontroller with an integrated analog-to-digital converter. The PIC16C73 device, as illustrated in the disclosed embodiment, has 192 bytes of RAM and 4k×4 of EPROM memory. The microcontroller 1700 can accommodate asynchronous or synchronous inputs from input devices connected to it. In this disclosed embodiment, communication to the keyboard 1610 is synchronous while it is asynchronous when communicating with input device 1600.

It should be noted that, although in this particular embodiment bar code information of the bar code 1606 is input into the keyboard input port of the PC 302, disclosed methods may also be advantageously utilized with high speed port architectures such as Universal Serial Bus ("USB") and IEEE 1394.

Bar codes are structured to be read in either direction. Timing considerations need to be addressed because of the variety of individuals scanning the bar code introduce a wide variety of scan rates. Bar codes use bars of varying widths. The presence of a black bar generates a positive pulse, and the absence of a black bar generates no pulse. Each character of a conventional bar code has associated therewith seven pulses or bars. Depending on the width of the bars, the time between pulses varies. In this disclosed embodiment, the interface circuitry 1608 performs a "running" calculation of the scan time based upon the rising edge of the pulses commencing with the leader or header information. The minimum and maximum scans times are calculated continuously in software with the interface 1608 during the scanning process to ensure a successful scan by the user.

Figure 18:
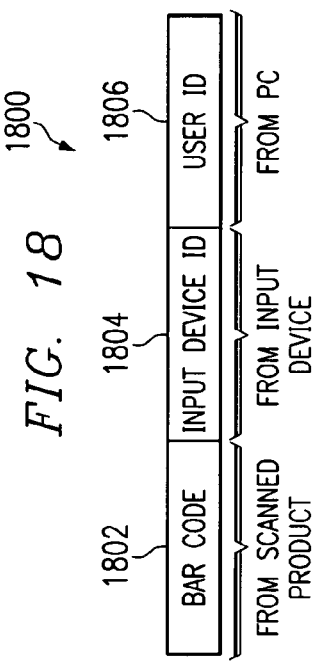
FIG. 18 illustrates a sample message packet transmitted from the user PC to the ARS.

Referring now to FIG. 18, there is illustrated a sample message packet transmitted from the user's PC 302 to the ARS 308. The message packet 1800 comprises a number of bits of information including the bar code information 1802 obtained from the user scanning the bar code 1606 with the input device 1600; the input device ID 1804 which is embedded in a memory in the input device 1600 and identifies it with a particular input device distributor; and a user ID 1806 which is derived from the software running on the PC 302 and which identifies uniquely with the user location. Note that the message packet includes other necessary information for the proper transmission for point to point.

Figure 19:
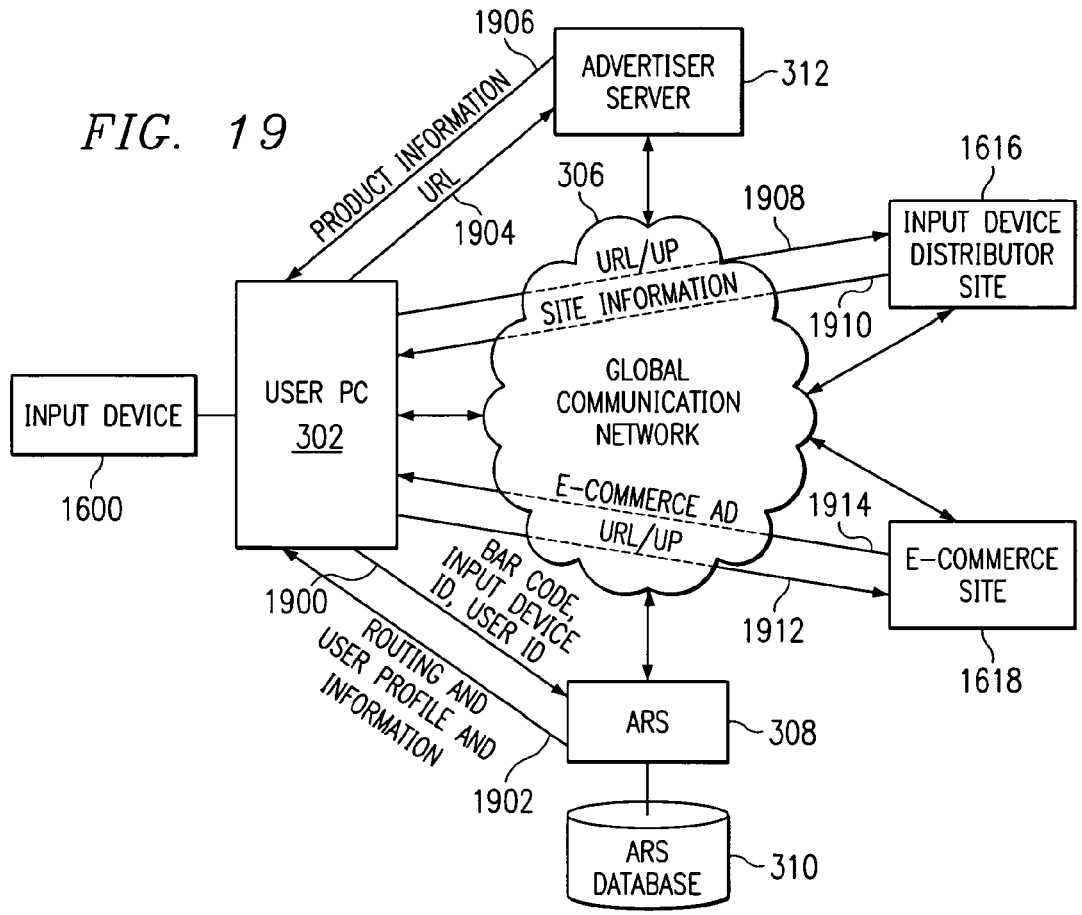
FIG. 19 illustrates a more detailed block diagram of the routing of the message packets between the various nodes.

Referring now to FIG. 19, there is illustrated a more detailed block diagram of the routing of the message packets in order to present the framed information to the user. As is mentioned hereinabove, when the user scans a bar code 1606 using the input device 1600, an input device program running on the user PC 302 is operable to interpret the information output by the input device 1600 and generate a message packet for transmission over the GCN 306. The input device program assembles the message packet such that it is directed to the ARS 308 disposed on the GCN 306. The message packet contains several pieces of information including the input device ID 1804 which links it to the input device distributor, the user ID 1806 which identifies the particular user using the input device 1600, and bar code information 1802 describing a particular product of interest to the user. This message from the PC 302 is transmitted over a path 1900 to the ARS 308 where the ARS database 310 is accessed to cross reference the ID information 1804 and bar code information 1802 to a particular advertiser and input device distributor. The ARS 308 returns a message packet over a path 1902 to the user PC 302 which contains routing information as to the location of various other sites disposed on the GCN 306, for example, the advertiser server 312 and input device distributor site 1616.

It can be appreciated that other information can also be provided by the ARS 308 which more closely targets the particular user of the input device 1600. For example, if it is known that a particular input device 1600 is sold in a certain geographic area, this information can be useful in targeting the particular user with certain advertising information relevant to that geographic area. In any case, the information returned from the ARS 308 over path 1902 provides enough information for the input device program running on the user PC 302 to identify a number of other sites disposed on the GCN 306. The user PC 302 then processes the return message packet and routes another message packet over a path 1904 to the advertiser server 312. The advertiser server 312 then returns product information of the particular product in which the user was interested back to the user PC 302 over a path 1906. Similarly, the user PC 302 routes information (e.g., the URL of the input device distributor site and the user profile) to the input device distributor site 1616 over a path 1908 in order to obtain information back over a path 1910 for framing any banners which identify the input device distributor. Additionally, the user PC 302 forwards a message packet to the E-commerce site 1618 over a path 1912 in order to return information regarding any particular advertisements the input device distributor wants to display to the user. The advertisements are returned to the PC 302 over a path 1914.

Figure 20:
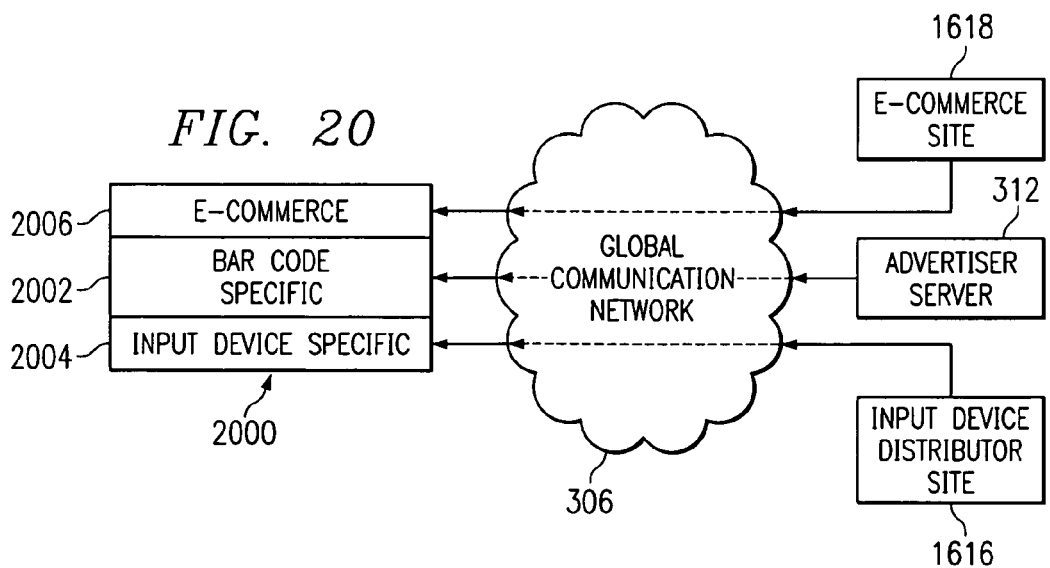
FIG. 20 illustrates a block diagram of a browser window, according to a disclosed embodiment.

Referring now to FIG. 20, there is illustrated a block diagram of a browser window according to the disclosed embodiment. The browser window 2000 is partitioned into a plurality of areas for framing specific information. A bar code area 2002 displays that product information in which the user was interested; an input device-specific area 2004 displays information about the input device distributor; and an E-commerce area 2006 displays advertising information that the input device distributor selects for display according to this particular user and input device 1600. As mentioned hereinabove, a program operable to process scanned bar code information with the unique input device 1600 develops the browser window by partitioning it into specific areas for the framing of information. Therefore, information returned from the E-commerce site 1608 is passed through the GCN 306 to the particular E-commerce frame 2006. Similarly, information about the particular product of interest is returned from the advertiser site 312 across the GCN 306 to the particular bar code specific area 2002. Information placed in the input device specific area 2004 is information about the input device distributor which is returned from the input device distributor site 1616 across GCN 306.

Figure 21:
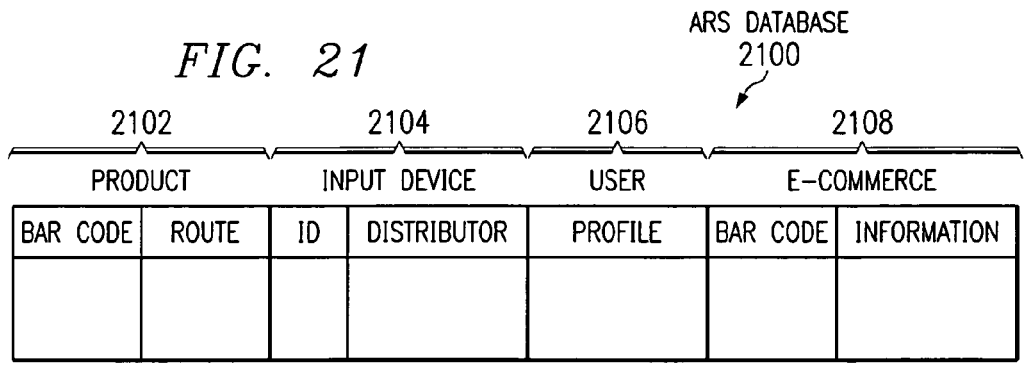
FIG. 21 illustrates a diagrammatic view of information contained in the ARS database.

Referring now to FIG. 21, there is illustrated a structure of information contained in the ARS database. The ARS database 310 contains a variety of information required to properly interrogate and assemble packets for obtaining information from the various sites disposed on the GCN 306. The ARS database 310 has a database structure 2100 which contains addresses for the web sites containing the product information requested by the user when scanning the bar code 1606 with the input device 1600. Under a PRODUCT heading 2102 are listed the particular bar codes and associated routing information for addressing the respective server location. For example, the ARS server 308 may contain any number of advertisers having unique URL addresses associated therewith. Therefore, the bar code 1606 of a particular product is associated with a unique URL address which routes any request for information of that product to that particular advertiser's site. Also part of the ARS database structure 2000 is a heading of INPUT DEVICE under which is the input device ID 1804 and the distributor associated with that input device ID 1804.

It can be appreciated that there may be a number of distributors using the disclosed architecture such that each distributor has an ID embedded in the input device 1600 which uniquely identifies that input device with the particular distributor. Therefore, the unique input device ID 1804 needs to be listed with the respective distributors of that input device 1600 in order to process the information that needs to be framed and displayed to that particular user. Another heading under the ARS database structure 2100 is a user heading 2106 which contains profile information associated with that particular user ID 1806. As mentioned hereinabove, the user ID 1806 is obtained via the input device software running on the PC 302 and upon installation or subsequent configuration may request that the user input certain profile information which may be used to target that particular user with products and services which identify with that user profile. The ARS database structure 2100 also contains an E-commerce heading 2108 which contains information related to the bar code 1606 and an advertisement that may be triggered by the request for that information. For example, any bar code 1606 associated with a paper source 1602 can be associated with the specific information in the ARS database 310. A user wishing to obtain information about a specific soft drink may, in fact, trigger an advertising response of a competitor product. Similarly, the user interested in information about that particular soft drink may also trigger information which is relevant to that particular product or a product which may normally be served in conjunction with that soft drink. Furthermore, if the user profile indicates that this individual has significant interest in finance or insurance, the request for information regarding this particular bar coded product may trigger advertisement from an E-commerce server 1618 related to information about finance and insurance. It should be noted that the information described as contained within the ARS database structure 2100 is not limited to what has been described, but may comprise any number of pieces of information used to present desired information to the computer display of the user.

Figure 22:
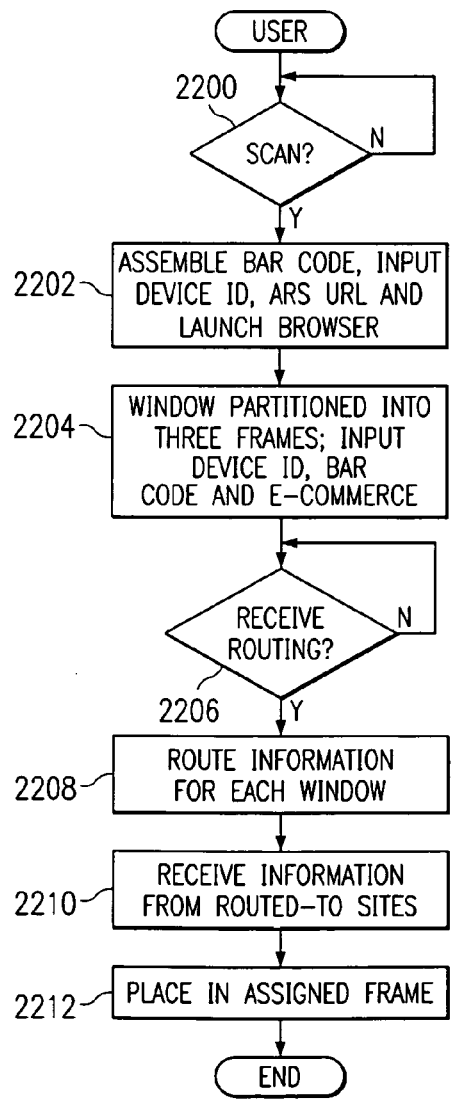
FIG. 22 illustrates a flowchart of the process of receiving information from the user's perspective.

Referring now to FIG. 22, there is illustrated a flowchart of the process of receiving information from the user's perspective, and according to the disclosed embodiment. The input device software running on the user's PC 302 runs in the background until activated by output from the input device 1600. Therefore, flow moves to a decision block 2200 where if a scanned input does not occur, flow moves out the "N" path and loops back to the input of decision block 2200. On the other hand, if scanned input information is received, flow moves out the "Y" path to a function block 2202 where the input device software assembles a message packet containing the bar code information, the input device ID 1804 and the ARS 308 URL address. Additionally, the browser is launched in which this information is placed for transmission to the ARS 308. Flow then moves to a function block 2204 where the browser is partitioned into any number of areas in which information is displayed when obtained from the input device distributor site 1616, the E-commerce site 1618, and the advertiser server 312. It should be known that although three frames are shown in the particular window 2000 of this embodiment, the number of frames displayed in the window 2000 is limited only by the available real estate of the window 2000 area itself.

After the input device software partitions the browser window into one or more frames in preparation of receipt of return information, flow moves to a decision block 2206 where the computer waits for information to be returned from the various sites disposed on the GCN 306. If information is not returned, flow moves out the "N" path and simply loops back to the input to continue monitoring for receipt of the information. If information has been received, flow moves out the "Y" path to a function block 2208 where routing information for each frame (or partitioned area of the window 2000) is inserted into one or more packets for transmission to the various sites. The various sites then return the requested information back to the PC 302, as indicated in function block 2210. Flow is then to a function block 2212 where the proprietary software working in conjunction with the hosted browser places the returned information into the respective frames of the window. The user, viewing the display at PC 302, then perceives a variety of information, one of which is the particular product information which he or she requested, in addition to input device distributor information, and possibly other advertisements based upon the user's profile.

Referring now to FIG. 23, there is illustrated a flowchart of the process according to the ARS. The ARS 308 is operable to decode and process messages received from the GCN 306. Therefore, flow is to a decision block 2300 where, if bar code information is not received, flow is out the "N" path with loop-back to its input. If bar code information has been received, flow is to a function block 2302 where a matching process occurs to link the bar-coded product information to its respective manufacturer. The ARS database 310 also associates the URL address of the manufacturer's server. When a match is found, the ARS 308 begins to assemble a message packet of information for transmission back to the PC 302, as indicated in function block 2304. The message packet contains the product information and the URL address of the manufacturer's website. Flow then moves to a decision block 2306 where the input device ID 1804 is compared with the list of input device IDs issued by the particular input device distributor. If the input device ID 1804 is validated, flow moves out the "Y" path to a function block 2308 where the message packet is appended with the input device ID 1804 and distributor routing address. Flow then moves to a decision block 2310 where the ARS 308 determines if any E-commerce information is to be associated with a particular input device ID 1804. If so, flow is out the "Y" path to a function block 2312 where the message packet is appended with the E-commerce routing string. The E-commerce routing string provides addressing for the E-commerce server 1618. Flow then moves to a function block 2314 where all message packets are returned back to the PC 302 for processing.

Referring back to decision block 2306, if the input device ID 1804 is determined to be invalid, flow moves out the "N" path and jumps forward to the input of decision block 2314, since the lack of a input device ID 1804 interrupts the link to any advertising provided by the E-commerce server 1618. At this point, the only information provided is the link to the advertiser server 312 for return of product information. Referring now to decision block 2310, if no E-commerce information is available, flow moves out the "N" path and jumps forward to the input of function block 2314 where the message packet back to the PC 302 contains only the URL of the advertiser server 312, the bar code information, the distributor server 1616 address and input device ID 1804 information.

Referring now to FIG. 24, there is illustrated a flowchart of the process performed at the E-commerce site. The E-commerce server 1618 receives the message packet from the user PC 302, as indicated in function block 2400, and decodes the packet to perform a match with the bar coded information. Moving on to a decision block 2402, if the match is unsuccessful, flow is out the "N" path to a function block 2404 where the match is rejected. A message may be returned to indicate that a problem occurred and the user may need to re-scan the product bar code 1606. If a successful match occurs, flow moves out the "Y" path to a function block 2406 where the input device ID 1804 is matched with the bar code product information. The bar coded information may be distributed to customers over a large geographic area. However, the input device 1606 may be coded for certain geographic areas. For example, an input device 1600 having an XXX ID may be restricted for sale in the Southwestern United States while an input device 1600 having a YYY ID may be sold only in the Northeast. In this way, geographic areas may be targeted with advertising more appealing to that particular area. Advertising returned to the user PC 302 may be focused further by obtaining a user profile when the software or input device 1600 are installed. In this way, advertising may be focused based upon the user profile. Therefore, flow moves to a function block 2408 to lookup the E-commerce action based upon the input device ID 1804 and the bar code information. Flow moves to a function block 2410 to assemble all the information into a packet for return to the user PC 302. The product information and/or user profile information may be returned. Flow is then to a function block 2412 where the message packet is transmitted.

Figure 25:
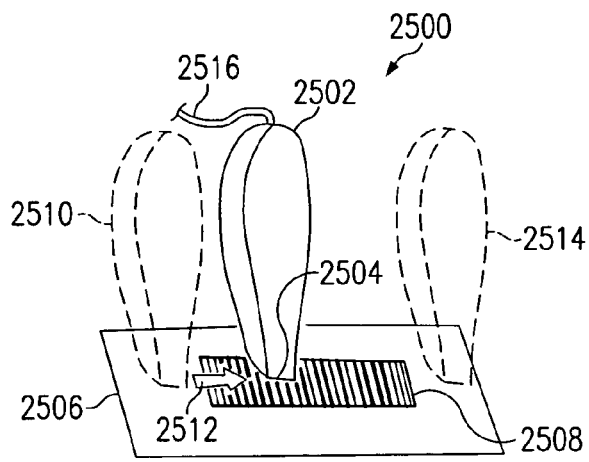
FIG. 25 illustrates reading a bar code with an optical reader according to an embodiment of the invention.

Referring now to FIG. 25, there is illustrated an optical reader which can be used for scanning an optical code, for example a bar code, and delivering signals indicative of the optical code to a computer. Reader 2500 typically includes an outer shell 2502 enclosing the working components and shaped for convenient manual grasping by the user. During operation, the front end 2504 of the reader 2500 is brought into contact with (or very close proximity to) a surface 2506 bearing the optical code to be read, for example barcode 2508. The reading operation begins with the reader 2500 positioned at a starting position (shown in phantom and denoted by reference numeral 2510) to one side of the barcode 2508. The reader 2500 is then moved across the barcode 2508 as indicated by arrow 2512 to a final position (shown in phantom and denoted by reference numeral 2514) on the opposite side. Typically, the reader 2500 must be moved across the barcode 2508 at a substantially constant speed to ensure accurate reading of the symbol. Once the optical symbol has been scanned by the optical reader 2500, internal circuitry produces electronic output signals indicative of the symbol. These electronic output signals are provided to a computer (not shown), typically by means of a wired control cord 2516. Alternately, the output signals may be sent from the reader 2500 to the computer using other known transmission technologies, for example using a wireless radio frequency (RF) link or a wireless infrared (IR) link.

Figure 27:
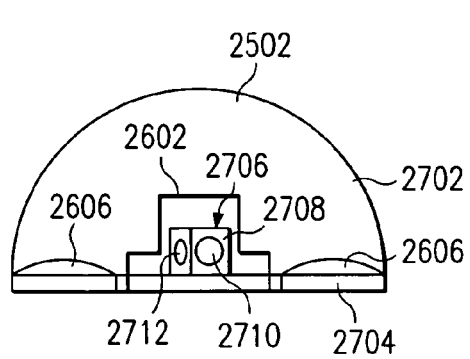
FIG. 27 illustrates a front elevation view of the optical reader viewed from line 27-27 of FIG. 26.
Figure 26:
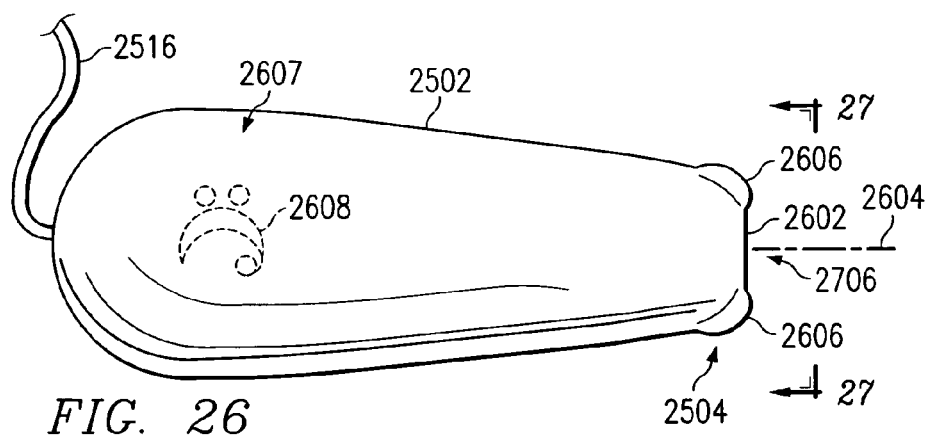
FIG. 26 illustrates a top plan view of an optical reader according to an embodiment of the invention.

Referring now to FIGS. 26 and 27, there are illustrated external views of optical reader 2500 according to an embodiment of the invention. Typically, the outer shell 2502 of the reader 2500 will be constructed from multiple pieces to allow simple assembly of the internal components. For example, the illustrated embodiment includes an upper shell 2702 and a lower shell 2704 which form a hollow interior cavity within which the internal components are mounted. To provide for easier gripping and to prevent the device from rolling across flat surfaces, the upper shell 2702 may have a generally semi-circular cross section and the lower shell 2704 may have a generally flat cross section. A scanning portal 2706 is provided at the front end 2504 of reader 2500 to allow the interior components to project and collect radiant energy during the scanning operation. The scanning portal 2706 is typically covered by a protective window 2708 which is transparent to the radiant energy wavelength used for scanning. Projection and/or collection lenses may be visible behind the window 2708. For example, in FIG. 27, a collection lens 2710 and a projection lens 2712 are visible through the window 2708.

To assist the user in maintaining the proper orientation of the reader 2500 during the scanning operation (i.e., with the front end 2504 substantially flat against the surface 2506 bearing the optical symbol, the front end 2504 may be adapted to form a substantially flat bearing surface 2602 surrounding the scanning portal 2708. The bearing surface 2602 is preferably substantially perpendicular to the axis 2604 of the collection portion of the optical system. To reduce the likelihood that the scanning window 2708 will be scratched during the scanning process, it may be inset slightly behind the plane of the bearing surface 2602. The window 2708 may be further protected by the provision of pads 2606 on external shell 2502 which project slightly ahead of the bearing surface 2602.

The external shell 2502 of the reader 2500 may be contoured to provide a comfortable grasp for the user and/or to have an attractive or distinctive shape. For example, the upper shell 2702 of the reader 2500 is smoothly contoured to provide a "streamlined" appearance in accordance with a common style used on other computer related devices such as a computer mouse, a track ball, etc. In other embodiments, however, the exterior shell may be contoured to provide a more distinctive appearance. The exterior surface of the outer shell 2502 further provides an area 2607 for the placement of identifying or advertising indicia 2608 (shown in phantom). Such indicia, if present, may be formed by printing or painting directly on the exterior surface of the reader 2500, by the application of discrete labels, and/or by molding letters, designs or other indicia directly into the surface of the reader by means of injection molding or a similar process.

Figure 33:
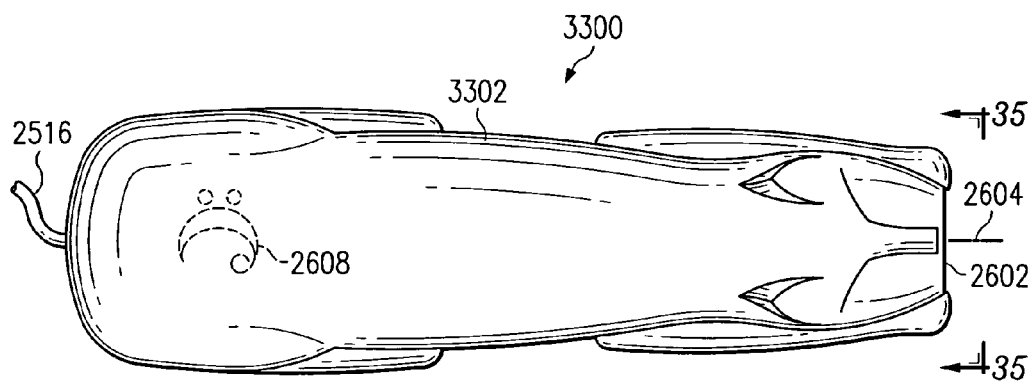
FIG. 33 illustrates a top plan view of an optical reader according to another embodiment of the invention.
Figure 34:
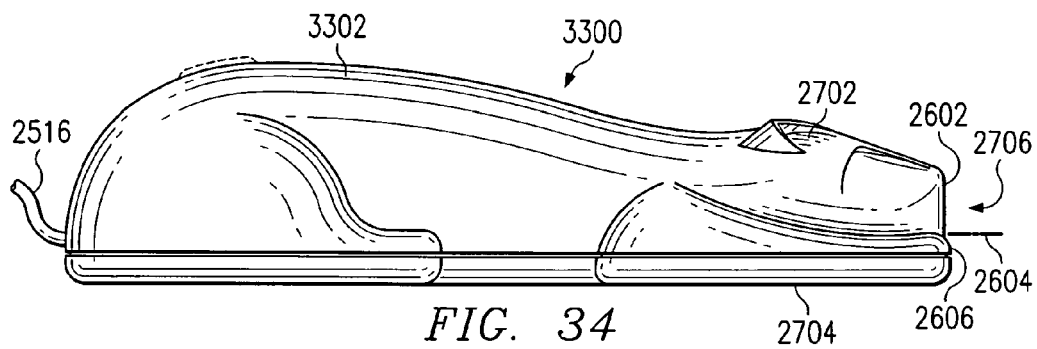
FIG. 34 illustrates a side elevation view of the optical reader of FIG. 33.
Figure 35:
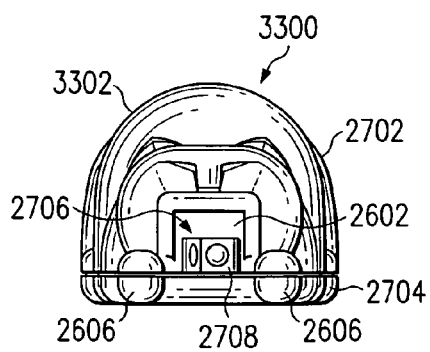
FIG. 35 illustrates a front elevation view of the optical reader viewed from line 35-35 of FIG. 33.

Referring now to FIGS. 33-35, there is illustrated an alternative embodiment of the invention. Optical reader 3300 has an exterior shell 3302 contoured to resemble an animal, in this case, a stylized cat. It will be readily appreciated that, except for the recontoured shell 3302, the features described for the previous embodiment are present in substantially identical form in this embodiment, including the scanning portal 2706, window 2708, bearing surface 2602 and pads 2606. In addition, identifying or advertising indicia 2608 may be placed on the stylized shell of reader 3300 in the same fashion as on the previous embodiment. It will further be apparent that the external shell of the reader can be contoured to resemble other animals, e.g., dogs, birds, reptiles, fish, etc. or other objects including automobiles, trucks, trains, aircraft, etc. without departing from the scope of the current invention.

Figure 28:
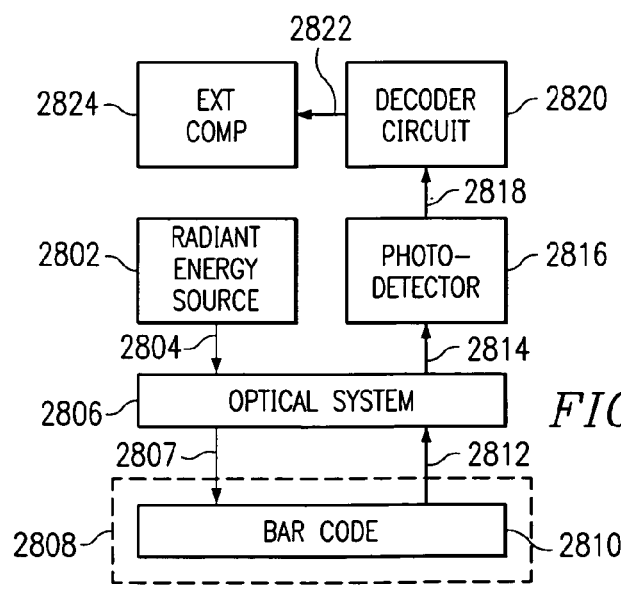
FIG. 28 illustrates a general functional block diagram of the components of an optical reader in accordance with an embodiment of the invention.

Referring now to FIG. 28, there is illustrated a general block diagram showing the function of an optical reader in accordance with embodiments of the current invention. A radiant energy source 2802 is provided for generating a radiant energy which will be used for illuminating a target region containing the barcode or other symbol to be scanned. The radiant energy, denoted by arrow 2804, is transmitted from the source 2802 into an optical system 2806. The radiant energy is typically light in the visible wavelength, however light of infrared (IR) wavelength or other forms of radiant energy may be used. The optical system 2606, which will be described in further detail below, directs the radiant energy (now denoted by arrow 2807) into a target region 2808 adjacent to the reader. The radiant energy directed into the target region 2808 illuminates a barcode 2810 present therein and causes an image, denoted by arrow 2812, of the barcode to be reflected back into another portion of the optical system 2806. The reflected image of the barcode passes through the optical system 2806 where it is processed to increase its contrast and decrease its luminance. After processing, the image, denoted now by arrow 2814, is directed by the optical system 2806 onto a photodetector 2816, which produces output electrical signals indicative of the radiant energy incident thereon. The output electrical signals, denoted by arrow 2818, are routed to a decoder circuit 2820, which utilizes electronic circuitry to decode the output electrical signals to provide an indication of the information contained in the barcode 2810. The information, denoted by reference numeral 2822, is then transmitted to an external computer 2824 for further use or processing.

Typically, the decoded information 2822 is transmitted to the external computer 2824 in accordance with a known data interface format. Suitable data interface formats for transmission of the barcode information from the decoder circuit 2820 of the reader to an external computer 2824 include an output signal which emulates computer keyboard keystrokes such as those in accordance with the PS/2 keyboard interface standard or the AT keyboard interface standard. Alternately, the output signals may be formatted in accordance with other known data interface or communication standards, including the Universal Serial Bus (USB) standard, the RS-232 standard, the RS-423 standard, the IEEE 1394 (FIREWIRE) standard, the Integrated Drive Electronics (IDE) interface standard, the Enhanced Integrated Drive Electronics (EIDE) interface standard, the Asynchronous Transfer Mode (ATM) transmission standard, the Fiber Distributed Data Interface (FDDI) interface standard, the 8-Bit Industry Standard Architecture (ISA) bus standard, the 16-bit Industry Standard Architecture (ISA) bus standard, the VL-Bus bus standard, the Peripheral Component Interconnect (PCI) bus standard, the Personal Computer Memory Card International Association (PCMCIA) bus standard, the Centronics Parallel Port (CPP) standard, the Enhanced Parallel Port (EPP) standard, the Extended Capabilities Port (ECP) standard, the Small Computer System Interface (SCSI) interface standard, and network architecture standards including Ethernet and Token Ring network standards.

Figure 29:
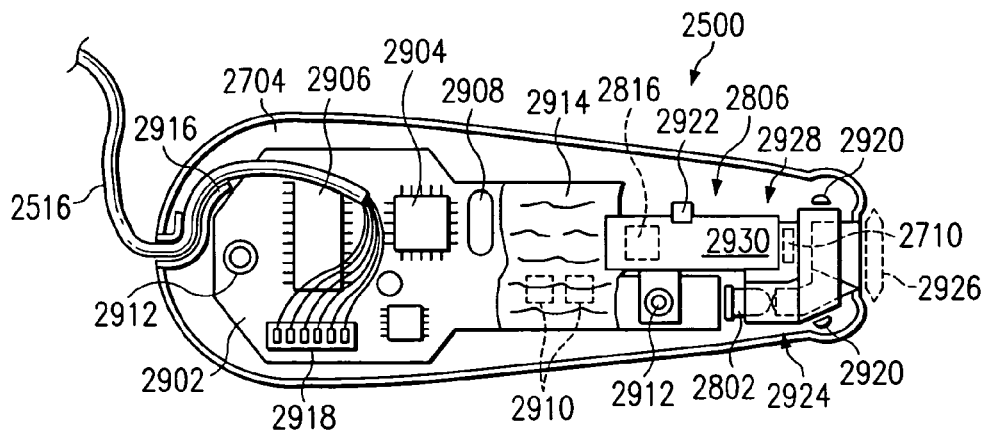
FIG. 29 illustrates the optical reader of FIG. 26 with portions of the outer shell removed to show the interior components.

It is desirable to provide an optical reader which is economical to produce, therefore reducing the number of components and simplifying the design and construction of the remaining components are important features of the current invention. Referring now to FIG. 29, there is illustrated the optical reader 2500 with the upper shell removed to show the interior components. A printed circuit board (PCB) 2902 is provided for physical mounting and electrical interconnection of the necessary electronic components comprising the decoder circuit and output signal interface circuit. These components include a microprocessor 2904, memory (not shown), interface circuit 2906, timing crystal 2908 and signal amplifiers 2910. Note that for clarity of illustration, the individual circuit lines and many smaller components such as resistors which appear on the actual PCB 2902 are not illustrated in FIG. 29. The PCB 2902 may be mounted to the lower shell 2704 of the reader by means of locating pins 2912 molded into the shell and protruding through corresponding holes in the PCB. These holes can further receive screws (not shown) for securing the upper shell 2702 to the lower shell 2704 during final assembly. The portion of the PCB 2902 mounting amplifiers 2910 is preferably enclosed is shielding material 2914 to prevent stray electrical signals from creating noise in the amplifier circuitry. The control cord 2516 connects the reader 2500 to the external computer 2824, entering the shell and passing through strain relief fitting 2916 for connecting to the PCB 2902 with electrical connector 2918.

The optical system 2806 may be mounted to the front end of the PCB 2902 and further secured to the lower shell 2704 with locating pins 2920 and/or clips 2922 as needed. The radiant energy source 2802 is typically mounted to the PCB 2902 and electrically connected thereto to receive electrical power. The radiant energy source 2802 produces light or other radiant energy which is delivered into the optical system 2806. In one embodiment, the radiant energy source 2802 is a light emitting diode (LED), however it will be apparent that a laser or other radiant energy source could be used. The optical system 2806 comprises a projection portion 2924 for directing the radiant energy along a projection path extending from the radiant energy source 2802 to the target region 2926. The optical system 2806 further includes a collection portion 2928 for collecting the radiant energy reflected from a symbol (e.g., a barcode) when the symbol occupies the target region 2926 and directing the collected radiant energy along a collection path extending from the target region to the photodetector 2816. The collection path of the optical system 2608 is typically enclosed by a light shield 2930 to prevent unwanted radiant energy from entering the optical system and being reflected or scattered into the photodetector 2816.

Figure 30:
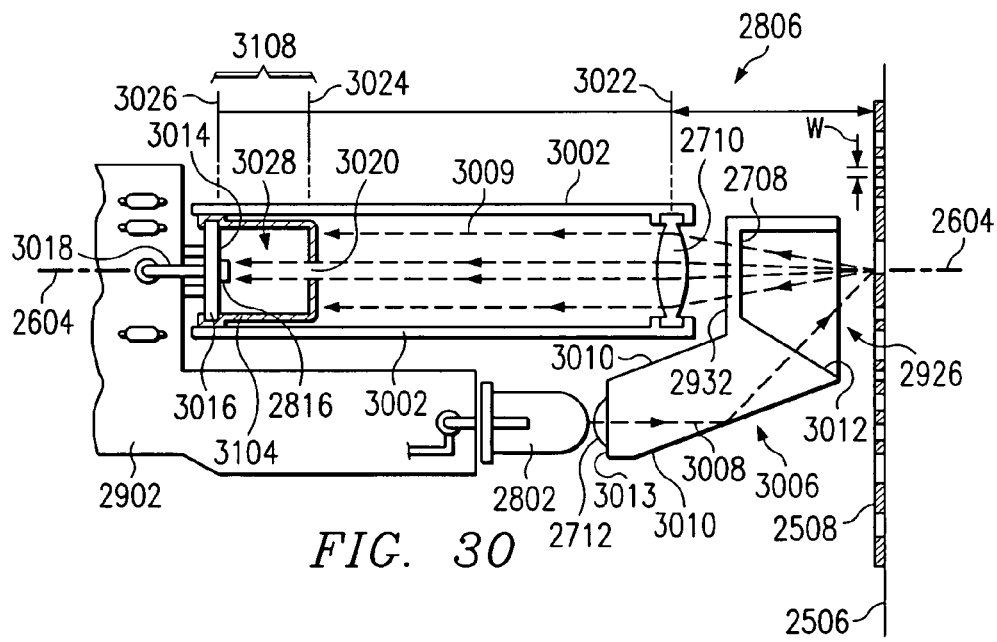
FIG. 30 illustrates an enlarged view of the optical system of the optical reader while reading a bar code.

Referring now to FIG. 30, there is illustrated an enlarged view of the optical system 2608 showing its constituent components. In FIG. 30, the top of the light shield 2930 has been removed for clarity of illustration, but the walls 3002 of the light shield are present on either side of the collection axis 2604. In this embodiment, the radiant energy source 2802 is mounted on a forward extension 3004 of the PCB 2902. At least a portion of the radiant energy emitted by the source 2802, which is typically visible—or IR—wavelength light, enters the projection portion 2924 of the optical system. In the embodiment shown, the projection portion includes a guideway 3006 which directs the radiant energy (denoted by rays 3008) from the source 2802 to the target region 2926. In one embodiment, the guideway 3006 comprises a transparent prism which directs the radiant energy 3008 by reflection from the guideway sides 3010 and by refraction at the guideway ends 3012, 3013. It will be apparent, however that other embodiments may utilize a mirror or fiber optics as the guideway 3006. Alternatively, other embodiments may directly illuminate the target region 2926 from the source 2802 without the use of a guideway. A guideway lens 2712 may be used at the upstream end 3013 of the guideway 3006 to increase the amount of radiant energy collected from the source 2802 for delivery to the target region 2926.

The radiant energy 3008 delivered to the target region 2926 illuminates any barcode 2508 present, causing the energy to be scattered from the surface of the barcode as illustrated. At least a portion of the energy scattered from the barcode 2508 is reflected into the collection lens 2710, forming a reflected image of the barcode. This image is directed along the collection axis 2604 of the optical system downstream toward the photodetector 2816. As the barcode 2508 moves through the target region 2926, the reflected image of the alternating light and dark (i.e., more reflective and less reflective) bars forming the symbol will be directed across the photodetector 2816, causing the output electrical signals to vary correspondingly. Given output electronic signals having sufficient signal-to-noise ratio, decoding circuits of known design can amplify and decode the output electrical signals from a photodetector and identify the corresponding barcode. However, prior to the current invention, photodetectors providing signals having sufficient signal-to-noise ratio were not available at a sufficiently low manufacturing cost. Of particular challenge is obtaining a high signal-to-noise ratio electrical signal from a photodetector without utilizing a multi-stage photo amplifier. Further, it is preferred that the system utilize as few optical elements as possible.

Referring still to FIG. 30, the photodetector 2816 of the current embodiment is mounted on the top surface 3014 of a base 3016 and electrically connected to the PCB 2902 with leads 3018. The photodetector 2816 may be a device selected from the group of known light-sensitive devices including photo-diodes, photo-transistors, photo-resistors, photomultiplier tubes, and Charge Coupled Devices (CCD). Alternately, the photodetector 2816 may be another type of device for producing electrical signals corresponding to light incident thereupon. In a preferred embodiment, the photodetector 2816 is a photo-diode which provides a desirable combination of light-sensitivity and low cost.

Disposed upstream on the collection path from the photodetector 2816 is a pinhole aperture 3020. Preferably, there are no intervening or refractive or diffractive elements between the pinhole aperture 3020 and the photodetector 2816, as their presence will increase the cost of the device. A pinhole aperture is a well known optical element which provides a well defined, virtually undistorted image of objects across a wide angular field (i.e., good depth of focus) and over a large range of distances (i.e., good depth of field). A pinhole aperture does not focus the energy passing therethrough, but rather increases the contrast of the image, although at the same time decreasing its luminance. Raising the contrast of the image passed to the photodetector 2816 increases the signal-to-noise ratio of the resulting electrical output. The lower luminance of the image merely reduces the overall output signal strength and can be easily overcome by electronic amplification if the signal-to-noise ratio of the signal is high. Thus, by positioning the pinhole aperture 3020 upstream of the photodetector 2816 in the current invention, the image contrast of the barcode image is increased such that an inexpensive single stage photodetector can provide an electrical signal having sufficient signal-to-noise ratio to allow decoding of the barcode without encountering excessive signal noise during electronic amplification.

The collection lens 2710 is disposed upstream on the collection path (i.e., toward the barcode which is the source of the image) from the pinhole aperture 3020. Preferably, collection lens 2710 is a magnifying lens, i.e., refracting the light rays passing therethrough to create an image which has increased dimensions compared to the actual bar code. The magnifying lens illustrated in FIG. 30 is a single element double convex lens. In another embodiment, a single element plano-convex lens may be used. In still further embodiments, other single element or multi element magnifying lenses can be used for collection lens 2710. Preferably, there are no intervening refractive or diffractive elements between the pinhole aperture 3020 and the collection lens 2710, as their presence will increase the cost of the device.

The refracted light rays 3009 leaving the collection lens 2710 form an image of the bar code which is dimensionally magnified as it moves toward the pinhole aperture 3020, thereby increasing the apparent width of the bars when their image is received at the pinhole aperture. The portion of the image passing through the pinhole aperture 3020 and reaching the photodetector 2816 will likewise be dimensionally magnified. Thus, the optical system 2806 of the current embodiment, combining dimensional image magnification (provided by the collection lens 2710) and contrast enhancement (provided by the pinhole aperture 3020) effectively acts to pre-amplify the optical signal reaching the photodetector 2816 such that the electrical output signals 2818 will have sufficient signal-to-noise ratio for amplification and decoding without requiring a multi stage electronic photo amplifier which would be more expensive to manufacture. Described another way, the optical system according to one embodiment of the current invention provides increased resolution (i.e., the ability to distinguish between two lines or points in a symbol) as follows: The bar code 2508 to be read has a minimum unit width denoted by W, for example, the minimum width of a bar in the bar code. The light rays 3009 of the image are refracted by the collection lens 2710 such that the minimum unit width of the bar code is dimensionally magnified, for example, from W to 2×W (i.e., a factor of 2×) as it moves from the target plane 2506 to the pinhole aperture plane 3024. The pinhole aperture 3020 is selected to have a diameter, for example 0.5×W, which is smaller than the magnified minimum unit width. Thus, only a sample (denoted by reference numeral 3028) of the image rays may pass through the aperture 3020 to the photodetector 2816 lying in the photodetector plane 3026. This results in the photodetector 2816 seeing (i.e., having in its field of view), at most, either a portion of a single feature (bar or space) or portions of one bar and one adjacent space. The photodetector never sees portions of three adjacent features at the same time. This arrangement results in a very high signal-to-noise ratio being produced by the photodetector 2816. In one embodiment of the current invention, the optical system 2806 provides at the photodetector plane 3026 an image of the symbol 2508 at the target plane 2506 which is dimensionally magnified within the range of about 0.5× to about 5×. In another embodiment, the optical system 2806 provides at the photodetector plane an image of the symbol at the target plane which is magnified within the range of about 1.5× to about 2.5×. In yet another embodiment, the optical system 2806 provides at the photodetector plane an image of the symbol at the target plane which is dimensionally magnified within the range of 1.9× to about 2.1×.

Referring still to FIG. 30, a protective window 2708 may be provided along the collection path upstream from the magnifying lens 2710. The protective window 2708 has parallel surfaces which are disposed substantially perpendicular to the collection path 2604 and thus do not substantially refract or diffract light rays passing therethrough. In the embodiment illustrated, the protective window 2708 is molded as an integral portion of the component which also comprises the projection guideway 3006 and guideway lens 2712. In one embodiment of the current invention, the collection portion 2928 of the optical system 2806 consists of only the protective window 2708, the magnifying collection lens 2710 and the pinhole aperture 3020 arranged in that order between the target symbol 2508 and the photodetector 2816. Such an embodiment provides a functional optical system having very low production costs.

Figure 31:
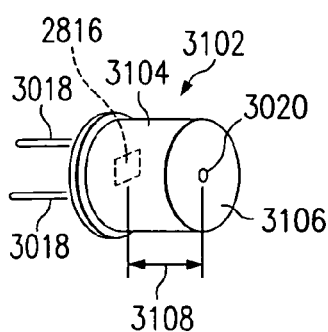
FIG. 31 illustrates a perspective view of the detector unit used in an embodiment of the optical reader.
Figure 32:
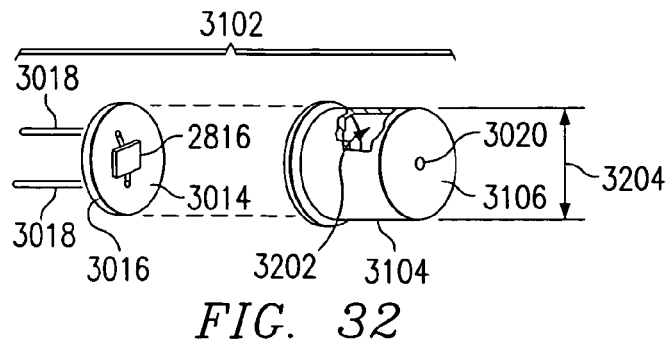
FIG. 32 illustrates an exploded view of the detector unit of FIG. 31.

Referring now to FIGS. 31 and 32, there is illustrated a discrete detector unit 3102 which may be used in an embodiment of the invention. The detector unit 3102 comprises the photodetector 2816 and the pinhole aperture 3020 packaged together in a discrete unit. Such packaging decreases production costs by reducing the assembly's part count and by reducing the number of components which must be assembled.

As best seen in FIG. 32, the detector unit 3102 includes a base 3016 having a top surface 3014 upon which the actual photodetector 2816 is mounted. Note that the photodetector 2816 may be a separate electronic component which has been mounted to the base 3016 or alternately, it may be a device formed as an integral part of the base substrate. A cap 3104 is mounted to the base 3016. The cap 3104 has a top portion 3106 which is spaced apart from the top surface 3014 of the base 3016 to define an interior cavity 3202 containing the photodetector 2816. The cap 3104 has a single pinhole 3020 formed therethrough at a predetermined distance 3108 from the photodetector 2816. Except for the pinhole aperture 3020, the cap 3104 is preferably light-tight. In one embodiment of the invention, the cap 3014 of the detector unit 3102 is a cylindrical metallic canister having a flat upper portion 3106. Using a metallic canister for the cap 3014 has two advantages: first, it provides a rugged container which protects the photodetector from damage during transportation, handling and assembly; and second, the metallic material allows a pinhole aperture 3020 having high dimensional accuracy to be formed by drilling, punching or otherwise machining a hole through the metallic surface. In addition, cylindrical metallic canisters suitable for use as cap 3014 are readily available at very low costs in the electronic industry, having been used for many years as protective caps for transistors and other semiconductor devices. To provide for a convenient sized optical reader, one embodiment of the current invention utilizes a detector unit 3102 having a cap 3104 with a diameter 3204 within the range of about 3 millimeters to about 20 millimeters. Another embodiment of the current invention utilizes a detector unit 3102 having a cap 3104 with a diameter 3204 within the range of about 4 millimeters to about 8 millimeters. Yet another reader according to the current invention utilizes a cap for the detector unit 3102 having a diameter 3204 within the range of about 5.5 millimeters to about 6.5 millimeters.

The predetermined distance 3108 between the pinhole aperture plane 3024 and the photodetector plane 3026 will affect the overall magnification of the image (or portion of the image) received at the photodetector 2816. In one embodiment of the current invention, the predetermined distance 3108 is within the range of about 1 millimeter to about 10 millimeters. In another embodiment of the current invention, the predetermined distance 3108 is within the range of about 3 millimeters to about 7 millimeters. In yet another embodiment, the predetermined distance 3108 between the photodetector 2816 and the pinhole aperture 3020 is within the range of about 4.5 millimeters to about 6 millimeters.

Referring now to FIG. 36, there is illustrated a flowchart of a method of reading a bar code in accordance with another aspect of the current invention. The method starts in block 3602 and proceeds to the first function block 3604 wherein the target region is illuminated with a radiant energy generated by a radiant energy source which is directed from the source to the target region. Next, flow continues to function block 3606 wherein the bar code or other symbol is moved through the target area. Flow next proceeds to block 3608 which represents transmitting an image of the illuminated bar code through an optical system along a collection path extending from the target region to a photodetector. The step of transmitting includes a first sub-step 3610 wherein the reflected image of the bar code is dimensionally magnified with an optical element which is disposed along the collection path between the target region and the photodetector. Preferably, the optical element used for dimensional magnification is a magnifying lens, either a double convex lens or a plano-convex lens. Further, it should be noted that sub-step 3610 is preferred but not required.

The step 3608 of transmitting an image of the illuminated bar code further comprises a second sub-step 3612 which is increasing the contrast of the reflected image and decreasing the luminance of the image by passing it through an optical element disposed along the collection path between the target region and the photodetector. Note that when sub-step 3610 is performed, the optical element for magnifying the image is disposed between the bar code and the optical element which increases the contrast of the reflected image. In an embodiment of the invention, the optical element which increases the contrast of the reflected image is a passive device, i.e., it requires no electrical energy or other external power. In another embodiment, the optical element which increases the contrast of the image is combined in a discrete package with the photodetector. In yet embodiment, the optical element which increases the contrast of the reflected image is a pinhole aperture. The pinhole aperture may be formed through the body of a discrete package enclosing the photodetector or the pinhole aperture may be a separate element included in the optical system.

Flow now continues to function block 3614 wherein the reflected image of the bar code is received by the photodetector. Flow then continues to function block 3616 wherein the photodetector generates output electrical signals indicative of the radiant energy received. Flow then proceeds to function block 3618 wherein the output electrical signals produced by the detector are decoded to provide an indication of the information contained in the bar code. The method of reading the bar code is now complete as indicated by the flow proceeding to the "End" block 3620.

Figure 37:
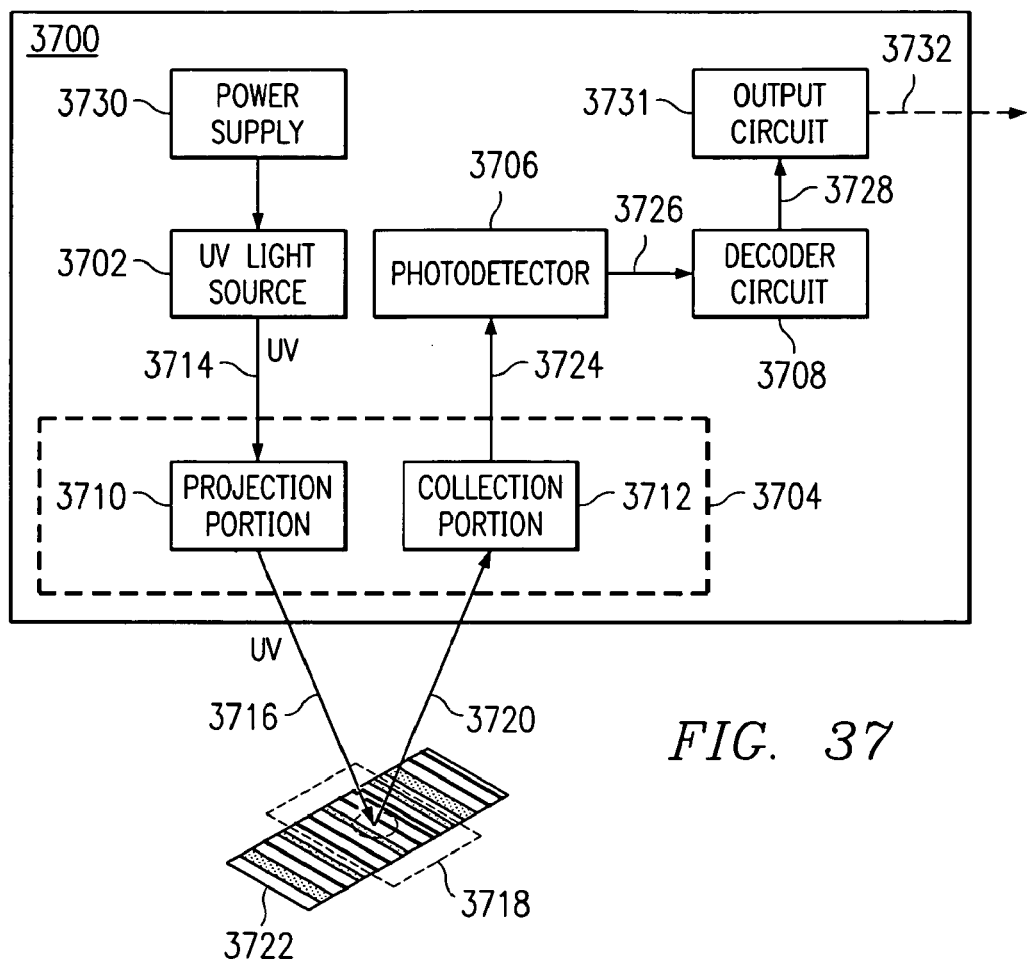
FIG. 37 illustrates a general functional block diagram of the components of an optical reader in accordance with another embodiment.

Referring now to FIG. 37, there is illustrated a diagrammatic view of an optical reader in accordance with another aspect of the invention. Externally, the optical reader of this embodiment may be substantially similar in construction to the optical readers 2500 or 3300 previously described. However, the optical reader 3700 is adapted for reading bar codes (or other such optical indicia encoding information therein) having one or more ultraviolet-wavelength-responsive properties. Two examples of ultraviolet-wavelength-responsive properties are the property of reflecting ultraviolet wavelengths and the property of fluorescing upon exposure to ultraviolet wavelengths. It will further be appreciated that fluorescence is the property of emitting electromagnetic radiation (e.g., visible light) resulting from and occurring only during the absorption of radiation from another source (e.g., ultraviolet light).

The optical reader 3700 includes an ultraviolet light source 3702, an optical system 3704, a photodetector 3706 and a decoder circuit 3708. The ultraviolet light source 3702 generates light having a wavelength which is shorter than the wavelength for visible light and longer than the wavelength for X-rays. The ultraviolet light source 3702 may be any device capable of producing electromagnetic radiation having the desired wavelength, including lamps, bulbs, tubes, lasers and other devices known in the art.

Figure 38:
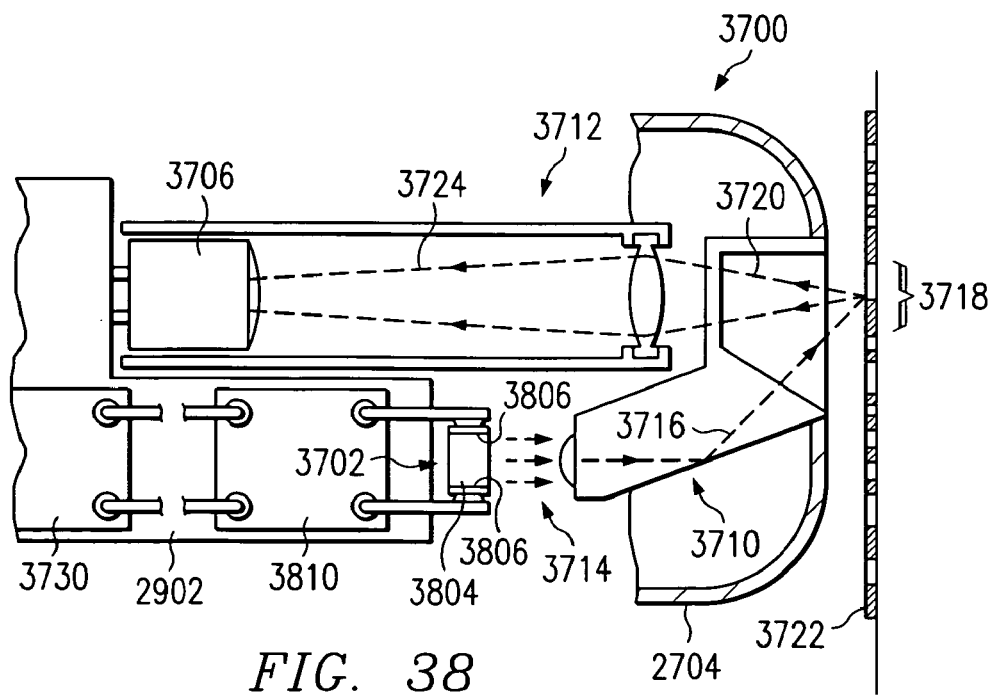
FIG. 38 illustrates an enlarged view, with portions broken away, of the front end of the embodiment.

Referring now to FIG. 38, there is illustrated a partial cut-away view of the front end of one embodiment of optical reader 3700. Ultraviolet lamp 3702 comprises a gas-filled glass tube 3804 having cathode 3806 and anode 3808 electrodes. A voltage impressed across the electrodes 3806, 3808 causes electrons leaving the cathode to bombard the gas, resulting in the emission of ultraviolet light 3714. In a preferred embodiment, the gas within the tube 3804 is mercury vapor. When a mercury vapor lamp or other such device is used for the ultraviolet light source 3702, the optical reader 3700 may further include a high voltage power supply 3730 and/or a ballast circuit 3810. The ballast circuit 3810 may be used to provide the necessary starting voltage and/or for stabilizing the current supplied to the mercury vapor lamp 3702 or other ultraviolet light source. Conventional designs for both a high voltage power supply and for a ballast circuit are known in the art and will not be described in detail.

The optical system 3704 of optical reader 3700 includes a projection portion 3710 and a collection portion 3712. The projection portion 3710 directs the ultraviolet light (denoted by arrow 3714) received from the ultraviolet light source 3702 along a projection path (denoted by arrow 3716) extending from the ultraviolet light source to a target region 3718. The collection portion 3712 of the optical system 3704 collects light (denoted by arrow 3720) from a bar code 3722 when the bar code occupies the target region 3718 and directs the collected light along a collection path (denoted by arrow 3724) extending from the target region to the photodetector 3706.

The photodetector 3706 generates output electrical signals (denoted by arrow 3726) indicative of the light incident thereon having a wavelength within a predetermined range of wavelengths. In other words, the photodetector 3706 is responsive (i.e., generates output signals) only to light having a wavelength within a preselected range and "ignores" light having other wavelengths. The photodetector 3706 may be a photodiode, phototransistor, photoresistor or charged coupled device. In one embodiment, the photodetector 3706 is responsive to light having a predetermined range of wavelengths between visible light and X-rays, i.e., in the ultraviolet spectrum. Such an embodiment may be used to read a bar code 3722 having the ultraviolet-wavelength-responsive property of reflecting ultraviolet wavelengths. In other words, illuminating the bar code 3722 with ultraviolet light will cause a light-producing response, namely, ultraviolet light 3716 will be reflected from the bar code into the collection portion 3712. Of course, the bars and spaces of the bar code 3722 must have different reflectivity in the ultraviolet wavelengths; however, the light 3720 from the bar code maintains its ultraviolet character.

In another embodiment, the photodetector 3706 is responsive to visible light, i.e., the predetermined range of wavelengths is within the spectrum of visible light. This embodiment may be used to read bar codes 3722 having the ultraviolet-wavelength-responsive property of fluorescing with visible light when illuminated with ultraviolet wavelength light. Inks which fluoresce in the visible spectrum under ultraviolet illumination are well known in the art, e.g., inks used for making so-called "black light" posters, and any of these inks can be used for making bar codes to be read by this embodiment. Further, some ultraviolet fluorescent inks are transparent and non-fluorescing to visible light, thus allowing a bar code 3722 to be provided which is invisible to human sight under normal lighting conditions. Such invisible bar codes could be used where a normal (i.e., human visible) bar code is undesirable, either for appearance or for security reasons.

Referring now to FIG. 39, there is illustrated a diagrammatic view of the collection portion 3712 of the optical system 3704 in accordance with yet another embodiment. This embodiment may be used to read bar codes 3722 which are reflective (not fluorescent) in ultraviolet wavelengths by using a photodetector 3706 which is responsive to light in the visible spectrum. In this embodiment, the collection portion 3712 of the optical system 3704 is adapted to receive light 3720 having a first wavelength from the bar code 3722 and deliver light 3724 having a second wavelength to the photodetector 3706. This conversion between the first wavelength of the received light 3720 and the second wavelength of the delivered light 3724 may be accomplished by providing in the collection portion 3712 a fluorescent target member 3902 disposed so as to absorb at least a portion of the received light (i.e., the light absorbed by the target member having the first wavelength) and emitting in response thereto light 3724 having a second wavelength. The emitted light 3724 is directed toward the photodetector 3706 for further processing. In the embodiment illustrated in FIG. 39, a mirror or prism 3904 is used to direct the incoming light 3720 onto the target member 3902 where it is absorbed and then re-emitted at the second wavelength, with at least a portion being directed towards the photodetector 3706. The target member 3902 may be constructed from, or coated with, known fluorescent materials which emit visible light upon illumination with ultraviolet light.

A decoder circuit 3708 receives the output electrical signals 3726 from the photodetector 3706. The decoder circuit 3708 produces, in response to the received signals 3726, electrical signals (denoted by arrow 3728) which are indicative of the information encoded in the bar code 3722. Decoder circuits for decoding electrical signals indicative of a bar code pattern are known in the art and will not be described in detail.

Referring now to FIG. 40, there is illustrated an output circuit which may be included in optical reader 3700. The output circuit 3731 receives electrical signals 3728 indicative of the information encoded in the bar code 3722 from the decoder circuit 3708 and transmits output signals (denoted by arrow 3732) indicative of the information encoded in the bar code from the optical reader. In one embodiment, the output circuit 3731 includes a modulator 4002 receiving the electrical signals 3728 indicative of information encoded in the bar code from the decoder 3708. The modulator 4002 combines the signal 3728 with a carrier signal 4003 from an oscillator 4004 to produce a modulated output signal 4006 indicative of information encoded in the bar code. The modulated signal 4006 is then passed to a transmitter circuit 4008 for amplifying the modulated signal as necessary and transmitting the final signal 3732 from the optical reader 3700. In one embodiment, the transmitter circuit 4008 transmits output signals 3732 using radio frequency (RF) wavelengths. In this case, as illustrated in FIG. 40, an antenna 4010 is operably connected to the transmitter circuit 4008 for sending the output signals 3732 from the optical reader. In another embodiment, the transmitter 4008 transmits output signals 3732 using infrared (IR) wavelengths. In this case, the transmitter 4008 will output to an infrared emitter (not shown) rather than to an antenna.

In yet another embodiment, the output circuit 3731 utilizes a hard-wired connection for outputting signals 3732 indicative of the information encoded in the bar code. In one such embodiment, the output circuit 3731 produces an output signal 3732 which is an electrical signal which emulates keyboard keystrokes and is directed to the keyboard port of a computer (not shown). In other embodiments, electrical outputs in accordance with other data transfer standards may be used.

Figure 41:
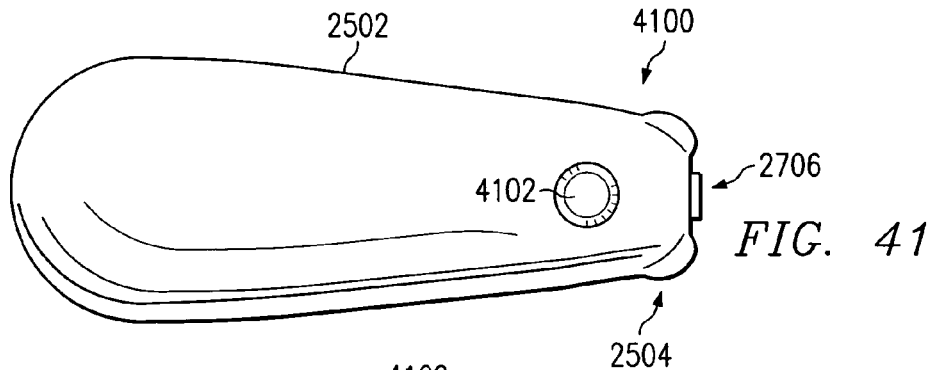
FIG. 41 illustrates a top plan view of an optical reader according to an another embodiment.
Figure 42:
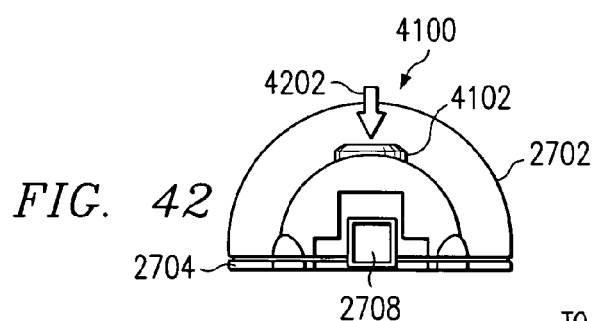
FIG. 42 illustrates a front elevation view of the optical reader of FIG. 41.

Referring now to FIGS. 41 and 42, there are illustrated external views of an optical reader in accordance with another aspect of the invention. The optical reader 4100 of this embodiment has dual functionality, i.e., it may be used for accessing a remote location on a network in either of two distinct ways. First, the optical reader 4100 may be used to access a remote location on a network by optically scanning an encoded indicia (e.g., a bar code) with an optical scanning system. The optical scanning system provides signals indicative of the information encoded in the scanned indicia to an associated computer disposed on a network. The associated computer then proceeds to use the information from the encoded indicia to access a remote location on the network (typically, by first accessing a second computer on the network, e.g., ARS 308) as previously described and illustrated herein (e.g., FIGS. 3, 4a-4e, 16, 18-24). Second, the optical reader 4100 may be used to access a particular remote location on the network (the "dedicated address") by pressing a dedicated button 4102 on the optical reader. The dedicated button 4102 activates circuitry (described in detail below) within the optical reader 4100 for providing signals indicative of information corresponding to the particular remote location. This information does not originate from the user optically scanning an encoded indicia. These signals are provided to the associated computer, which then proceeds to use the information corresponding to the particular remote location to access the remote location on the network without requiring scanning of any optical indicia.

Externally, the optical reader 4100 of this embodiment is similar in many respects to the optical reader 2500 previously described, having an outer shell 2502 with upper and lower shell portions 2702, 2704 and a scanning portal 2706 with protective window 2708 disposed at the front end 2504. In an alternative embodiment (not shown), the optical reader 4100 may be fitted with a stylized outer shell 3302 as previously described and illustrated for optical reader 3300. The dedicated button 4102 may be disposed at any convenient place on the outer shell 2502 which allows the button to be pressed by the user (denoted by arrow 4202).

Figure 43:
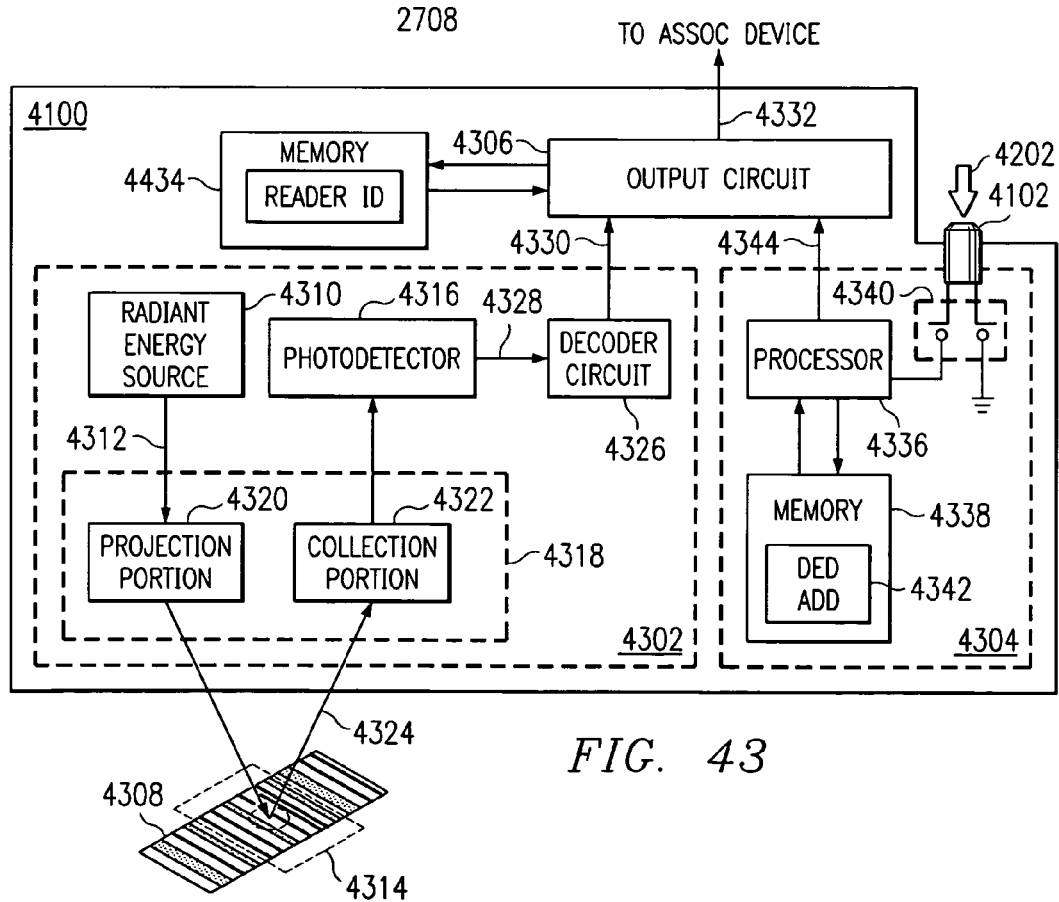
FIG. 43 illustrates a general functional block diagram of the components of one embodiment of the optical reader.

Referring now to FIG. 43, there is illustrated a general block diagram of the components of the optical reader 4100. The optical reader 4100 includes an optical scanning system 4302, a dedicated address memory system 4304, and an output circuit 4306. The optical scanning system 4302 scans an encoded indicia 4308 (e.g., a bar code) and provides output signals which are indicative of the information encoded in the scanned indicia. The dedicated address memory system 4304 provides output signals which are indicative of information corresponding to a particular remote location when the dedicated button 4102 is pressed. The output circuit 4306 receives the output signals from both the optical scanning system 4302 and the dedicated address memory system 4304 and transmits them from the optical reader 4100 to an associated device, typically a nearby computer. The output circuit 4306 may utilize a hard-wired connection and/or a wireless connection (e.g., RF or IR wavelengths) to send the signals to the associated device as previously described herein.

In some embodiments, the optical scanning system 4302 may be constructed in accordance with those of the optical readers 2500 or 3700 as previously described herein and illustrated (e.g., FIGS. 28-32 and 37-39). In alternative embodiments, the optical scanning system 4302 may be constructed in accordance with known optical scanning systems. In the embodiment illustrated in FIG. 43, the optical scanning system 4302 includes a radiant energy source 4310 for generating a radiant energy (denoted by arrow 4312) for illuminating a target region 4314. The radiant energy source 4310 may be any of the sources previously described, for example, devices producing light having wavelengths in the visible, infrared (IR), or ultraviolet (UV) portions of the spectrum. A photodetector 4316 is provided for generating output electrical signals indicative of the radiant energy incident thereon. An optical system 4318 is provided including a projection portion 4320 for directing the radiant energy 4312 along a projection path extending from the radiant energy source 4310 to the target region 4314, and a collection portion 4322 for collecting the radiant energy (denoted by arrow 4324) from the encoded symbol 4308 when the encoded symbol occupies the target region. The collected radiant energy is directed by the collection portion 4322 along a collection path extending from the target region 4314 to the photodetector 4316. A photodetector 4316 produces electrical signals (denoted by arrow 4328) indicative of the energy incident thereon. A decoder circuit 4326 is provided which receives photodetector signals 4328, decodes the pattern of the signal in accordance with known processes, and produces decoded output signals (denoted by arrow 4330) indicative of information encoded in the scanned symbol 4308. The decoded output signals 4330 are routed to the output circuit 4306 to be sent to the associated device. An output circuit signal (denoted by arrow 4332) resulting from the optical scanning of encoded indicia by the user is termed a "scan code".

Referring now to FIG. 44, there is illustrated a sample scan code sent from the output circuit 4306 of the optical reader 4100 to the associated device. The scan code 4402 comprises a number of fields of information including a header field 4404 indicative of message start, a subject field 4406 indicative of information that was encoded in the scanned indicia 4308, and a stop field 4408 indicative of message end. The subject field contents 4406 may be any type of information indicative of the information that was encoded in the scanned indicia 4308. For example, when the scanned indicia 4308 is a bar code on a consumer product, the subject field 4406 may contain all or part of a number assigned to the consumer product (e.g., a Universal Product Code number) which was encoded in the scanned indicia. In other cases, the subject field 4406 may contain numeric or alphanumeric characters encoded in a proprietary bar code. The header field 4404 and stop field 4408 are typically added by the output circuit 4306 to the subject information which is supplied by the decoder 4326. The scan code 4402 may further include a type identification field 4410 indicative of the type (i.e., format) of encoded indicia that was scanned (e.g., UPC, ISBN, ISSN, etc.). The type identification of an indicia is typically determined by the decoder 4326 during the decoding process. Further, the scan code 4402 may include an optical reader identification field 4412 indicative of the serial number of the optical reader used. This serial number may, for example, be stored in a memory 4434 accessible by the output circuit 4306.

Referring again to FIG. 43, the dedicated address memory system 4304 comprises a processor 4336, an electronic memory 4338 operably connected to the processor, and an electrical switch 4340 operably connected to the processor. In the embodiment illustrated, the processor 4336 is a separate device from the decoder 4326 of the optical scanning system 4302. However, in another embodiment, the processor 4336 and the decoder circuitry 4326 may be portions of a common device or circuitry. The memory 4338 includes a memory location 4342 storing information corresponding to the particular remote location (i.e., the dedicated address) on the network. The dedicated address information stored in the memory location 4342 does not originate from the optical scanning of an encoded indicia by the user. Typically, the memory 4338 is pre-programmed by the manufacturer or distributor to contain the desired dedicated address information. In one embodiment, the dedicated address information cannot be changed by the user, e.g., where memory 4338 is a non-erasable read-only memory (ROM). In another embodiment, the memory 4338 is re-programmable; however, the dedicated address information is only changed in response to receiving signals from an attached computer.

The electrical switch 4340 is electrically connected to the processor 4336 and mechanically connected to the dedicated button 4102 such that pressing the button will provide an electrical signal to the processor. It will be appreciated that the dedicated button 4102 and button-activated switch 4340 may be replaced with a toggle switch, slide switch, touch switch circuit or other equivalent elements allowing the user to provide a two-state (i.e., ON/OFF) signal to the processor 4336.

In response to activation of the electrical switch 4340, the processor 4336 accesses the electronic memory 4338 and retrieves the dedicated address information corresponding to a particular remote location (i.e., the dedicated address) from the memory location 4342. It is important to note that the dedicated address information may be any type of information which can be associated with a particular remote location on the network. In one embodiment, the dedicated address information may be an actual network address (e.g., a URL) of the remote location. In another embodiment, the dedicated address information may be a unique code number assigned by the manufacturer or distributor of the optical reader and correlated to the desired remote location in a database (e.g., the ARS database 310). In yet another embodiment, the dedicated address information may be a pre-existing code number assigned to an article of commerce in accordance with an extrinsic standard (e.g., a Universal Product Code number assigned to a consumer product), which number is correlated to the desired remote location in a database (e.g., the ARS database 310). The processor uses the dedicated address information to produce processor output signals (denoted by arrow 4344) indicative of the dedicated address information. The processor output signals 4344 are sent to the output circuit 4306 for transmission to the associated device. An output circuit signal 4332 resulting from activation of the dedicated address memory system by the user is termed a "dedicated code".

Referring now to FIG. 45 there is illustrated a sample dedicated code sent from the output circuit 4306 of the optical reader 4100 to the associated device. The dedicated code 4502 comprises a number of fields of information including a header field 4504 indicative of message start, a subject field 4506 indicative of the dedicated address information retrieved from the memory 4338 (i.e., corresponding to the particular remote location), and a stop field 4508 indicative of message end. The header field 4504 and stop field 4508 are typically added by the output circuit 4306 as previously described. In a preferred embodiment, the dedicated code 4502 has a format which is identical to the format for the scan code 4402. Thus, even though the dedicated code 4502 does not result from scanning an encoded indicia by the user, the dedicated code may further include a type identification field 4510. In such cases, the contents of the type identification field 4510 will be information retrieved from the dedicated memory 4338. If desired, the type identification field 4510 may contain information indicating that the subject information 4506 results from activation of the dedicated address memory system 4304. However, it is also possible to provide information in memory 4338 such that the type identification field 4510 in a dedicated code 4502 simulates (i.e., is indistinguishable from) a type identification field 4410 in a scan code 4402 resulting from the scanning of encoded indicia. Further, the dedicated code 4502 may include an optical reader identification field 4512 indicative of the serial number of the optical reader used as previously described for field 4412.

It will thus be apparent, that the optical reader 4100 may be configured to operate such that the associated computer or device receiving a signal 4332 from the optical reader 4100 will be incapable of distinguishing whether the signal is a scan code 4402 (resulting from actually scanning an encoded indicia) or a dedicated code 4502 (resulting from pressing the dedicated button). Such a configuration allows an optical reader 4100 incorporating the dedicated address memory system 4304 to be fully compatible with associated devices (e.g., computers), software applications (e.g., browsers), and network systems (e.g., servers, including ARS 308, and databases, including ARS database 310) designed for use with optical readers not having the dedicated address memory system.

Referring now to FIG. 46, there is illustrated a diagrammatic view of a system for accessing a remote location on a network using the optical reader 4100. The system includes a first computer 302 disposed (by means of network interface 304) on a network 306, which may be a global communication network such as the Internet. The optical reader 4100 is operably connected to the first computer 302. As previously discussed, this connection between the optical reader 4100 and the attached device may be hard-wired (as in the illustrated embodiment) or wireless. A second computer 308 (e.g., the ARS server) is also disposed on the network 306. A database 310 (e.g., ARS database) may be operably connected to the second computer 308. A third computer 312 (e.g., an advertiser's server) is disposed on the network 306 at a remote site. This system is similar to systems previously described and illustrated herein (e.g., FIGS. 3 and 16).

The process of connecting to the remote site on the network using the optical reader 4100 is similar in most respects to processes previously described and illustrated herein. However, in the current process, the signal provided by the optical reader 4100 to the associated device may be either a scan code 4402 (in response to actually scanning an encoded indicia 4308 with the optical scanning system 4302) or a dedicated code 4502 (in response to activating the dedicated address memory system 4304 by pushing dedicated button 4102). One of the scan code 4402 and the dedicated code 4502 is transmitted from optical reader 4100 to the first computer 302. The first computer 302, in response to receiving the code 4402 or 4502, accesses the second computer 308. Typically, this accessing will involve sending a packet of information (denoted by reference numeral 4602) including at least a portion of the code 4402 or 4502 across the network 306 from the first computer 302 to the second computer 308. A lookup operation is performed at the second computer 308 to match the scan code 4402 or the dedicated code 4502 received from the optical reader 4100 with a routing information for a remote location on the network. Typically this lookup operation is performed by accessing (denoted by reference numeral 4603) a computer database 310 including a plurality of codes and a plurality of routing information for remote locations on the network. In the database 310, each of the plurality of routing information is associated with at least one of the plurality of codes. The routing information corresponding to the code (4402 or 4502) received from the optical reader 4100 is then retrieved from the database 310 by second computer 308. The routing information (denoted by reference numeral 4604) is returned from the second computer 308 to the first computer 302. The routing information is then used by the first computer 302 to access (denoted by reference numeral 4606) the third computer 312 at the remote location on the network. Typically, after locating the third computer 312 at the remote location, information (denoted by reference numeral 4608) will be returned from the third computer to the first computer 302 for presentation to the user.

It is contemplated that the manufacturer of the optical reader 4100 will pre-program the dedicated address memory system 4304 with information corresponding to a network location sponsored by, or otherwise affiliated with, the manufacturer (e.g., a web site for the manufacturer, for the distributor of the reader, or for a paid advertiser). Users of the optical reader 4100 will thus always be able to access the dedicated location simply by pressing the dedicated button 4102, no scanning of an indicia is required.

Figure 47:
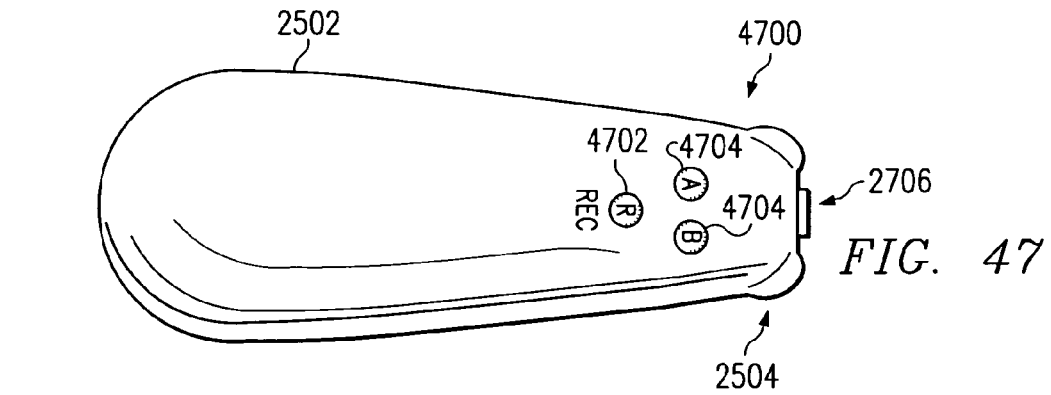
FIG. 47 illustrates a top plan view of an optical reader according to an another embodiment.
Figure 48:
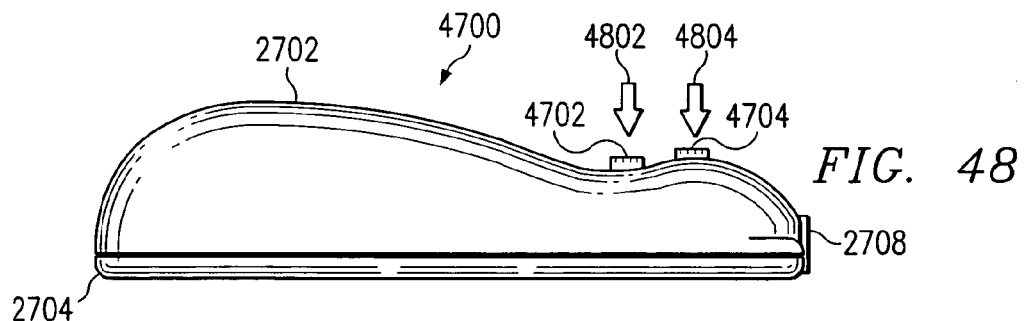
FIG. 48 illustrates a side elevation view of the optical reader of FIG. 47.

Referring now to FIGS. 47 and 48, there are illustrated external views of an optical reader in accordance with another aspect of the invention. Like some of the optical readers previously described herein, the optical reader 4700 of this embodiment has dual functionality, i.e., it may be used for accessing a remote location on a network in two distinct ways. However, the current embodiment has a new combination of functionality which makes it distinct from optical readers previously described. In the first way of accessing a remote location on a network, termed "scan mode", the optical reader 4700 optically scans an encoded indicia (e.g., a bar code) with an optical scanning system and immediately thereafter provides signals indicative of the information encoded in the just-scanned indicia to an associated computer 302 disposed on a network 306. The associated computer 302 then proceeds to use the information from the encoded indicia to access a remote location on the network as previously described and illustrated herein (e.g., FIGS. 3, 4a-4e, 16, 18-24, 46). In the second way of accessing a remote location on the network, the optical reader 4700 is first used to scan an encoded optical indicia and record (i.e., store) the information encoded in the just-scanned indicia. This is termed "record mode". Then, at a subsequent, user-selected time, the optical reader is used to retrieve the stored information and send signals indicative of the information encoded in the previously-scanned indicia to the associated computer 302. This is termed "playback mode". The information from the previously-scanned encoded indicia is used to access a remote location on the network as in the scan mode previously described.

Externally, the optical reader 4700 of this embodiment is similar in many respects to the optical readers previously described, having an outer shell 2502 with upper and lower shell portions 2702, 2704 and a scanning portal 2706 with protective window 2708 disposed at the front end 2504 to allow operation of the optical scanning system. It will be apparent that the optical reader 4700 may, in an alternative embodiment (not shown), be fitted with a stylized outer shell 3302 as previously described and illustrated for optical reader 3300. One or more buttons accessible from the exterior of shell 2502 may be provided on the optical reader 4700 to facilitate switching the reader into the record mode and the playback mode. In the embodiment illustrated, a first button 4702 is provided to facilitate switching the reader into the record mode and two second buttons 4704 are provided to facilitate selection between a plurality of memories to be used for record mode and playback mode. The first button 4702 and second buttons 4704 may be disposed at any convenient place on the outer shell 2502 which allows the button to be pressed by the user (denoted by arrows 4802 and 4804, respectively).

Figure 49:
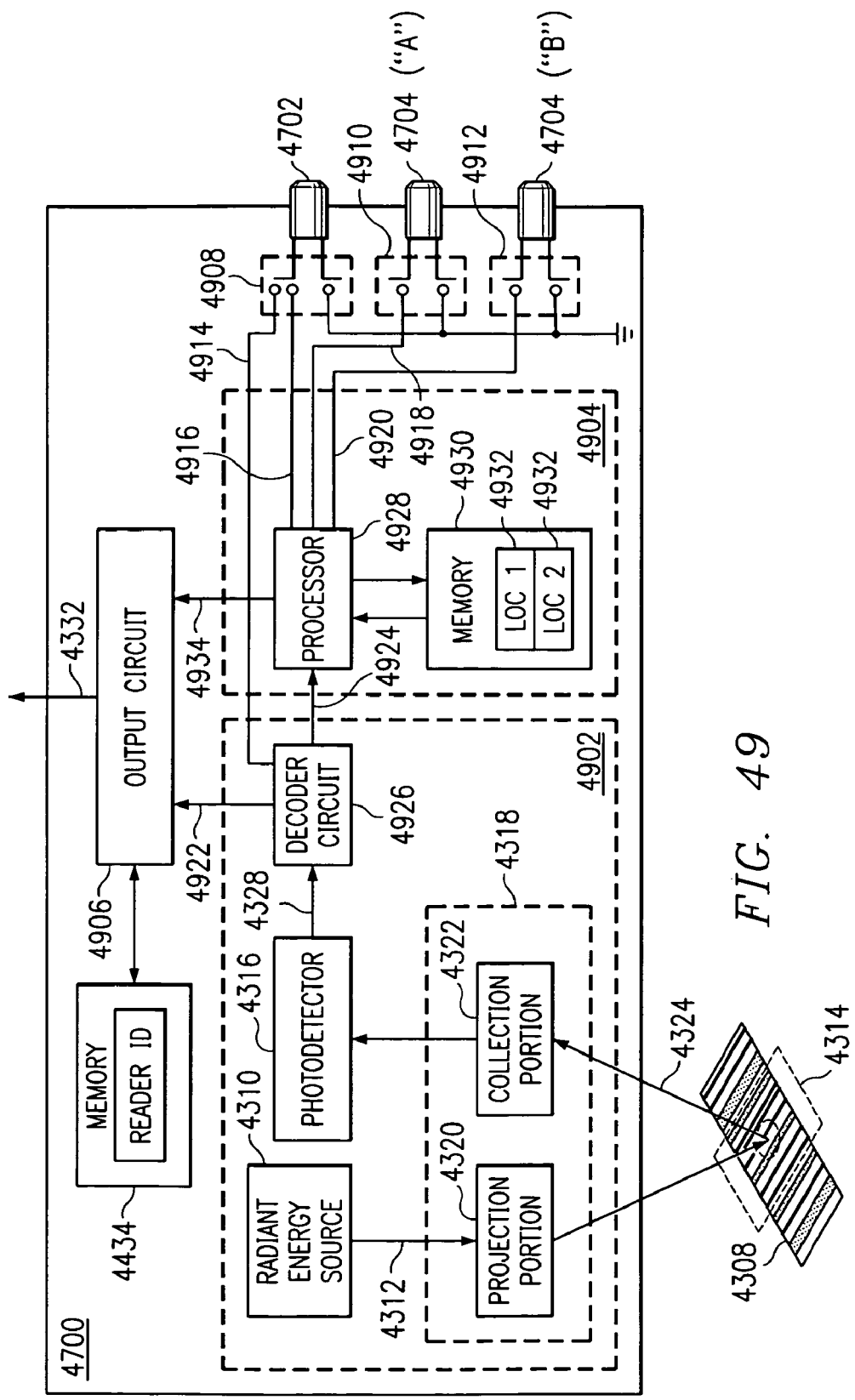
FIG. 49 illustrates a general functional block diagram of the components of one embodiment of the optical reader.

Referring now to FIG. 49, there is illustrated a general block diagram of the components of the optical reader 4700. The optical reader 4700 includes an optical scanning system 4902, a programmable memory system 4904 and an output circuit 4906. The optical reader may further include one or more electrical switches operably connected to the button(s) and accessible from the exterior of shell 2502. In the embodiment illustrated, electrical switches 4908, 4910 and 4912 are provided which are activated, respectively, by the operation of buttons 4702, 4704 (denoted with "A") and 4704 (denoted with "B"). The switch 4908 is electrically connected (by lead 4914) to the optical scanning system 4902 and (by lead 4916) to the programmable memory system 4904. The switch 4910 is electrically connected (by lead 4918) to the programmable memory system 4904, as is the switch 4912 (by lead 4920). Pressing the buttons 4702 and 4704 will provide electrical signals to the optical scanning system 4902 and/or the programmable memory system 4904 which facilitate switching into the record mode and/or into the playback mode as further described below. It will be appreciated that the buttons 4702 and 4704 and button-activated switches 4908, 4910 and 4912 may be replaced with toggle switches, slide switches, touch switch circuits or other equivalent elements allowing the user to provide two-state (i.e., ON/OFF) signals to the associated systems.

The optical scanning system 4902 scans an encoded indicia 4308 (e.g., a bar code) and provides output signals which are indicative of the information encoded in the scanned indicia. When the optical reader 4700 is in the scan mode, the output signals (denoted by reference numeral 4922) from the optical scanning system 4902 are sent to the output circuit 4906 for immediate transmission from the reader to the associated computer. When the optical reader 4700 is in the record mode, however, the output signals (now denoted by reference numeral 4924) from the optical scanning system 4902 are instead sent to the programmable memory system 4904 for storage as further described below.

In some embodiments, the optical scanning system 4902 may be constructed substantially in accordance with those of the optical readers 2500, 3700 or 4100 as previously described herein and illustrated (e.g., FIGS. 28-32, 37-39 and 41-43), except that the scanning system must be adapted to route the output signals (4922 or 4924) to the output circuit 4906 or programmable memory system 4904 in accordance with a user-selected mode. In alternative embodiments, the optical scanning system 4902 may be constructed substantially in accordance with known optical scanning systems, again with the understanding that the scanning system must be adapted to route the output signals (4922 or 4924) to the output circuit 4906 or programmable memory system 4904 in accordance with a user-selected mode. In the embodiment illustrated in FIG. 49, the optical scanning system 4902 includes a radiant energy source 4310 for generating a radiant energy (denoted by arrow 4312) for illuminating a target region 4314. The radiant energy source 4310 may be any of the sources previously described, for example, devices producing light having wavelengths in the visible, infrared (IR), or ultraviolet (UV) portions of the spectrum. A photodetector 4316 is provided for generating output electrical signals indicative of the radiant energy incident thereon. An optical system 4318 is provided including a projection portion 4320 for directing the radiant energy 4312 along a projection path extending from the radiant energy source 4310 to the target region 4314, and a collection portion 4322 for collecting the radiant energy (denoted by arrow 4324) from an encoded indicia or symbol 4308 when the encoded symbol occupies the target region. The collected radiant energy is directed by the collection portion 4322 along a collection path extending from the target region 4314 to the photodetector 4316. The photodetector 4316 produces electrical output signals (denoted by arrow 4924) indicative of the energy incident thereon.

A decoder circuit 4926 is provided which is operably connected to the photodetector 4316, to the programmable memory system 4904 and to the output circuit 4906. In addition, an electrical lead 4914 may be connected to the decoder circuit 4926 to provide a signal from the switch 4908 indicative of whether the button 4702 has been activated. The decoder circuit 4926 receives the photodetector output signals 4924 from the photodetector 4316, analyzes the pattern of the signal, determines the encoding type (i.e., format) of the scanned indicia, and decodes the pattern to extract the information encoded in the indicia. Circuitry for processing photodetector output signals to determine the encoding type of a scanned indicia and decode information from the indicia is known in the optical reader art and the details of such circuitry will not be described in detail. In one embodiment, the decoder 4926 produces decoder output signals indicative of the information extracted from the scanned indicia 4308. In another embodiment, the decoder 4926 produces decoder output signals indicative of the indicia type identification (TID) of the scanned indicia 4308. In yet another embodiment, the decoder 4926 produces decoder output signals indicative of both information extracted from the scanned indicia and the indicia TID. If the optical reader is in the scan mode, e.g., in this case if the button 4702 has not been pressed, then the decoder circuit 4926 sends the decoder output signals (i.e., arrow 4922) to the output circuit 4906 for immediate transmission to the associated computer 302. If, however, the optical reader is in the record mode, e.g., in this case, if the button 4702 has been pressed, then the decoder circuit 4926 sends the decoder output signals (i.e., arrow 4924) to the programmable memory system 4904 for further processing as described below.

Figure 50:
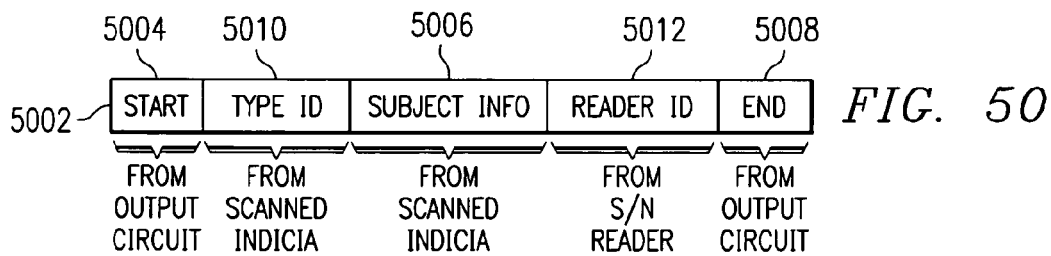
FIG. 50 illustrates a sample code transmitted from the optical reader to the associated device when the reader is in the scan mode.

Referring now to FIG. 50, there is illustrated a sample code sent from the output circuit 4906 of the optical reader 4700 to the associated computer 302 when the optical reader is used in the scan mode. The code 5002 comprises a number of fields of information including a header field 5004 indicative of message start, a subject field 5006 indicative of information that was encoded in the scanned indicia 4308, and a stop field 5008 indicative of message end. The subject field contents 5006 may be any type of information indicative of the information that was encoded in the scanned indicia 4308. As previously described, if the scanned indicia 4308 is a bar code on a consumer product, the subject field 5006 may contain all or part of a number assigned to the consumer product (e.g., a Universal Product Code number) which was encoded in the scanned indicia. In other cases, the subject field 5006 may contain numeric or alphanumeric characters encoded in a proprietary bar code. The header field 5004 and stop field 5008 are typically added by the output circuit 4906 to the subject information which is supplied by the decoder 4926. The code 5002 may further include a type identification (TID) field 5010 indicative of the type (i.e., format) of encoded indicia that was scanned (e.g., UPC, ISBN, ISSN, etc.). The type identification of an indicia is typically determined by the decoder 4926 during the decoding process. Further, the scan code 5002 may include an optical reader identification field 5012 indicative of the serial number of the optical reader used. This serial number may, for example, be stored in a memory 4434 accessible by the output circuit 4906.

Referring again to FIG. 49, the programmable memory system 4904 comprises a processor 4928 and an electronic memory 4930 operably connected to the processor. In the embodiment illustrated, the processor 4928 is a separate device from the decoder 4926 of the optical scanning system 4902. However, in another embodiment, the processor 4928 and the decoder circuitry 4926 may be portions of a common device or circuitry. The memory 4930 includes at least one, and preferably a plurality of, user-selectable memory locations 4932 for storing information extracted from encoded indicia. The memory 4930 is preferably non-volatile, i.e., the memory contents are preserved when power to the device is turned off. In one embodiment, the memory 4930 is an EEPROM. In another embodiment, the memory 4930 is a ferroelectric memory. In the illustrated embodiment, the electrical lead 4916 is connected to the processor 4928 to provide signals from switch 4908 indicative of whether the button 4702 has been activated. Further, the electrical leads 4918 and 4920 are also connected to the processor 4928 to provide signals from switches 4910 and/or 4912 indicative of whether the buttons 4704 ("A") and 4704 ("B") have been activated. If the button 4702 has been pressed, i.e., the optical reader is in the record mode, then the processor 4928 receives the signals (i.e., arrow 4924) indicative of information from the encoded indicia from the decoder circuit 4926.

Figure 51:
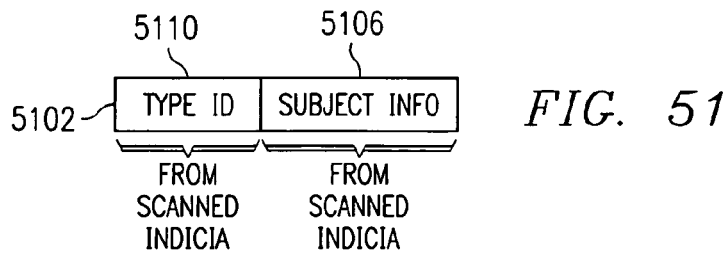
FIG. 51 illustrates a sample signal packet transmitted from the scanning system to the memory system when the reader is in the record mode.

Referring now to FIG. 51, there is illustrated a sample signal packet sent from the decoder circuit 4926 to the processor 4928 when the optical reader 4700 is in the record mode. Signal packet 5102 includes at least a subject field 5106 indicative of information that was encoded in the scanned indicia 4308. The signal packet 5102 may further include a type identification (TID) field 5110 indicative of the type (i.e., format) of encoded indicia that was scanned. The type identification of an indicia is typically determined by the decoder 4926 during the decoding process. The processor 4928 then stores the information from signal packet 5102 in the electronic memory 4930. If the memory 4930 has more than one user-selectable memory location 4932 available for storing the indicia-derived information from the signal packet 5102, then the processor 4928 may designate which of the available memory locations 4932 to use in accordance with user-supplied instructions, e.g., in this case instructions sent via the second buttons 4704.

In one embodiment, for example, the user will record an indicia with the optical reader 4700 as follows: First, the user will press the first button 4702 to switch the optical reader 4700 into record mode. Next, the user will press one of the second buttons 4704 to indicate the user-selectable memory location 4932 to be used. It is assumed for this example that the user presses the second button 4704 designated "A". Finally, the user will scan an optical indicia 4308 with the reader. In response to this sequence of user actions, the optical reader 4700 will determine the TID of the encoded indicia 4308, extract the encoded information in the indicia 4308 and store the indicia information and TID in a memory location 4932 associated with the "A" button 4704 (e.g., the location denoted "LOC.1"). Following the recording action, the optical reader 4700 will return to scan mode. The user may then record a second indicia by repeating the steps, except this time pressing second button "B" instead of second button "A" just prior to scanning the indicia of interest. In response to this sequence of user actions, the optical reader 4700 will determine the TID and extract the encoded information of the new indicia 4308 and store the information in a memory location associated with the "B" button 4704 (e.g., the location denoted "LOC.2").

When the user desires to connect to a remote site in accordance with the information extracted from a previously-scanned indicia, the optical reader 4700 is switched into the playback mode. In the illustrated embodiment, the processor 4928 switches into the playback mode when one of the second buttons 4704 is pressed while the optical reader 4700 is in the scan mode (i.e., when the first button 4702 has not been activated to enter the record mode). The processor 4928 then accesses the electronic memory 4930 to retrieve the indicia-derived information which was previously stored (i.e., while in the record mode). If the embodiment includes a plurality of user-selectable memory locations 4932 in memory 4930, then the processor 4928 will designate which memory location to access in accordance with the signals received from switches 4910 and/or 4912. The processor retrieves the indicia-derived information from the memory 4930 and produces therewith output signals (denoted by arrow 4934) indicative of the information previously extracted from the encoded indicia and, in most embodiment, of the TID of the indicia. The output signals 4934 are sent to the output circuit 4906 for transmission to the associated computer 302. The optical reader then returns to the scan mode.

For example, in the illustrated embodiment, pressing the "A" button 4704 while in the scan mode will cause the processor 4928 to access the memory location 4932 associated with the button "A" (i.e., "LOC.1"), retrieve the indicia-derived information previously stored therein, and produce signals 4934 indicative of the TID and the encoded information to the output circuit 4906. Similarly, pressing the "B" button 4704 will cause the processor 4928 to access the memory location 4932 associated with the "B" button (i.e., "LOC.2"), retrieve the indicia-derived information previously stored therein, and produce signals 4934 indicative of the TID and encoded information to the output circuit 4906. In a preferred embodiment, the contents of each memory location 4932 are retained and/or refreshed after each reading, thus they can be utilized repeatedly without requiring the user to re-scan the encoded indicia 4308 which was originally scanned in the record mode.

Figure 52:
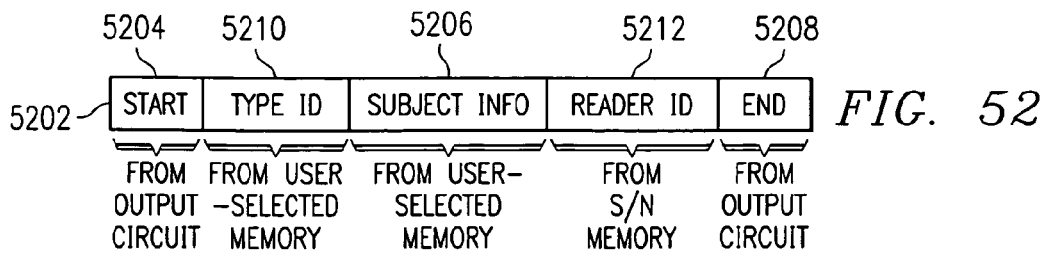
FIG. 52 illustrates a sample code transmitted from the optical reader to the associated device when the reader is in the playback mode.

Referring now to FIG. 52 there is illustrated a sample code sent from the output circuit 4906 of the optical reader 4700 to the associated computer 302 when the optical reader 4700 is used in the playback mode. The code 5202 comprises a number of fields of information including a header field 5204 indicative of message start, a subject field 5206 indicative of information that was encoded in the indicia 4308 previously scanned (while in the record mode), and a stop field 5208 indicative of message end. The header field 5204 and stop field 5208 are typically added by the output circuit 4906 as previously described. In a preferred embodiment, the code 5202 produced during the playback mode has a format which is identical to the format for the code 5002 produced during the scan mode. The dedicated code may further include a type identification field 5210 indicative of the type of encoded indicia scanned and/or an optical reader identification field 5212 indicative of the serial number of the optical reader used as previously described for field 5012. Where a type identification field 5210 is present, the contents of the type identification field 5210 will typically be additional information which was stored in the memory 4930 during the record mode, and then retrieved from the memory 4930 during the playback mode. If desired, the type identification field 5210 may contain information indicating that the subject information 5206 results from activation of the programmable memory system 4904. However, a code 5202 resulting from recording and playback of a particular encoded indicia using the reader 4700 will typically be identical to (i.e., indistinguishable from) a code 5002 resulting from scan mode scanning and instantaneous transmission of the same indicia.

The output circuit 4906 receives the output signals 4922 and 4934 from the optical scanning system 4902 and the programmable memory system 4904, respectively, and transmits them from the optical reader 4700 to a computer 302, or another associated device. As previously described, the signals 4332 transmitted from the output circuit 4906 have the form of a code 5002 or 5202. The output circuit 4906 may utilize a hard-wired connection and/or a wireless connection (e.g., RF or IR wavelengths) to send the signals 4332 to the associated device as previously described herein.

It will thus be apparent, that the optical reader 4700 may be configured to operate such that the associated computer or device receiving a code from the optical reader 4700 will be incapable of distinguishing whether the code results from the scan mode (i.e., real-time) scanning of an encoded indicia or from the playback of information derived from previously scanned encoded indicia, which had been stored in the optical reader. Such a configuration allows an optical reader 4700 incorporating the programmable memory system 4904 to be fully compatible with associated devices (e.g., computers), software applications (e.g., browsers), and network systems (e.g., servers, including ARS 308, and databases, including ARS database 310) designed for use with optical readers not having the programmable memory system.

Figure 53:
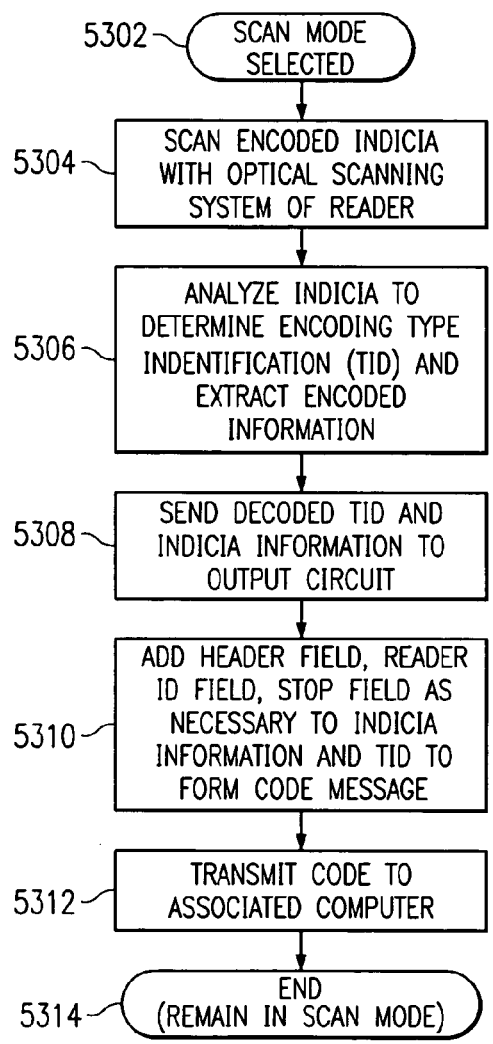
FIG. 53 illustrates a flowchart of one embodiment of the process while in the scan mode.
Figure 54:
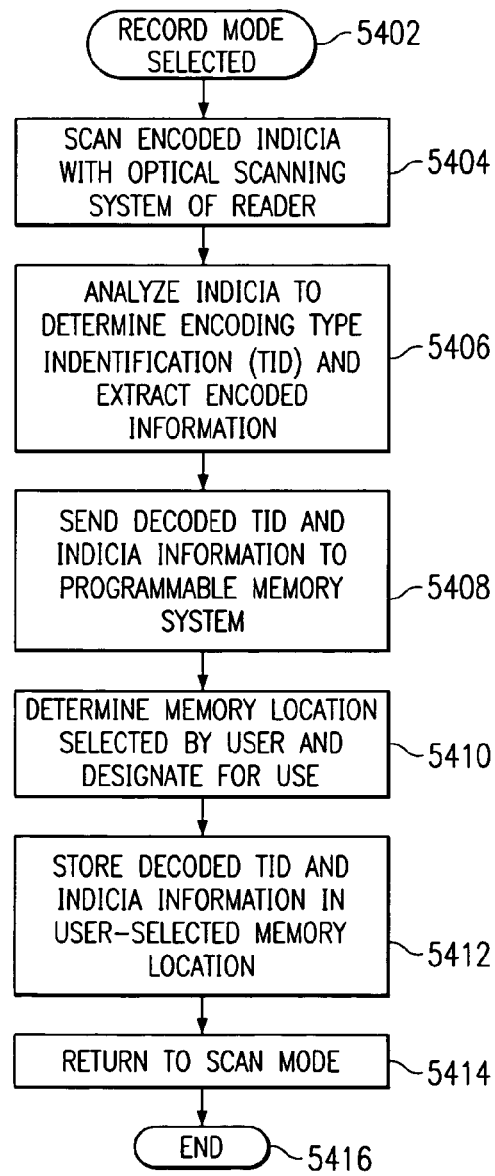
FIG. 54 illustrates a flowchart of one embodiment of the process while in the record mode.

Referring now to FIGS. 53-55, there are illustrated flow charts of a method for using an optical reader, for example optical reader 4700, to produce a code indicative of information in an encoded indicia in accordance with another aspect of the current invention. The code so produced can be used to access a remote location on a network in accordance with a further aspect of the current invention.

Referring now to FIG. 53, there is illustrated a flowchart for an embodiment of the method when the optical reader 4700 is in the scan mode. The method starts in block 5302 and proceeds to the first function block 5304, wherein an encoded indicia is scanned with an optical scanning system, e.g., optical scanning system 4902. Next, flow continues to function block 5306, wherein the optical scanning system 4902 analyzes the scanned indicia 4308, determining the type identification (TID) of the encoded indicia and extracting the information which was encoded in the indicia. Flow then proceeds to function block 5308, wherein the optical scanning system 4902 sends the information derived from the scanned indicia and the type identification of the scanned indicia (if applicable) to the output circuit 4906. Flow then proceeds to function block 5310, wherein the output circuit 4906 appends additional information as necessary to the information received from the optical scanning system 4902 to assemble an output message packet 5002. The operations or sub-steps included in function block 5310 may include adding a header field 5004, a stop field 5008 and a reader identification field 5012 to the subject information 5006 and/or a type identification information 5010 received from the decoder circuit 5926. Flow then proceeds to function block 5312, wherein the code 5002 is transmitted from the output circuit 4906 to the associated computer 302 or other associated device. It will of course be appreciated that the function block 5312 will include sub-steps such as signal conditioning or modulation as required depending on the form of transmission, e.g., hardwired or wireless, used for communication between the output circuit and the associated computer. The method of producing a code using the optical reader 4700 in the scan mode is now complete as indicated by the flow proceeding to the "END" block 5314. It will be noted that the reader 4700 remains in the scan mode until switched into another mode by the user.

Referring now to FIG. 54, there is illustrated a flowchart for an embodiment of the method when the optical reader 4700 is in the record mode. The method begins in block 5402, wherein the record mode is selected by the user, e.g., in this case by pressing a first button 4702 to enter the record mode and a second button 4704 to designate the user-selectable memory to be used for the recording. Flow then proceeds to the first function block 5404, wherein the optical reader 4700 is used to scan an encoded indicia 4308 with the optical scanning system 4902. Flow continues to function block 5406, wherein the scanning system of 4902 determines the indicia encoding type identification (TID) and decodes the encoded information. It will be apparent that the operations performed in function blocks 5404 and 5406 of the record mode are substantially identical to the operations performed in function blocks 5304 and 5306 of the scan mode. The methods are differentiated, however, as flow proceeds from function block 5406 to function block 5408, wherein the decoded information from the scanned indicia and the encoding type identification produced by the optical scanning system 4902 are sent to the programmable memory system 4904. In the embodiment illustrated in FIG. 49, this step is represented by the signals sent from the decoder circuit 4926 to the processor 4928 as denoted by the arrow 4924. The signals may have the form of the message packet 5102 as illustrated in FIG. 51. Flow then proceeds to function block 5410, wherein the programmable memory system determines which user selectable memory is to be used for storage of the information received from the optical scanning system. In one embodiment, the processor 4928 determines which user selectable memory 4932 will be used on the basis of the signals received from the button actuated switches 4908, 4910 and 4912 as previously described. Once the user selectable memory location to be used has been determined, flow proceeds to function block 5412, wherein the decoded information from the scanned indicia and/or the encoding type identification information are stored in the designated user selectable memory 4932. Flow then proceeds to the function block 5414, wherein the optical reader 4700 switches automatically back into the scan mode. The portion of the method performed in the record mode is now completed as indicated by the flow proceeding to the "END" block 5416.

Referring now to FIG. 55, there is illustrated a flowchart for an embodiment of the method wherein the optical reader 4700 is in the playback mode. It will, of course, be apparent that the record mode previously described and illustrated (FIG. 54) must be completed before the playback mode can be used for producing code signals or accessing a remote location on the network. It is thus assumed, for purposes of description, that the optical reader 4700 has been previously used to scan an encoded indicia 4308 in the record mode. The playback mode begins in block 5502, wherein the playback mode is selected by the user, e.g., in this case by pressing a button 4704 when the reader is in the scan mode. Flow then proceeds to the first function block 5504, wherein the programmable memory system 4904 determines which user-selectable memory will be used for subsequent playback operations. In one embodiment having a memory 4930 with a plurality of user selectable memory locations 4932, determining the user selectable memory to be used is performed by a processor 4928 on the basis of the signals received from the button operated switches 4704 as previously described. For example, if the playback mode is initiated by the user pressing the button 4704 denoted "A", then the processor would designate the user selectable memory 4932 denoted "LOC.1" to be used, while if the playback mode was initiated by the user pressing the button 4704 denoted "B", then the processor would designate the user selectable memory denoted "LOC.2".

After determining the user selectable memory to be used, flow proceeds to function block 5506 wherein the memory device 4930 is accessed by the processor 4928 and the decoded indicia information and/or encoding type identification information is retrieved from the designated user-selectable memory. Continuing with the previous example, if playback mode was initiated with the user pressing button "A", then the information from the encoded indicia and encoding type identification would be retrieved from the memory "LOC.1". After retrieving the information from the designated memory location, flow proceeds to function block 5508, wherein the decoded information from the indicia and the type identification information are sent to the output circuit 4906. Flow then proceeds to function block 5510, wherein the information received from the processor 4928 is assembled into an output code by adding any necessary header fields, reader identification fields, and/or stop fields as previously described. In one embodiment, this information will be assembled into a code packet 5202 as previously described and illustrated (FIG. 52). Flow then proceeds to function block 5512, wherein the code is transmitted from the output circuit of 4906 to the remote computer 302. It will be apparent that the operations performed in function blocks 5510 and 5512 of the playback mode are substantially identical to those performed in function blocks 5310 and 5312 of the scan mode as previously described. After transmitting the code 5202 to the remote computer 302, flow then proceeds to the function block 5414, wherein the optical reader 4700 automatically switches into the scan mode. The operation of the playback mode is now complete as indicated by the flow proceeding to the "END" block 5516.

The system for accessing a remote location on a network using the optical reader 4700 is, except for the previously described structure of the optical reader itself, substantially identical to that previously described and illustrated herein (e.g., FIGS. 3, 16 and 46). The system includes a first computer 302 disposed (by means of network interface 304) on a network 306, which may be a global communication network such as the Internet. The optical reader 4700 is operably connected to the first computer 302. The connection between the optical reader 4700 and the attached device may be hardwired or wireless. A second computer 308 (e.g., the ARS server) is also disposed on the network 306. A database 310 (e.g., ARS database) may be operably connected to the second computer 308. A third computer 312 (e.g., an advertiser's server) is disposed on the network 306 at a remote site.

The process of connecting to the remote site on the network using the optical reader 4700 is, except for the previously described process of producing the initial indicia-derived code using the scan, record and playback modes of the optical reader, also substantially identical to processes previously described and illustrated herein (e.g., FIG. 46). The code 5002 or 5202 is transmitted from optical reader 4700 to the first computer 302. The first computer 302, in response to receiving the code 5002 or 5202, accesses the second computer 308. Typically, this accessing will involve sending a code, i.e., a packet of information (denoted by reference numeral 4602) including at least a portion of the code 5002 or 5202 across the network 306 from the first computer 302 to the second computer 308. This code may, for example, include all or part of the subject field 5006 or 5206 and/or all or part of the type identification field 5010 or 5210 from the code 5002 or 5202. A lookup operation is performed at the second computer 308 to match the code received from the optical reader 4700 with a routing information for a remote location on the network. Typically this lookup operation is performed by accessing (denoted by reference numeral 4603) a computer database 310 including a plurality of codes and a plurality of routing information for remote locations on the network. In the database 310, each of the plurality of routing information is associated with at least one of the plurality of codes. The routing information corresponding to the code received from the optical reader 4100 is then retrieved from the database 310 by second computer 308. The routing information (denoted by reference numeral 4604) is returned from the second computer 308 to the first computer 302. The routing information is then used by the first computer 302 to access (denoted by reference numeral 4606) the third computer 312 at the remote location on the network. Typically, after locating the third computer 312 at the remote location, information (denoted by reference numeral 4608) will be returned from the third computer to the first computer 302 for presentation to the user.

Although the preferred embodiment has been described in detail, it should be understood that various changes, substitutions and alterations can be made therein without departing from the spirit and scope of the invention as defined by the appended claims.

What is claimed is:

1. An apparatus for accessing a remote location on a network comprising:
    an optical reader including:
        an optical scanning system;
        a memory system;
        an output circuit for interfacing to a first computer disposed on the network;
        a user controlled switching device for switching between a scan mode, a record mode and a playback mode;
        a transmitter for transmitting code information representative of a code to the first computer;
        the code information being indicative, when the optical reader is in the scan mode, of information representative of an encoded indicia just scanned by the optical scanning system such that the encoded indicia just scanned is immediately transmitted to the first computer such that there is no other scanned encoded indicia transmitted therebetween;
        the code information being indicative, when the optical reader is placed in the playback mode by a user, of information retrieved from a user-selectable memory in the memory system, in which the information was previously stored in the user-selectable memory relating to a prior scan of the encoded indicia when the optical reader was placed in the record mode by the switching device, in which playback of information under control of a user occurs in time after recording of the played back information and in response to a user initiating the playback mode with the switching device, and wherein other scanned indicia are transmitted in response to scanning in the scan mode, recording in the record mode and playback in the playback mode; and
        wherein the code information is configured to, upon being received by the first computer, cause the first computer to determine routing information to the remote location from the received code information, and access the remote location on the network in accordance with the determined routing information; and
    wherein the optical reader is a self-contained unit.

2. The apparatus in accordance with claim 1, wherein the optical reader is further configured to:
    switch with the switching device, prior to transmitting code information, into the record mode;
    scan with the optical scanning system, while in the record mode, an encoded indicia; and
    store, with the memory system, code information determined from the scanned encoded indicia in the user-selectable memory.

3. The apparatus in accordance with claim 2, wherein the switching device is further configured to switch, subsequent to storing code information determined from the scanned encoded indicia and prior to transmitting code information, into the playback mode.

4. The apparatus in accordance with claim 3, wherein the optical reader further includes:
    a first button accessible from an exterior of the optical reader and mechanically connected to a first electrical switch operably connected to the optical scanning system and the memory system; and
    wherein the switching device is further configured to switch the optical reader into the record mode upon a pushing of the first button.

5. The apparatus in accordance with claim 4, wherein the optical reader further includes:
    a second button accessible from the exterior of the optical reader and mechanically connected to a second electrical switch which is operably connected to the memory system; and
    wherein the switching device is further configured to switch the optical reader into the playback mode upon a pushing of the second button.

6. The apparatus in accordance with claim 4, wherein the optical reader further includes:
    a plurality of second buttons accessible from the exterior of the optical reader, each of the plurality of second buttons being mechanically connected to a corresponding one of a plurality of second electrical switches, and each of the plurality of second electrical switches being operably connected to the memory system; and
    wherein the switching device is further configured to switch the optical reader into the playback mode upon a pushing of one of the plurality of second buttons.

7. The apparatus in accordance with claim 6, wherein the memory system includes a plurality of user-selectable memories, and each of the plurality of second electrical switches is connected to the memory system such that its activation will cause information to be retrieved from a corresponding one of the plurality of user-selectable memories.

8. The apparatus in accordance with claim 7, wherein the code reader further includes a processor configured to:
    receive a signal indicative of a pressing, subsequent to the pressing of the first button and prior to the scanning of the encoded indicia, of one of the plurality of second buttons; and designate the one of the plurality of memory location corresponding to the one of the plurality of second buttons that was pressed as the memory location for storing the code information representative of the scanned encoded indicia.

9. The apparatus in accordance with claim 1, wherein the code information transmitted from the optical reader to the first computer further includes information indicative of the type of encoded indicia that was scanned.

10. The apparatus in accordance with claim 1, wherein the code information transmitted from the optical reader to the first computer further includes information identifying the optical reader.

11. The apparatus in accordance with claim 10, wherein information identifying the optical reader is a unique serial number for the optical reader.

12. The apparatus in accordance with claim 1, wherein the first computer is configured to access, in response to the first computer receiving the code information from the optical reader, a second computer disposed on the network to determine the routing information to the remote location; and wherein the second computer is configured to:
perform a lookup operation at the second computer to match the code information received from the optical reader with a routing information for a remote location on the network; and
return the routing information from the second computer to the first computer.

13. The apparatus in accordance with claim 12, wherein the second computer is connected to a computer database including a plurality of code information and a plurality of routing information for remote locations on the network, and each of the plurality of routing information for remote locations on the network is associated with at least one of the plurality of code information.

14. The apparatus in accordance with claim 12, wherein to access the second computer the first computer is configured to:
launch a software application on the first computer;
incorporate the code received from the optical reader into a message packet using the software application; and
transmit the message packet to the second computer.

15. The apparatus in accordance with claim 14, wherein the message packet includes information identifying the optical reader.

16. The apparatus in accordance with claim 14, wherein the message packet includes information identifying the user.

17. The apparatus in accordance with claim 14, wherein the message packet includes information identifying the type of encoded indicia scanned by the optical reader.

18. The apparatus in accordance with claim 12, wherein to access the remote location on the network the first computer is further configured to:
locate information on a third computer at the remote location; and
receive the information from the third computer for presentation to the user.

19. The apparatus in accordance with claim 1, wherein the network is a global communication network.

* * * * *